United States Patent
Coraluppi et al.

(10) Patent No.: US 12,034,849 B1
(45) Date of Patent: *Jul. 9, 2024

(54) FACTORING LARGE INTEGERS

(71) Applicants: Giorgio Coraluppi, Pittsburgh, PA (US); Jonathan Holland, Pittsburgh, PA (US); John E. Gilmour, Gibsonia, PA (US)

(72) Inventors: Giorgio Coraluppi, Pittsburgh, PA (US); Jonathan Holland, Pittsburgh, PA (US); John E. Gilmour, Gibsonia, PA (US)

(73) Assignee: Compunetix, Inc., Monroeville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,388

(22) Filed: Sep. 2, 2022

(51) Int. Cl.
*H04L 9/30* (2006.01)
*G06F 17/11* (2006.01)

(52) U.S. Cl.
CPC ............. *H04L 9/302* (2013.01); *G06F 17/11* (2013.01); *H04L 9/3093* (2013.01)

(58) Field of Classification Search
None
See application file for complete search history.

(56) References Cited

U.S. PATENT DOCUMENTS

2013/0136257 A1* 5/2013 You .................. H04L 9/002 380/30
2018/0198613 A1* 7/2018 Anderson ............. G06F 21/602

* cited by examiner

*Primary Examiner* — Trang T Doan
(74) *Attorney, Agent, or Firm* — Ansel M. Schwartz

(57) ABSTRACT

A method for decoding an encrypted electromagnetic signal W encoded by a first computer with public key N_0=r×s, where N_0, r and s are integers. There is the step of obtaining the electromagnetic signal W from a telecommunications network, or a data network or an Internet or a first non-transient memory. There is the step of storing the electromagnetic signal W in a second non-transient memory. There is the step of decoding with a second computer in communication with the second non-transient memory the electromagnetic signal W in the second non-transient memory by factoring the public key N_0 in at most a time $O(\log^6 N\_0)$. A non-transitory readable storage medium which includes a computer program stored on the storage medium for decoding an encrypted electromagnetic signal W.

14 Claims, 3 Drawing Sheets

Factorization process.

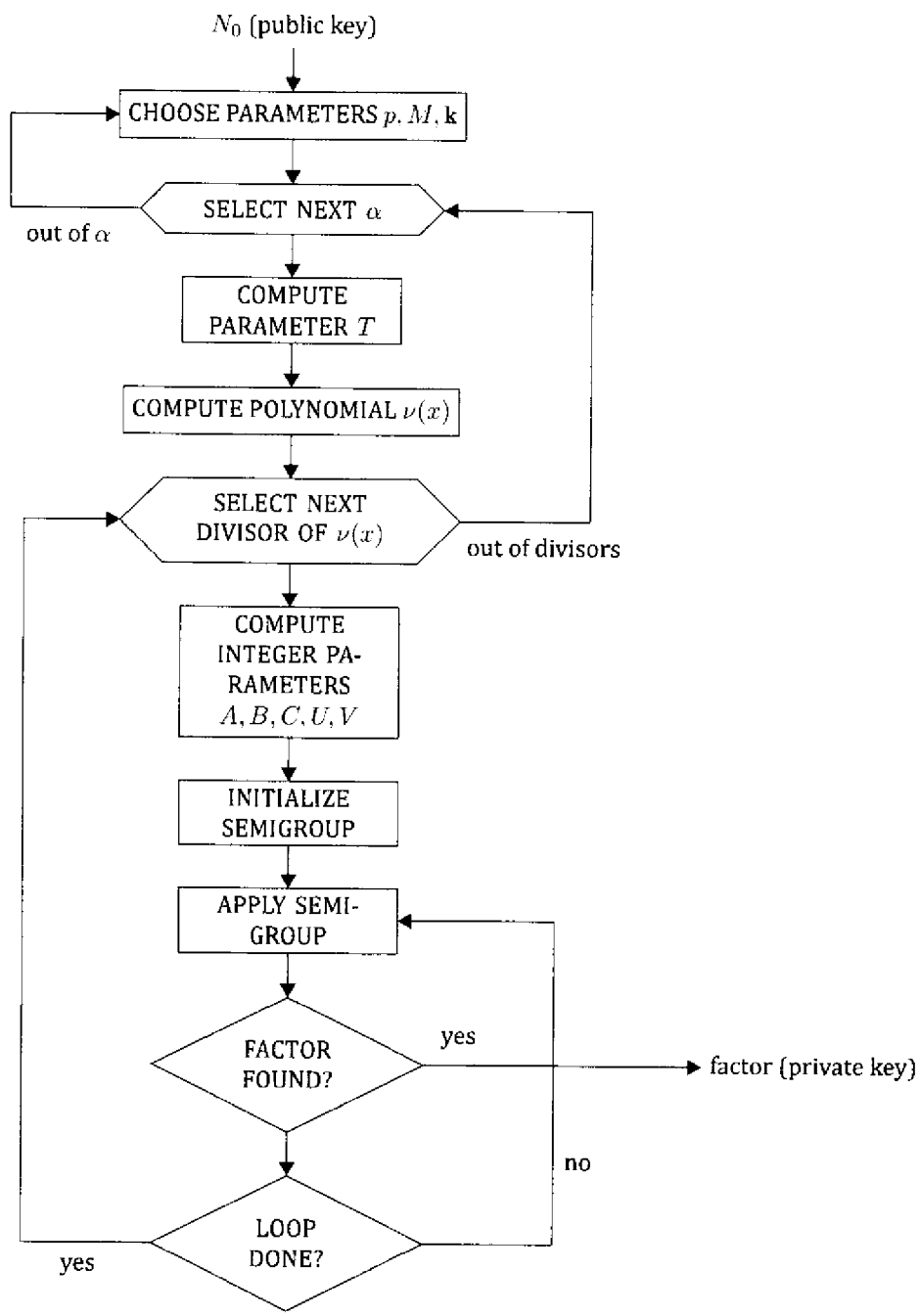
Figure 2: Factorization process.

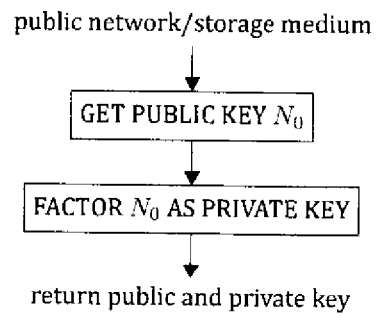
Figure 3: Obtaining public/private key pair
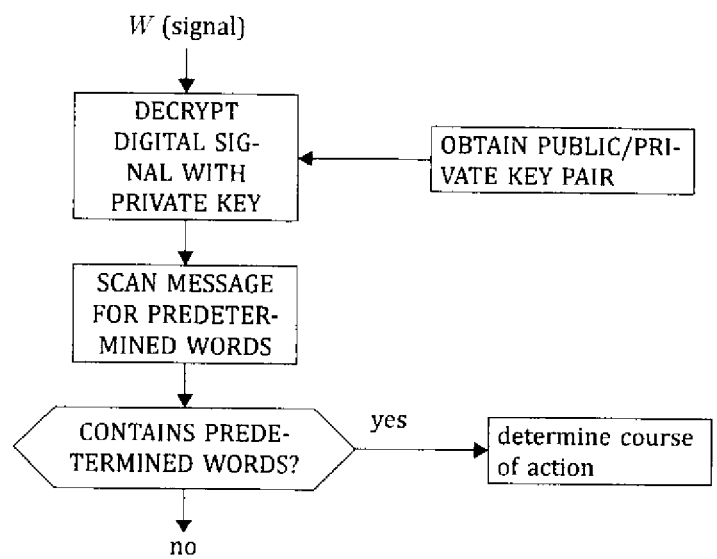
Figure 4: Decoding, decrypting, and scanning electromagnetic signal $W$

FACTORING LARGE INTEGERS

FIELD OF THE INVENTION

The present invention is related to solving an equation in two or more unknown integer variables, where each variable is represented by a multiplicity of powers of multiples of an odd prime p. Specifically, the present invention is related to factoring an integer $N_0$, restating the problem into the factorization of an appropriate integer N which is a quadratic residue modulo p, then factoring N.

BACKGROUND

The problem of resolving a large integer into the product of its prime factors has stimulated the intellectual curiosity and the imagination of many generations of mathematicians.

In 1801 Gauss wrote: ". . . the dignity of the science itself seems to require that every possible means be explored for the solution of a problem so elegant and so celebrated." See page 397 of [3].

The problem has attracted renewed interest, ever since R. L. Rivest, A. Shamir, and L. Adleman proposed an encryption method which is based on the computational difficulty of the factorization problem [4].

This note introduces a method and apparatus which lead to the factorization of a large odd integer $N_0$.

SUMMARY

The present invention pertains to a method for decoding an encrypted electromagnetic signal W encoded by a first computer with public key $N_0 = r \times s$, where $N_0$, r and s are integers. The method comprises the steps of obtaining the electromagnetic signal W from a telecommunications network, or a data network or an Internet or a first non-transient memory. There is the step of storing the signal W in a second non-transient memory. There is the step of decoding with a second computer in communication with the second non-transient memory the signal W in the second non-transient memory by factoring the public key $N_0$ in at most a time $O(\log^6 N_0)$ with the second computer generated steps of selecting integers a, b. There is the step of electing an initial point in a set of quartuples of integers modulo $N_0$ (a projective space) $[X_0, X_1, X_2, X_3] = [1,0,b,0]$. There is the step of applying a semigroup law repeatedly starting from the initial point, where the semigroup law is defined as: given a pair of elements $[X_0: X_1: X_2: X_3]$ and $[Y_0: Y_1: Y_2: Y_3]$ of the projective space, there is produced a third point $[Z_0, Z_1, Z_2, Z_3]$. There is the step of determining that $[X_0: X_1: X_2: X_3] \equiv [Y_0: Y_1: Y_2: Y_3] \pmod{N_0}$, and thus the third point is $$Z_0 \equiv 16 X_0^4 X_2^4 \pmod{N_0}$$

$$Z_1 \equiv X_0^4 X_2^2 (4X_3^2 - 16b^2 X_0^2 a - 32 b^2 X_0 X_1) \pmod{N_0}$$

$$Z_2 \equiv -2X_0 X_2 \begin{pmatrix} 8 X_0^3 X_1^3 a^3 + 36 X_0^2 X_1^4 a^2 - 8 X_0^3 X_1 X_2^2 a^2 + 54 X_0 X_1^5 a - \\ 36 X_0^2 X_1^2 X_2^2 a + 27 X_1^6 - 36 X_0 X_1^3 X_2^2 + 8 X_0^2 X_2^4 \end{pmatrix} \pmod{N_0}$$

$$Z_3 \equiv (4 X_0^2 X_1^2 a^2 + 12 X_0 X_1^3 a - 4 X_0 X_2^2 a + 9 X_1^4 - 8 X_0 X_1 X_2^2)^2 \pmod{N_0}$$

Otherwise, the point $[Z_0, Z_1, Z_2, Z_3]$ is:

$$Z_0 \equiv (X_1 Y_0 - X_0 Y_1)^4 X_0^2 Y_0^2 \pmod{N_0}$$

$$Z_1 \equiv X_0^3 Y_0^3 (X_1 Y_0 - X_0 Y_1)^2$$
$$\quad (2b^2 X_0 Y_0 + 2 X_1 Y_1 a + X_3 Y_1 - 2 X_2 Y_2 + X_1 Y_3) \pmod{N_0}$$

$$Z_2 \equiv X_0^3 Y_0^3 (X_1 Y_0 - X_0 Y_1)$$
$$\begin{pmatrix} -4b^2 X_0 X_2 Y_0^2 + 4b^2 X_0^2 Y_0 Y_2 + X_1 X_3 Y_0 Y_2 + \\ 3 X_0 X_3 Y_1 Y_2 - 3 X_1 X_2 Y_0 Y_3 - X_0 X_2 Y_1 Y_3 - \\ 2a(X_1 X_2 Y_0 Y_1 - X_0 X_3 Y_0 Y_2 - X_0 X_1 Y_1 Y_2 + X_0 X_2 Y_0 Y_3) \end{pmatrix} \pmod{N_0}$$

$$Z_3 \equiv$$
$$\begin{pmatrix} (X_1 Y_0 - X_0 Y_1)^2 X_0 Y_0 a + X_1^3 Y_0^3 - X_0 X_2^2 Y_0^3 - X_0 X_1^2 Y_0^2 Y_1 - \\ X_0^2 X_1 Y_0 Y_1^2 X_0^3 Y_1^3 + 2 X_0^2 X_2 Y_0^2 Y_2 - X_0^3 Y_0 Y_2^2 \end{pmatrix}^2 \pmod{N_0}.$$

There is the step of testing if any component of the third point shares a factor with $N_0$ and is a shared factor with $N_0$. There is the step of identifying the shared factor with $N_0$ as one of plurality of prime factors of $N_0$, and a quotient of $N_0$ by the shared factor as another prime factor. There is the step of decrypting with the second computer the signal W with the public key $N_0$ and prime factors of the integer $N_0$. There is the step of reviewing the decrypted signal W for predetermined words with the second computer to determine if the decrypted signal W indicates an act has occurred or will occur that violates a law, or will violate a law, wherein the signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

The present invention pertains to a second computer for decoding an encrypted electromagnetic signal W encoded by a first computer with public key $N_0 = r \times s$, where $N_0$, r and s are integers and W is a function of r and s. The second computer comprises an input for obtaining the electromagnetic signal W from a telecommunications network, or a data network or an Internet or a first non-transient memory, a second non-transient memory in communication with the input in which the signal W is stored. The second computer comprises a cpu in communication with the second non-transient memory with the signal W in the second non-transient memory that decodes the signal W by factoring the public key $N_0$ in time $O(\log^6 N_0)$ by the second computer generated steps of selecting integers a, b. There is the step of electing an initial point in a set of quartuples of integers modulo $N_0$ (a projective space) $[X_0, X_1, X_2, X_3] = [1,0,b,0]$. There is the step of applying a semigroup law repeatedly starting from the initial point, where the semigroup law is defined as: given a pair of elements $[X_0: X_1: X_2: X_3]$ and $[Y_0: Y_1: Y_2: Y_3]$ of the projective space, there is produced a third point $[Z_0, Z_1, Z_2, Z_3]$. There is the step of determining that $[X_0: X_1: X_2: X_3] \equiv [Y_0: Y_1: Y_2: Y_3] \pmod{N_0}$, and thus the third point is $$Z_0 \equiv 16 X_0^4 X_2^4 \pmod{N_0}$$

$$Z_1 \equiv X_0^4 X_2^2 (4X_3^2 - 16b^2 X_0^2 a - 32 b^2 X_0 X_1) \pmod{N_0}$$

$$Z_2 \equiv -2X_0 X_2 \begin{pmatrix} 8 X_0^3 X_1^3 a^3 + 36 X_0^2 X_1^4 a^2 - 8 X_0^3 X_1 X_2^2 a^2 + 54 X_0 X_1^5 a - \\ 36 X_0^2 X_1^2 X_2^2 a + 27 X_1^6 - 36 X_0 X_1^3 X_2^2 + 8 X_0^2 X_2^4 \end{pmatrix} \pmod{N_0}$$

-continued $$Z_3 \equiv \left(4X_0^2 X_1^2 a^2 + 12X_0 X_1^3 a - 4X_0^2 X_2^2 a + 9X_1^4 - 8X_0 X_1 X_2^2\right)^2 \pmod{N_0}$$

Otherwise, the point $[Z_0, Z_1, Z_2, Z_3]$ is:

$$Z_0 \equiv (X_1 Y_0 - X_0 Y_1)^4 X_0^2 Y_0^2 \pmod{N_0}$$

$$Z_1 \equiv X_0^3 Y_0^3 (X_1 Y_0 - X_0 Y_1)^2$$

$$\left(2b^2 X_0 Y_0 + 2X_1 Y_1 a + X_3 Y_1 - 2X_2 Y_2 + X_1 Y_3\right) \pmod{N_0}$$

$$Z_2 \equiv X_0^3 Y_0^3 (X_1 Y_0 - X_0 Y_1)$$

$$\begin{pmatrix} -4b^2 X_0 X_2 Y_0^2 + 4b^2 X_0^2 Y_0 Y_2 + X_1 X_3 Y_0 Y_2 + \\ 3X_0 X_3 Y_1 Y_2 - 3X_1 X_2 Y_0 Y_3 - X_0 X_2 Y_1 Y_3 - \\ 2a(X_1 X_2 Y_0 Y_1 - X_0 X_3 Y_0 Y_2 - X_0 X_1 Y_1 Y_2 + X_0 X_2 Y_0 Y_3) \end{pmatrix} \pmod{N_0}$$

$$Z_3 \equiv$$

$$\left(\begin{array}{c}(X_1 Y_0 - X_0 Y_1)^2 X_0 Y_0 a + X_1^3 Y_0^3 - X_0 X_2^2 Y_0^3 - X_0 X_1^2 Y_0^2 Y_1 - \\ X_0^2 X_1 Y_0 Y_1^2 X_0^3 Y_1^3 + 2X_0^2 X_2 Y_0^2 Y_2 - X_0^3 Y_0 Y_2^2\end{array}\right)^2 \pmod{N_0}.$$

There is the step of testing if any component of the third point shares a factor with $N_0$ and is a shared factor with $N_0$. There is the step of identifying the shared factor with $N_0$ as one of plurality of prime factors of $N_0$, and a quotient of $N_0$ by the shared factor as another prime factor. The cpu decrypting the signal W with the public key $N_0$ and prime factors of integer $N_0$. The cpu reviewing the decrypted signal W for predetermined words to determine if the decrypted signal W indicates an act has occurred or will occur that violates a law, or will violate a law, wherein the signal W representative of the message is effectively decrypted and deciphered thereby a threat to property or individuals in violation of the law can be quickly acted upon to eliminate the threat before the threat occurs and actual damage to property or injury to individuals is prevented or mitigated.

The present invention pertains to a non-transitory readable storage medium which includes a computer program stored on the storage medium for decoding an encrypted electromagnetic signal W encoded by a first computer with public key $N_0=r \times s$, where $N_0$, r and s are integers and W is a function of r and s, where the signal W has been stored in a second non-transient memory of a second computer, and the second computer factoring the public key $N_0$ in time $O(\log^6 N_0)$. The signal W obtained from a telecommunications network, or a data network or an Internet or a first non-transient memory. The computer program having the second computer generated steps of selecting integers a, b. There is the step of electing an initial point in a set of quartuples of integers modulo $N_0$ (a projective space) $[X_0, X_1, X_2, X_3]=[1,0,b,0]$. There is the step of applying a semigroup law repeatedly starting from the initial point, where the semigroup law is defined as: given a pair of elements $[X_0: X_1: X_2: X_3]$ and $[Y_0: Y_1: Y_2: Y_3]$ of the projective space, there is produced a third point $[Z_0, Z_1, Z_2, Z_3]$. There is the step of determining that $[X_0: X_1: X_2: X_3] \equiv [Y_0: Y_1: Y_2: Y_3] \pmod{N_0}$, and thus the third point is $$Z_0 \equiv 16X_0^4 X_2^4 \pmod{N_0}$$

$$Z_1 \equiv X_0^4 X_2^2 \left(4X_3^2 - 16b^2 X_0^2 a - 32b^2 X_0 X_1\right) \pmod{N_0}$$

$$Z_2 \equiv$$

$$-2X_0 X_2 \begin{pmatrix} 8X_0^3 X_1^3 a^3 + 36X_0^2 X_1^4 a^2 - 8X_0^3 X_1 X_2^2 a^2 + 54X_0 X_1^5 a - \\ 36X_0^2 X_1^2 X_2^2 a + 27X_1^6 - 36X_0 X_1^3 X_2^2 + 8X_0^2 X_2^4 \end{pmatrix} \pmod{N_0}$$

$$Z_3 \equiv \left(4X_0^2 X_1^2 a^2 + 12X_0 X_1^3 a - 4X_0^2 X_2^2 a + 9X_1^4 - 8X_0 X_1 X_2^2\right)^2 \pmod{N_0}$$

Otherwise, the point $[Z_0, Z_1, Z_2, Z_3]$ is:

$$Z_0 \equiv (X_1 Y_0 - X_0 Y_1)^4 X_0^2 Y_0^2 \pmod{N_0}$$

$$Z_1 \equiv$$

$$X_0^3 Y_0^3 (X_1 Y_0 - X_0 Y_1)^2 \left(2b^2 X_0 Y_0 + 2X_1 Y_1 a + X_3 Y_1 - 2X_2 Y_2 + X_1 Y_3\right) \pmod{N_0}$$

$$Z_2 \equiv X_0^3 Y_0^3 (X_1 Y_0 - X_0 Y_1)$$

$$\begin{pmatrix} -4b^2 X_0 X_2 Y_0^2 + 4b^2 X_0^2 Y_0 Y_2 + X_1 X_3 Y_0 Y_2 + \\ 3X_0 X_3 Y_1 Y_2 - 3X_1 X_2 Y_0 Y_3 - X_0 X_2 Y_1 Y_3 - \\ 2a(X_1 X_2 Y_0 Y_1 - X_0 X_3 Y_0 Y_2 - X_0 X_1 Y_1 Y_2 + X_0 X_2 Y_0 Y_3) \end{pmatrix} \pmod{N_0}$$

$$Z_3 \equiv$$

$$\left(\begin{array}{c}(X_1 Y_0 - X_0 Y_1)^2 X_0 Y_0 a + X_1^3 Y_0^3 - X_0 X_2^2 Y_0^3 - X_0 X_1^2 Y_0^2 Y_1 - \\ X_0^2 X_1 Y_0 Y_1^2 X_0^3 Y_1^3 + 2X_0^2 X_2 Y_0^2 Y_2 - X_0^3 Y_0 Y_2^2\end{array}\right)^2 \pmod{N_0}.$$

There is the step of testing if any component of the third point shares a factor with $N_0$ and is a shared factor with $N_0$. There is the step of identifying the shared factor with $N_0$ as one of plurality of prime factors of $N_0$, and a quotient of $N_0$ by the shared factor as another prime factor. There is the step of decrypting with the second computer the signal W with the public key $N_0$ and prime factors of the integer $N_0$. There is the step of reviewing the decrypted signal W for predetermined words with the second computer to determine if the decrypted signal W indicates an act has occurred or will occur that violates a law, or will violate a law, wherein the signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

The present invention pertains to a method for decoding an encrypted electromagnetic signal W encoded by a first computer with public key $N_0=r \times s$, where $N_0$, r and s are integers. The method comprises the steps of obtaining the electromagnetic signal W from a telecommunications network, or a data network or an Internet or a first non-transient memory. There is the step of storing the signal W in a second non-transient memory. There is the step of decoding with a second computer in communication with the second non-transient memory the signal W in the second non-transient memory by factoring the public key $N_0$ in at most a time $O(\log^6 N_0)$ with the second computer generated steps of selecting a prime p and vector of positive integers $k=[k_0, k_1, \ldots, k_{M-1}]$. There is the step of determining a polynomial $v(x)=v_0+v_1 x+\ldots+v_{n-1} x^{n-1}$ such that $v(p)=N$ is a predetermined multiple of $N_0$. There is the step of determining a $p^k$-standard polynomial $A(x)$ such that $A(x)^2 \equiv v(x)$ ($SP_{p^k}$), where a polynomial $f(x)=f_0+f_1 x+f_2 x^2+\ldots+f_{M-1} x^{M-1}$ is called $p^k$-standard if $$0 \le f_i < p^{k_i}$$

for i=0,1, . . . ,M−1, a $p^k$-standard part of the polynomial f(x) is computed by reducing the coefficient of $x^i$ modulo $p^{k_i}$ and truncating all terms $x^m$ for m≥M. There is the step of determining a roster of pairs (U(x), V(x)) such that there is a persistent standard polynomial factorization:

$$(A(x)-U(x)-V(x))(A(x)+U(x)-V(x))\equiv v(x) \ (SP_{p^k})$$

where a standard polynomial factorization v(x)≡r(x)s(x) is called persistent if r(x) and s(x) have the same degree as their reductions modulo p. There is the step of determining a shared factor that integers r(p) and s(p) share with $N_0$, where the shared factor with $N_0$ as one of plurality of prime factors of $N_0$. There is the step of obtaining another prime factor by division of $N_0$ by the shared factor. There is the step of identifying the shared factor with $N_0$ as one of plurality of prime factors of $N_0$, and a quotient of $N_0$ by the shared factor as another prime factor. There is the step of decrypting with the second computer the signal W with the public key $N_0$ and prime factors of the integer $N_0$. There is the step of reviewing the decrypted signal W for predetermined words with the second computer to determine if the decrypted signal W indicates an act has occurred or will occur that violates a law, or will violate a law, wherein the signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

The present invention pertains to a second computer for decoding an encrypted electromagnetic signal W encoded by a first computer with public key $N_0$=r×s, where $N_0$, r and s are integers and W is a function of r and s. The second computer comprises an input for obtaining the electromagnetic signal W from a telecommunications network, or a data network or an Internet or a first non-transient memory. The second computer comprises a second non-transient memory in communication with the input in which the signal W is stored. The second computer comprises a cpu in communication with the second non-transient memory with the signal W in the second non-transient memory. The cpu decodes the signal W by factoring the public key $N_0$ in time $O(\log^6 N_0)$ by the second computer generated steps of selecting a prime p and vector of positive integers k=[$k_0$, $k_1$, . . . , $k_{M-1}$]. There is the step of determining a polynomial v(x)=$v_0$+$v_1$x+ . . . +$v_{n-1}x^{n-1}$ such that v(p)=N is a predetermined multiple of $N_0$. There is the step of determining a $p^k$-standard polynomial A(x) such that $A(x)^2 \equiv v(x)$ ($SP_{p^k}$), where a polynomial f(x)=$f_0$+$f_1$x+$f_2 x^2$+ . . . +$f_{M-1}x^{M-1}$ is called $p^k$-standard if $$0 \leq f_i < p^{k_i}$$

for i=0,1, . . . ,M−1, a $p^k$-standard part of the polynomial f(x) is computed by reducing the coefficient of $x^i$ modulo $p^{k_i}$ and truncating all terms $x^m$ for m≥M. There is the step of determining a roster of pairs (U(x), V(x)) such that there is a persistent standard polynomial factorization:

$$(A(x)-U(x)-V(x))(A(x)+U(x)-V(x))\equiv v(x) \ (SP_{p^k})$$

where a standard polynomial factorization v(x)≡r(x)s(x) is called persistent if r(x) and s(x) have the same degree as their reductions modulo p. There is the step of determining a shared factor that integers r(p) and s(p) share with $N_0$, where the shared factor with $N_0$ as one of plurality of prime factors of $N_0$. There is the step of obtaining another prime factor by division of $N_0$ by the shared factor. There is the step of identifying the shared factor with $N_0$ as one of plurality of prime factors of $N_0$, and a quotient of $N_0$ by the shared factor as another prime factor. The cpu decrypting with the second computer the signal W with the public key $N_0$ and prime factors of the integer $N_0$. The cpu reviewing the decrypted signal W for predetermined words to determine if the decrypted signal W indicates an act has occurred or will occur that violates a law, or will violate a law, wherein the signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

The present invention pertains to a non-transitory readable storage medium which includes a computer program stored on the storage medium for decoding an encrypted electromagnetic signal W encoded by a first computer with public key $N_0$=r×s, where $N_0$, r and s are integers and W is a function of r and s, where the signal W has been stored in a second non-transient memory of a second computer, and the second computer factoring the public key $N_0$ in time $O(\log^6 N_0)$. The signal W obtained from a telecommunications network, or a data network or an Internet or a first non-transient memory. The computer program having the second computer generated steps of: selecting a prime p and vector of positive integers k=[$k_0$, $k_1$, . . . , $k_{M-1}$]. There is the step of determining a polynomial v(x)=$v_0$+$v_1$x+ . . . +$v_{n-1}x^{n-1}$ such that v(p)=N is a predetermined multiple of $N_0$. There is the step of determining a $p^k$-standard polynomial A(x) such that $A(x)^2 \equiv v(x)$ ($SP_{p^k}$), where a polynomial f(x)=$f_0$+$f_1$x+$f_2 x^2$+ . . . +$f_{M-1}x^{M-1}$ is called $p^k$-standard if $$0 \leq f_i < p^{k_i}$$

for i=0,1, . . . ,M−1, a $p^k$-standard part of the polynomial f(x) is computed by reducing the coefficient of $x^i$ modulo $p^{k_i}$ and truncating all terms $x^m$ for m≥M. There is the step of determining a roster of pairs (U(x), V(x)) such that there is a persistent standard polynomial factorization:

$$(A(x)-U(x)-V(x))(A(x)+U(x)-V(x))\equiv v(x) \ (SP_{p^k})$$

where a standard polynomial factorization v(x)≡r(x)s(x) is called persistent if r(x) and s(x) have the same degree as their reductions modulo p. There is the step of determining a shared factor that integers r(p) and s(p) share with $N_0$, where the shared factor with $N_0$ as one of plurality of prime factors of $N_0$. There is the step of obtaining another prime factor by division of $N_0$ by the shared factor. There is the step of identifying the shared factor with $N_0$ as one of plurality of prime factors of $N_0$, and a quotient of $N_0$ by the shared factor as another prime factor. There is the step of decrypting with the second computer the signal W with the public key $N_0$ and prime factors of the integer $N_0$. There is the step of reviewing the decrypted signal W for predetermined words with the second computer to determine if the decrypted signal W indicates an act has occurred or will occur that violates a law, or will violate a law, wherein the signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

BRIEF DESCRIPTION OF THE FIGURE

FIG. 2. is a flow chart of the factorization process regarding the claimed invention.

FIG. 3 is a flow chart for obtaining a public/private key pair regarding the claimed invention.

FIG. 4 is a flow chart for decoding, decrypting, and scanning electromagnetic signal W regarding the claimed invention.

THE PROBLEM

Figure 1:
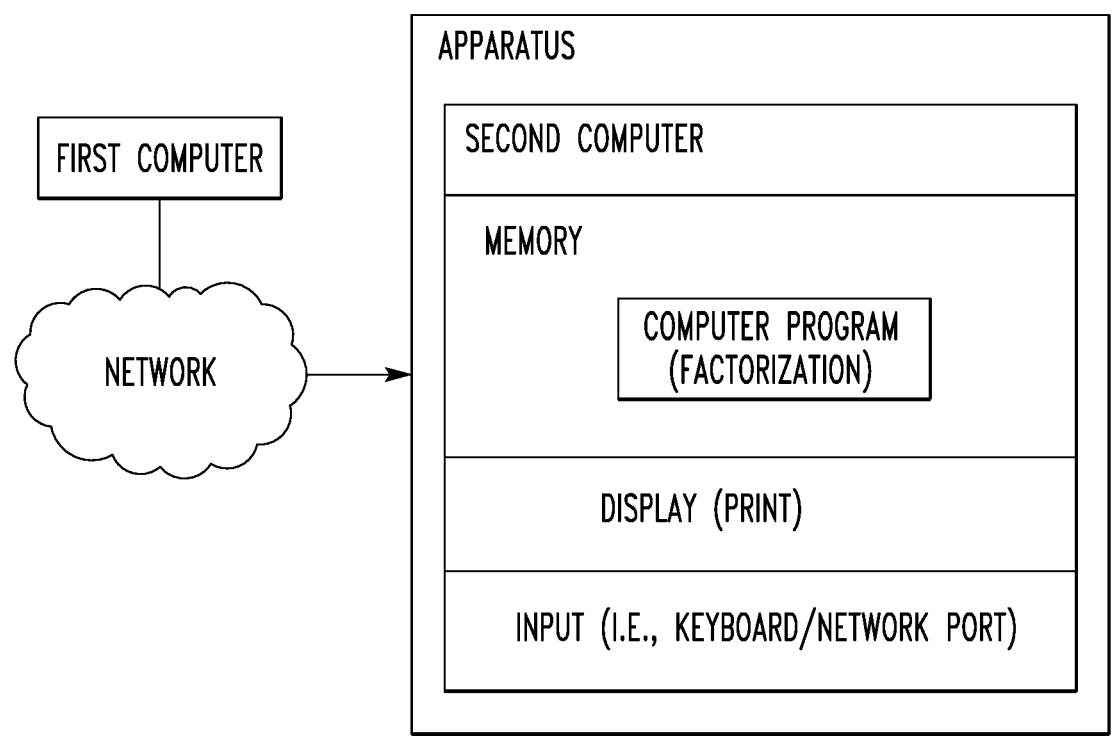
FIG. 1 is a block diagram regarding the claimed invention.

Given a positive odd integer $N_0$, it is desired to determine a pair of integers $r_0$ and $s_0$ such that $$N_0 = r_0 \cdot s_0. \tag{1}$$

The problem can also be stated as the search for two integers $Y_0$ and $X_0$ such that $Y_0 > X_0$ and $$N_0 = Y_0^2 - X_0^2. \tag{2}$$

The pairs $(r_0, s_0)$ and $(Y_0, X_0)$ are related as follows:

$$\begin{cases} Y_0 = \dfrac{r_0 + s_0}{2} \\ X_0 = \dfrac{r_0 - s_0}{2} \end{cases}. \tag{3}$$

Conversely, $$\begin{cases} r_0 = Y_0 + X_0 \\ s_0 = Y_0 - X_0 \end{cases}. \tag{4}$$

If $r_0 > s_0 > 0$, both $Y_0$ and $X_0$ are positive. In this case it is useful to consider some limit cases in order to develop an appreciation for the magnitude of the variables.

One of the limit cases occurs when the pair $(r_0, s_0)$ is a pair of "twin primes", such as (43, 41). In these cases, $$\begin{cases} X_0 = 1 \\ Y_0 = \sqrt{N_0 + 1} \end{cases}. \tag{5}$$

At the other end is the case when $r_0$ approximates $N_0$. At the limit, consider a pair $(r_0, s_0)$ equaling $(N_0, 1)$. Then $$\begin{cases} X_0 = \dfrac{N_0 - 1}{2} \\ Y_0 = \dfrac{N_0 + 1}{2} \end{cases}. \tag{6}$$

Therefore, in all cases $$\begin{cases} X_0^2 < Y_0^2 \\ 1 \le X_0^2 < \left(\dfrac{N_0 - 1}{2}\right)^2 \\ N_0 + 1 \le Y_0^2 < \left(\dfrac{N_0 + 1}{2}\right)^2 \end{cases} \tag{7}$$

Thus, in all cases, $Y_0^2 > N_0$. In some cases, $X_0^2$ is greater than $N_0$.

A Restatement

Given $N_0$ and an odd prime p, the general solution of (1) has the following form:

$$\begin{cases} r_0 = \alpha + \lambda_0 \cdot p \\ s_0 = \beta + \mu_0 \cdot p \end{cases}. \tag{8}$$

where $\alpha$, $\beta$, $\lambda_0$, and $\mu_0$ denote integers and where $\alpha \cdot \beta \equiv N_0 \pmod{p}$. If $\alpha$ and $\beta$ are both even or both odd, $\lambda_0$ and $\mu_0$ have the same parity. Otherwise, define $\beta' = \beta + p$ and $\mu'_0 = \mu_0 - 1$. Thus, without loss of generality, it is possible to define two integers $U_0$ and $V_0$ as follows:

$$\begin{cases} U_0 = \dfrac{\lambda_0 - \mu_0}{2} \\ V_0 = \dfrac{\lambda_0 + \mu_0}{2} \end{cases}. \tag{9}$$

Then $$\begin{cases} r_0 = \alpha + U_0 \cdot p + V_0 \cdot p \\ s_0 = \beta - U_0 \cdot p + V_0 \cdot p \end{cases}. \tag{10}$$

The integers $V_0$ and $U_0$ are usually referred to as the symmetric and antisymmetric components of the pair $(r_0, s_0)$, respectively. In general, in the search for $(U_0, V_0)$, all values of $\alpha$ in the interval $1 \le \alpha < p$ may need to be tested.

The complexity of the problem is reduced in the cases when $$\begin{cases} \alpha \equiv \beta \pmod{p} \\ \alpha \cdot \beta \equiv N_0 \pmod{p^2} \end{cases}. \tag{11}$$

In such cases $V_0 \equiv 0 \pmod{p}$.

In order to realize this situation, it is possible to restate the problem of factoring $N_0$ into the problem of factoring some integer N which satisfies (11). To this end, select a prime p, and let $n_0$ be the unique integer with $p^{n_0-1} < N_0 < p^{n_0}$. Select a candidate value of $\alpha$, say $\tilde{\alpha}$. Then define $\tau$ by the following:

$$N_0 \equiv \tau \cdot \tilde{\alpha}^2 \pmod{p^2}. \tag{12}$$

Let $\tilde{\tau}$ denote the least positive residue of (12). Then $\beta \equiv \tilde{\tau} \cdot \tilde{\alpha} \pmod{p}$. If $\tilde{\tau}$ is odd, define the integer N by the following $$N = \tilde{\tau} \cdot N_0 \tag{13}$$

where, for some integer n, $p^{n-1} < N < p^n$. Then N is a quadratic residue modulo p and $$N \equiv \tilde{\tau}^2 \cdot \tilde{\alpha}^2 \pmod{p}. \tag{14}$$

Note that now there is a factorization $N = r \cdot s$, with $r \equiv s \pmod{p}$, namely $r = \tilde{\tau} r_0$ and $s = s_0$. There exist unique integers U and V such that $$\begin{cases} r = \tilde{\tau} \cdot \tilde{\alpha} + U \cdot p + V \cdot p^2 \\ s = \tilde{\tau} \cdot \tilde{\alpha} - U \cdot p + V \cdot p^2 \end{cases}, \tag{15}$$

where $$\begin{cases} r = \tilde{r} \cdot r_0 \\ s = s_0 \end{cases} \quad (16)$$

Notice that, if $U>0$, $r>s$.
In the case of (15), it will be $$\begin{cases} Y = \tilde{\tau} \cdot \tilde{\alpha} + V \cdot p^2 \\ X = U \cdot p. \end{cases} \quad (17)$$

Also, since $\tilde{\tau}$ is odd, $$\begin{cases} Y = \dfrac{\tilde{\tau} \cdot r_0 + s_0}{2} \\ X = \dfrac{\tilde{\tau} \cdot r_0 - s_0}{2} \end{cases}. \quad (18)$$

The factorization problem requires the identification of a pair $(\tilde{U}, \tilde{V})$ such that, for the corresponding $(\tilde{r}, \tilde{s})$, it is $$N = \tilde{r} \cdot \tilde{s}. \quad (19)$$

In general, all the values of $\alpha$ should be tested.
Consider the expression of Y when $\tilde{A}$ is used in lieu of $\tilde{\tau} \cdot \tilde{\alpha}$:

$$Y = \tilde{\tau} \cdot \tilde{\alpha} + V \cdot p^2 \quad (20)$$
$$= \tilde{A} + V_1 \cdot p^2$$

for some integer $V_1$. Recall that, by (7), $$\sqrt{N} < Y < N. \quad (21)$$

There are two significant particular cases: if $\tilde{A} < \sqrt{N}$, then $V_1 > 0$. Also, if $\tilde{A} > N$, then $V_1 < 0$. Throughout this presentation, $\tilde{A}$ will be greater than N. For simplicity of notation, the integer V will be constrained to be positive. Then (15) takes the following form:

$$\begin{cases} \tilde{A} > N \\ r = \tilde{A} + U \cdot p - V \cdot p^2 \\ s = \tilde{A} - U \cdot p - V \cdot p^2 \end{cases}. \quad (22)$$

A particular definition of N can be produced when $\tilde{\tau}$ is computed modulo $p^{n_0}$. In this presentation, without loss of generality, it will be assumed that $\tilde{\tau}$ is a positive odd integer, and so $N = \tilde{\tau} N_0$ is an odd quadratic residue modulo p.

A Note on the Representation of N

Given $p^{n-1} \leq N < p^n$, where N is a quadratic residue modulo p, let $$N = \sum_{i=0}^{n-1} v_i \cdot p^i, \quad (23)$$

where $\{v_i\}$ denote integers, and $0 \leq v_i < p$.

It is desired to compute a solution of the following:

$$N \equiv A^2 \pmod{p^n} \quad (24)$$

where $$A \equiv \sum_{i=0}^{n-1} a_i \cdot p^i \pmod{p^n}, \quad (25)$$

and where $$0 \leq \alpha_i < p. \quad (26)$$

Subject to (26), the solution of (24) is provided by the following:

$$\begin{cases} v_0 \equiv a_0^2 & \pmod{p} \\ v_1 \equiv 2 \cdot a_0 \cdot a_1 + \dfrac{a_0^2 - v_0}{p} & \pmod{p} \\ v_2 \equiv 2 \cdot a_0 \cdot a_1 + a_1^2 + \dfrac{RH_1 - LH_1}{p} & \pmod{p} \\ \ldots \\ v_i \equiv \sum_{k=0}^{i} a_k \cdot a_{i-k} + \dfrac{RH_{i-1} - LH_{i-1}}{p} & \pmod{p} \\ \ldots \\ v_{n-1} \equiv \sum_{k=0}^{n-1} a_k \cdot a_{n-k} + \dfrac{RH_{n-2} - LH_{n-2}}{p} & \pmod{p} \end{cases}, \quad (27)$$

where $RH_i$ and $LH_i$ denote the RHS and LHS, respectively, of the congruence containing $v_i$.
The terms $(RH_i - LH_i)/p$ are usually referred to as carries. They are caused by the constraint (26) and flow from the less significant digits to the more significant ones. As an example, consider the problem of solving $$N \equiv A^2 \pmod{p^5}, \quad (28)$$

where N is a quadratic residue modulo p. Assume $p=13$ and $$N = \sum_{i=0}^{4} v_i \cdot p^i \quad (29)$$
$$= 10 + 2 \cdot p + 10 \cdot p^2 + 5 \cdot p^3 + 0 \cdot p^4$$
$$= 12711.$$

If $0 \leq \alpha_i < p$, a solution of (28), say $\tilde{A}$, can be represented as follows:

$$\tilde{A} = 6 + 0 \cdot p + 3 \cdot p^2 + 10 \cdot p^3 + 5 \cdot p^4. \quad (30)$$

A second solution of (28) occurs when $\tilde{\alpha}_0 = 6$ is replaced by $\overline{\alpha}_0 = p - \tilde{\alpha}_0 = 7$. In this case $$\overline{A} = 7 + 12 \cdot p + 9 \cdot p^2 + 2 \cdot p^3 + 7 \cdot p^4. \quad (31)$$

Consider removing the magnitude constraints (26) from all $\alpha_i$ and representing A as $$A = \omega_0 + \omega_1 \cdot p + \omega_2 \cdot p^2 + \omega_3 \cdot p^3 + \omega_4 \cdot p^4 \pmod{p^5}, \quad (32)$$

where the coefficients of any power of p are positive integers and are constrained by the following conditions:

$$0 \leq \omega_i < p^{n-i}. \quad (33)$$

Then the congruence (28) can be satisfied if the sum of the coefficients of any power of p, say $p^i$, is congruent to zero modulo $p^{5-i}$. Specifically, in the example, it must be $$\begin{cases} v_0 \equiv \omega_0^2 & (\bmod\ p^5) \\ v_1 \cdot p \equiv 2 \cdot \omega_0 \cdot \omega_1 \cdot p & (\bmod\ p^5) \\ v_2 \cdot p^2 \equiv \omega_1^2 \cdot P^2 + 2 \cdot \omega_0 \cdot \omega_2 \cdot p^2 & (\bmod\ p^5) \\ v_3 \cdot p^3 \equiv 2 \cdot \omega_1 \cdot \omega_2 \cdot p^3 + 2 \cdot \omega_0 \cdot \omega_3 \cdot p^3 & (\bmod\ p^5) \\ v_4 \cdot p^4 \equiv \omega_2^2 \cdot p^4 + 2 \cdot \omega_1 \cdot \omega_3 \cdot p^4 + 2 \cdot \omega_0 \cdot \omega_4 & (\bmod\ p^5) \end{cases} \quad (34)$$

In the example, consider the condition $$10 \equiv \omega_0^2 \ (\bmod\ p^5) \quad (35)$$

For $\omega_0 \equiv 6\ (\bmod\ p)$, the least positive solution, say $\tilde{\omega}_0$, is $\tilde{\omega}_0 = 181200$. For $\omega_0 \equiv p-6 \equiv 7\ (\bmod\ p)$, it is $\overline{\omega}_0 = 190043$. To satisfy the second of (34) when $\tilde{\omega}_0 = 181200$, it must be $$2 \cdot p \equiv 2 \cdot \tilde{\omega}_0 \cdot \omega_1 \cdot p \ (\bmod\ p^5). \quad (36)$$

The least positive solution, say $\tilde{\omega}_1$, is $\tilde{\omega}_1 = 18120$.
Thereafter, from the third of (34), let $$10 \cdot p^2 \equiv (\tilde{\omega}_1^2 + 2 \cdot \tilde{\omega}_0 \cdot \tilde{\omega}_2) \cdot p^2 \ (\bmod\ p^5), \quad (37)$$

whence $\tilde{\omega}_2 = 1814$. Likewise, from the fourth of (34), let $$5 \cdot p^3 \equiv 2 \cdot \tilde{\omega}_1 \cdot \tilde{\omega}_2 \cdot p^3 + 2 \cdot \omega_0 \cdot \omega_3 \cdot p^3 \ (\bmod\ p^5), \quad (38)$$

whence $\tilde{\omega}_3 = 97$. Finally, from the fifth of (34), let $$0 \cdot p^4 \equiv \omega_2^2 \cdot p^4 + 2 \omega_1 \cdot \omega_3 p^4 + 2\omega_0 \cdot p^4 \ (\bmod\ p^5), \quad (39)$$

whence $\tilde{\omega}_4 = 12$. Then $$N \equiv (181200 + 18120 \cdot p + 1814 \cdot p^2 + 97 \cdot p^3 + 12 \cdot p^4)^2 \ (\bmod\ p^5) \quad (40)$$

Proceeding in a similar fashion with $\overline{\omega}_0 = 190093$, it is $$N \equiv (190093 + 10441 \cdot p + 383 \cdot p^2 + 72 \cdot p^3 + 1 \cdot p^4)^2 \ (\bmod\ p^5) \quad (41)$$

Comparison of the resulting $\tilde{\omega}_i$ with the corresponding $\overline{\omega}_i$ yields $$\begin{cases} \omega_i + \overline{\omega}_i = p^{5-i} \\ 0 < \omega_i < p^{5-i} \end{cases} \quad (42)$$

or $$(\omega_i + \overline{\omega}_i) \cdot p^i = p^5. \quad (43)$$

Thus, in the example, $$\begin{aligned} 181200 + 190093 &= p^5 \\ 18120 + 10441 &= p^4 \\ 1814 + 383 &= p^3 \\ 97 + 72 &= p^2 \\ 12 + 1 &= p \end{aligned} \quad (44)$$

and $$\tilde{A} + \overline{A} = 5 \cdot p^5. \quad (45)$$

Notice that, when $\tilde{A}$ and $\overline{A}$ are subject to the constraint (26), as in (40) and (31), their sum equals $5p^5$.

Comparing the representations of $\tilde{A}$ of (40) and (30), it can be stated that the representation proposed by (40) entails an equipartition of weight among the 5 degrees of freedom of (32).

Remark 1. In the example, each coefficient $\tilde{\omega}_i$ of $\tilde{A}$ is computed modulo $p^{5-i}$. If the magnitude constraint (26) were to be applied to the coefficients on the RHS of (40) and (41), the coefficients $\omega_i$ would be reduced modulo p and the structure (34) would be demolished.

In practice, the integer N, as represented on the RHS of (40) and (41), should be treated as a polynomial in some integer variable u, say P(u), where P(u) happens to be computed at u=p.

Remark 2. In (32) the representation of the coefficients $\omega_i$ i is arbitrary. In (40) and (41) such coefficients are represented in base 10. They may be represented in any other base, such as p.

Remark 3. It should be noted that in (28) $p^4 < N < p^5$ and in (32) A is being defined modulo $p^5$. In general, such may not be the case. It is possible that A be defined modulo a larger power of p, depending on the requirements of the problem on hand. A similar situation occurs in the domain of irrational numbers, such as $\sqrt{2}$. $\sqrt{2}$ may be computed with a large number of decimal digits, depending on the precision required by the problem on hand. No harm is done if the precision of the computed value of $\sqrt{2}$ is greater than needed.

As an example, consider the case when p=13 and $N_1 < p^2$. Assume that $N_1 = v_0 + v_1 \cdot p = 10 + 2 \cdot p$. It is desired to solve $$N_1 \equiv A^2 \ (\bmod\ p^5). \quad (46)$$

In this case the integers $\omega_i$ are defined by the following:

$$\begin{cases} v_0 \equiv \omega_0^2 & (\bmod\ p^s) \\ v_1 \cdot p \equiv 2 \cdot \omega_0 \cdot \omega_1 \cdot P & (\bmod\ p^5) \\ 0 \equiv \omega_1^2 \cdot p^2 + 2 \cdot \omega_0 \cdot \omega_z \cdot p^2 & (\bmod\ p^5) \\ 0 \equiv 2 \cdot \omega_1 \cdot \omega_2 \cdot p^3 + 2 \cdot \omega_0 \cdot \omega_3 \cdot p^3 & (\bmod\ p^5) \\ 0 \equiv 2 \cdot \omega_1 \cdot \omega_3 \cdot p^4 + 2 \cdot \omega_0 \cdot \omega_4 \cdot p^4 + \omega_2^2 \cdot p^4 & (\bmod\ p^5) \end{cases} \quad (47)$$

For $\omega_0 \equiv 6\ (\bmod\ p)$, the result is $$N_1 = 10 + 2 \cdot p \quad (48)$$

$$\equiv (181200 + 18120 \cdot p + 1291 \cdot p^2 + 23 \cdot p^3 + 2 \cdot p^4)^2 \ (\bmod\ p^5).$$

Compare with (40).

Remark 4. As a further application of this method of representation of integers, consider the problem of computing $\tilde{A}^{-1}\ (\bmod\ p^5)$ when $\tilde{A}$ is defined as in (32). Let $$\tilde{A}^{-1} \equiv w_0 + w_1 \cdot p + w_2 \cdot p^2 + w_3 \cdot p^3 + w_4 \cdot p^4 \ (\bmod\ p^5) \quad (49)$$

and $$\tilde{A} \cdot \tilde{A}^{-1} \equiv 1 \ (\bmod\ p^5) \quad (50)$$

The coefficients $w_i$ should be defined as the least positive solutions of the following:

$$\begin{cases} \tilde{\omega}_0 \cdot w_0 & \equiv 1\ (\bmod\ p^5) \\ \tilde{\omega}_0 \cdot w_1 + \tilde{\omega}_1 \cdot \tilde{w}_0 & \equiv 1\ (\bmod\ p^4) \\ \tilde{\omega}_0 \cdot w_2 + \tilde{\omega}_1 \cdot \tilde{w}_1 + \tilde{\omega}_2 \cdot \tilde{w}_0 & \equiv 0\ (\bmod\ p^3) \\ \tilde{\omega}_0 \cdot w_3 + \tilde{\omega}_1 \cdot \tilde{w}_2 + \tilde{\omega}_2 \cdot \tilde{w}_1 + \tilde{\omega}_3 \cdot \tilde{w}_0 & \equiv 0\ (\bmod\ p^2) \\ \tilde{\omega}_0 \cdot w_4 + \tilde{\omega}_1 \cdot \tilde{w}_3 + \tilde{\omega}_2 \cdot \tilde{w}_2 + \tilde{\omega}_3 \cdot \tilde{w}_1 + \tilde{\omega}_4 \cdot \tilde{w}_0 & \equiv 0\ (\bmod\ p) \end{cases} \quad (51)$$

In the example, $\tilde{A}^{-1} \equiv 18120 + 26749 \cdot p + 1590 \cdot p^2 + 73 \cdot p^3 + 9 \cdot p^4 \pmod{p^5}$. The product $\tilde{A} \cdot \tilde{A}^{-1}$ also contains the following terms:

$$\begin{cases} (\omega_1 \cdot w_4 + \omega_2 \cdot w_3 + \omega_3 \cdot w_2 + \omega_4 \cdot w_1) \cdot p^5 & = 347391 \cdot p^5 \\ (\omega_2 \cdot \tilde{w}_4 + \tilde{\omega}_3 \cdot \tilde{w}_3 + \tilde{\omega}_4 \cdot \tilde{w}_z) \cdot p^6 & = 15478 \cdot p^6 \\ (\tilde{\omega}_3 \cdot \tilde{w}_4 + \tilde{\omega}_4 \cdot \tilde{w}_3) \cdot p^7 & = 353 \cdot p^7 \\ \tilde{\omega}_4 \cdot \tilde{w}_4 \cdot p^8 & = 18 \cdot p^8. \end{cases} \quad (52)$$

Supercongruences

This section summarizes the approach of U.S. Pat. No. 10,298,393 B1. This is generalized and improved upon via standard polynomials later.

Given p and N, select $\tilde{A}$ as one of the solutions of (24) modulo $p^n$, computed using the procedure described in Section 7. Assume $\tilde{A} > p^n$.

Then, using (26), let $$N = \tilde{A}^2 U^2 \cdot p^2 - 2 \cdot \tilde{A} \cdot V \cdot p^2 + V^2 \cdot p^4, \quad (53)$$

where $$\begin{cases} \tilde{A} = \sum_{i=0}^{n-1} \tilde{\omega}_i \cdot p^i \\ U = \sum_{i=1}^{n-1} u_i \cdot p^{i-1} \\ V = \sum_{i=1}^{n-1} v_i \cdot p^{i-2} \end{cases} \quad (54)$$

Referring to (40), recall that each $\omega_i$ can be represented as $$\omega_i = \sum_{k=0}^{n-1-i} \omega_{i,k} \cdot p^k. \quad (55)$$

Also, $$\begin{cases} u_i = \sum_{k=1}^{n-1-i} u_{i,k} \cdot p^{k-1} \\ v_i = \sum_{k=1}^{n-1-i} v_{i,k} \cdot p^{k-2} \end{cases} \quad (56)$$

and $$\begin{cases} U_{i,j} = \sum_{k=1}^{j} u_{i,j} \cdot p^{k-1} \\ V_{i,j} = \sum_{k=1}^{j} v_{i,k} \cdot p^{k-2} \end{cases} \quad (57)$$

Then $$\begin{cases} r \equiv \tilde{A} + u_1 \cdot p + (-v_2 + u_2) \cdot p^2 + (-v_3 + u_3) \cdot p^3 + \ldots + (-v_{n-1} + u_{n-1}) \cdot p^{n-1} \pmod{p^n} \\ s \equiv \tilde{A} - u_1 \cdot p + (-v_2 - u_2) \cdot p^2 + (-v_3 - u_3) \cdot p^3 + \ldots + (-v_{n-1} - u_{n-1}) \cdot p^{n-1} \pmod{p^n} \end{cases} \quad (58)$$

The representation (58) of r and s accounts for the fact that both r and s are smaller than $p^n$. However, using (58), the product of r by s contains powers of p greater than $p^n$, actually as high as $p^{2 \cdot n - 2}$.

In order to uncover the properties which relate the coefficients of (58), it is necessary to compute, and represent without loss of information, the multiples of any $p^i$ which results from the multiplication of r and s. To this end a new modulus is introduced, namely $p^M$, where $M > n$. The use of M does not affect the magnitude of N. If $N < p^n$, it can be represented as follows:

$$\begin{cases} N = \sum_{i=0}^{n-1} v_i \cdot p^i \\ v_i = 0 \text{ for } n - 1 < i \le M - 1 \end{cases} \quad (59)$$

When M is employed in lieu of n, $\tilde{A}$ should be computed as a solution of the following:

$$N \equiv A^2 \pmod{p^M}. \quad (60)$$

The Approach

In the case where (59) is employed, reduction of (58) modulo $p^3$ yields $$\frac{N - \tilde{A}^2}{p^M} \cdot p^M \equiv \left(-u_1^2 - 2 \cdot \tilde{A} \cdot v_2\right) \cdot p^2 \pmod{p^3}. \quad (61)$$

Then, if the pair $(\tilde{u}_1, \tilde{v}_2)$ is a solution of (61) modulo p, it is $$\frac{N - \tilde{A}^2}{p^M} \cdot p^M + \left(\frac{\tilde{u}_1^2 + 2 \cdot \tilde{A} \cdot \tilde{v}_2}{p} \cdot p\right) \cdot p^2 \equiv \quad (62)$$
$$\left(-2 \cdot \tilde{u}_1 \cdot u_2 - 2 \cdot \tilde{A} \cdot v_3\right) \cdot p^3 \pmod{p^4}$$

The LHS of this congruence contains a contribution to the set of multiples of $p^3$. This contribution is usually denoted as a "carry". The flow of carries from one digit to the higher powers of p increases the complexity of the factorization problem. The flow of carries would be controlled better if (61) were solved modulo $p^M$ and the pair $(u_1^2, v_2)$ were defined modulo $p^{M-2}$. In this case (62) could take the following form:

$$\frac{N - \tilde{A}^2}{p^M} \cdot p^M + \left(\frac{\tilde{u}_1^2 + 2 \cdot \tilde{A} \cdot \tilde{v}_2}{p^{M-2}} \cdot p^{M-2}\right) \cdot p^2 \equiv \quad (63)$$
$$\left(-2 \cdot \tilde{u}_1 \cdot u_2 - 2 \cdot \tilde{A} \cdot v_3\right) \cdot p^3 \pmod{p^4}$$

This approach would require replacing the magnitude constraints (25) from the elements of $\{u_i\}$ and $\{v_i\}$ and assuring that the RHS of congruences such as (63) include all the terms which are multiples of any given $p^i$. Following this procedure, still there would be carries, as shown on the LHS of (63). However, such carries would flow from any given congruence directly into a pool of multiples of $p^M$.

when $\tilde{A}$ is represented as described in Section 7. The second summation on the LHS results from $(\tilde{A}-Y)^2$.

In general, assume that $u_{M-j}=0$ for $1 \leq j \leq j_0$. Therefore, at this point, $j_0$ is an undetermined integer. The pair $(r, s)$ is dependent on the set $\{u_i\}$ and on the first elements of $\{v_i\}$, for $2 \leq i \leq j_0+1$. The general expression of $(r, s)$ is $$\begin{cases} r = \tilde{\omega}_0 + \tilde{\omega}_1 \cdot p + \tilde{u}_1 \cdot p + \sum_{i=2}^{j_0} \zeta_i \cdot p^i + \zeta_{j_0+1} \cdot p^{j_0+1} + 2 \cdot \sum_{i=2}^{j_0} \tilde{u}_i \cdot p^i \cdot 2 \sum_{i=j_0+1}^{M-j_0-1} u_i \cdot p^i \\ s = \tilde{\omega}_0 + \tilde{\omega}_1 \cdot p - \tilde{u}_1 \cdot p + \sum_{i=2}^{j_0} \zeta_i \cdot p^i + \zeta_{j_0+1} \cdot p^{j_0+1} \end{cases} \quad (68)$$

In this approach, quantities such as $\tilde{A}^2-N$ are treated as polynomials in p, where the coefficients are integers unconstrained by (26) but instead subject to a different constraint such as (33).

Consider the representation of the pair $(r, s)$ as in (58), where $\tilde{A}$ is constructed as described above, and M is used in lieu of n. Thus, when r is multiplied by s, it is possible to group all the terms which contain any multiple of any given power of p, say $p^i$, and place the condition that the sum of their coefficients be congruent to zero modulo $p^{M-i}$.

However, resolving the integer $\tilde{A}^2-N$ into its components, the sum of the coefficients of $p^i$ in $(\tilde{A}^2-N)$ equals $$\sum_{k=0}^{i} \tilde{\omega}_k \cdot \tilde{\omega}_{i-k} - v_i \equiv 0 \pmod{p^{M-i}} \quad (64)$$

$$= \tilde{n}_i \cdot p^{M-i}.$$

($n_i$ an integer).

As a result, consider the case when it is desired to express $v_6$ as a function of all the $u_l$ ($1 \leq l \leq 5$) and the $v_j$ ($2 \leq j \leq 5$). It will be $$-(2 \cdot \tilde{\omega}_0 \cdot v_6 + 2 \cdot \tilde{\omega}_1 \cdot v_5 + 2 \cdot \tilde{\omega}_2 \cdot v_4 + 2 \cdot \tilde{\omega}_3 \cdot v_3 + 2 \cdot \tilde{\omega}_4 \cdot v_2) + 2 \cdot v_2 \cdot v_4 + v_3^2 \equiv 2 \cdot u_1 \cdot u_5 + 2 \cdot u_2 \cdot u_4 + u_3^2 \pmod{p^{M-6}}. \quad (65)$$

This congruence defines $v_6$ modulo $p^{M-6}$ as a function of lesser degree variables. If $u_1 \not\equiv 0 \pmod{p}$ and if all variables of lesser degree are known, (65) defines a linear congruence between $v_6$ and $u_5$ modulo $p^{M-6}$. After determination of $v_6$, upon multiplication by $p^6$, it will be $$\left(\frac{LH_6 - RH_6}{p^{M-6}} \cdot p^{M-6}\right) \cdot p^6 \equiv 0 \pmod{p^M}, \quad (66)$$

where $LH_6$ and $RH_6$ denote the LHS and RHS of (65), respectively. The LHS of this latter congruence is a multiple of $p^M$ and does not contain any power of p greater than $p^M$. In general, for $2 \leq i \leq M-1$, $$\begin{cases} u_1 \not\equiv 0 \pmod{p} \\ 2 \leq i \leq M-1 \\ -2 \cdot \sum_{k=2}^{i} \tilde{\omega}_{i-k} \cdot v_k + \sum_{\kappa=2}^{i-2} v_k \cdot v_{i-k} \equiv \sum_{k=1}^{i-1} u_k \cdot u_{i-k} \pmod{p^{M-i}}. \end{cases} \quad (67)$$

The first summation on the LHS of (67) contains terms which result from the multiplication of $-2 \cdot \tilde{A}$ by $(\tilde{A}-Y)$, where $$\zeta_k = \tilde{\omega}_k - v_k - u_k. \quad (69)$$

Supercongruence for $u_1$ and $u_2$

To determine the first two coefficients of U, impose the condition that $u_{M-1}=0$ and $$\omega_i - u_i - v_i \equiv 0 \pmod{p^{M-i}}$$

for all $i>2$, also put $\zeta_2 = \omega_2 - u_2 - v_2$. Then

Consider the case when it has been assumed that $u_{M-1}=0$. It is desired to determine a pair of divisors $(r, s)$ when $u_{M-2} \neq 0$, if such a pair exists. In this case (68) can be written as follows:

$$\begin{cases} u_{M-1} = 0 \\ r = \tilde{A}_2 + u_1 \cdot p + (-v_2 + u_2) \cdot p^2 \\ s = \tilde{A}_2 - u_1 \cdot p + (-v_2 + u_2) \cdot p^2 - 2 \cdot \sum_{i=3}^{M-2} u_i \cdot p^i \end{cases} \quad (70)$$

where $$\tilde{A}_2 = \tilde{\omega}_0 + \tilde{\omega}_1 \cdot p + \tilde{\omega}_2 \cdot p^2 \quad (71)$$

and $$\begin{cases} u_{M-1} = 0 \\ r = \tilde{A}_1 + u_1 \cdot p + \zeta_2 \cdot p^2 + 2 \cdot \sum_{i=2}^{M-2} u_i \cdot p^i \\ s = \tilde{A}_1 - u_1 \cdot p + \zeta_2 \cdot p^2 \end{cases} \quad (72)$$

where $$\tilde{A}_1 = \tilde{\omega}_0 + \tilde{\omega}_1 \cdot p \quad (73)$$

and where $\zeta_2$ is defined as in (69):

$$\begin{cases} u_{M-1} = 0 \\ u_{M-2} \neq 0 \\ \zeta_2 = \omega_2 - v_2 - u_2. \end{cases} \quad (74)$$

Compare with (68) and (69).

Using (72), multiply r by s modulo $p^M$. Setting the sum of the coefficients of any given power of p congruent to zero $\pmod{p^{M-i}}$ yields $$\begin{cases} v_0 \equiv \tilde{\omega}_0^2 \pmod{p^M} \\ v_1 \equiv 2 \cdot \tilde{\omega}_0 \cdot \tilde{\omega}_1 \pmod{p^{M-1}} \\ v_2 \equiv -u_1^2 + \tilde{\omega}_1^2 + 2 \cdot \tilde{\omega}_0 \cdot \zeta_2 + 2 \cdot \tilde{\omega}_0 \cdot u_2 \pmod{p^{M-2}} \\ v_3 \equiv 2 \cdot \tilde{\omega}_0 \cdot u_3 + 2 \cdot (\tilde{\omega}_1 - u_1) \cdot u_2 + 2 \cdot \tilde{\omega}_1 \cdot \zeta_2 \pmod{p^{M-3}} \\ v_4 \equiv 2 \cdot \tilde{\omega}_0 \cdot u_4 + 2 \cdot (\tilde{\omega}_1 - u_1) \cdot u_3 + 2 \cdot \zeta_2 \cdot u_2 + \zeta_2^2 \pmod{p^{M-4}} \\ \text{for } i > 4 \\ v_i \equiv 2 \cdot \tilde{\omega}_0 \cdot u_2 + 2 \cdot (\tilde{\omega}_i - u_i) \cdot u_{i-1} + 2 \cdot \zeta_2 \cdot u_{i-2} \pmod{p^{M-i}} \\ \ldots \ldots \ldots \ldots \ldots \ldots \ldots \\ v_{M-2} \equiv 2 \cdot \tilde{\omega}_0 \cdot u_{M-2} + 2 \cdot (\tilde{\omega}_1 - u_1) \cdot u_{M-3} + 2 \cdot \zeta_2 \cdot u_{M-4} \pmod{p^2} \\ v_{M-1} \equiv 2 \cdot (\tilde{\omega}_1 - u_1) \cdot u_{M-2} + 2 \cdot \zeta_2 \cdot u_{M-3} \pmod{p} \end{cases} \quad (75)$$

Let $RH_i$ and $LH_i$ denote the RHS and the LHS, respectively, of that congruence in (75) which is defined modulo $p^{M-i}$. Then, it must be $$RH_i - LH_i \equiv 0 \pmod{p^{M-i}} \quad (76)$$

Define $$C_i = \frac{RH_i - LH_i}{p^{M-i}} \quad (77)$$

There is one condition which is not contained in (75): that is the condition that the sum of all multiples of $p^M$ in the system be equal to zero:

$$0 = \sum_{i=0}^{M-1} C_i. \quad (78)$$

Refer to (72).

In this equation the integer $u_{M-2}$ is defined modulo $p^2$ by the second last congruence of (75). Also in the computation of $C_{M-1}$, the integers $u_{M-2}$ and $u_{M-3}$ equal the corresponding values in the second last congruence of (75). The set of congruences (75) shall be referred as a supercongruence.

Supercongruence for $u_3$

Consider the case when, given M, the system (75) has produced a set of viable pairs $(u_1, u_2)$. In general, the majority of such pairs do not satisfy the conditions on the carries and cannot be considered as viable candidates.

Given a selection of $u_1$, upon multiplication of r by s, the following relationships are applicable:

$$u_{M-1} = 0$$

$$v_0 \equiv \omega_0^2 \pmod{p^M}$$

$$v_1 \equiv 2 \cdot \omega_0 \cdot \omega_1 \pmod{p^{M-1}}$$

$$v_2 \equiv 2 \cdot \omega_0 \cdot \omega_2 + \omega_1^2 - u_1^2 - 2 \cdot \omega_0 \cdot v_2 \pmod{p^{M-2}}$$

$$\equiv \omega_1^2 - u_1^2 + 2 \cdot \omega_0 \cdot \zeta_2 + 2 \cdot \omega_0 \cdot u_2 \pmod{p^{M-2}}.$$

Given $u_1$, this congruence produces $v_2$ modulo $p^{M-2}$. The last congruence makes use of the definition $$\zeta_2 = \tilde{\omega}_2 - v_2 - u_2 \pmod{p^{M-2}}.$$

Given a selection of $u_2$, $$v_3 \equiv 2 \cdot \omega_0 \cdot \omega_3 + 2 \cdot \omega_1 \cdot \omega_2 - 2 \cdot u_1 \cdot u_2 - 2 \cdot \omega_1 \cdot v_2 - 2 \cdot \omega_0 \cdot v_3 \pmod{p^{M-3}}$$

$$\equiv 2 \cdot \tilde{\omega}_0 \cdot u_3 + 2 \cdot (\tilde{\omega}_1 - u_1) \cdot u_2 + 2 \cdot \tilde{\omega}_1 \cdot \zeta_2 + 2 \cdot \tilde{\omega}_0 \cdot \zeta_3 \pmod{p^{M-3}}$$

Given $u_2$, this congruence produces $v_3$ modulo $p^{M-3}$. The last congruence makes use of the definition $$\zeta_3 = \tilde{\omega}_3 - v_3 - u_3 \pmod{p^{M-3}}.$$

Given a selection of the auxiliary variable $u_3$, let $$v_4 \equiv 2 \cdot \omega_0 \cdot \omega_4 + 2 \cdot \omega_1 \cdot \omega_3 + \omega_2^2 - 2 \cdot u_1 \cdot u_3 - u_2^2 - 2 \cdot \omega_2 \cdot v_2 - 2 \cdot \omega_1 \cdot v_3 + v_2^2 - 2 \cdot \omega_0 \cdot v_4 \pmod{p^{M-4}}$$

Given $u_3$, this congruence produces $v_4$ modulo $p^{M-4}$. Multiplication of r by s produces $$v_5 \equiv 2 \cdot \omega_0 \cdot u_5 + 2 \cdot (\omega_1 - u_1) \cdot u_4 + 2 \cdot \zeta_2 \cdot u_3 + 2 \cdot \zeta_3 \cdot u_2 + 2 \cdot \zeta_2 \cdot \zeta_3 \pmod{p^{M-5}}$$

$$v_6 \equiv 2 \cdot \omega_0 \cdot u_6 + 2 \cdot (\omega_1 - u_1) \cdot u_5 + 2 \cdot \zeta_2 \cdot u_4 + 2 \cdot \zeta_3 \cdot u_3 + \zeta_3^2 \pmod{p^{M-6}}$$

For $i > 6$, it will be $$v_7 \equiv 2 \cdot \omega_0 \cdot u_7 + 2 \cdot (\omega_1 - u_1) \cdot u_6 + 2 \cdot \zeta_2 \cdot u_5 + 2 \cdot \zeta_3 \cdot u_4 \pmod{p^{M-7}}$$

$$v_i \equiv 2 \cdot \omega_0 \cdot u_i + 2 \cdot (\omega_1 - u_1) \cdot u_{i-1} + 2 \cdot \zeta_2 \cdot u_{i-2} + 2 \cdot \zeta_3 \cdot u_{i-3} \pmod{p^{M-i}}$$

with, finally:

$$v_{M-3} \equiv 2 \cdot \omega_0 \cdot u_{M-3} + 2 \cdot (\omega_1 - u_1) \cdot u_{M-4} + 2 \cdot \zeta_2 \cdot u_{M-5} + 2 \cdot \zeta_3 \cdot u_{M-6} \pmod{p^3}$$

$$v_{M-2} \equiv 2 \cdot (\omega_1 - u_1) \cdot u_{M-3} + 2 \cdot \zeta_2 \cdot u_{M-4} + 2 \cdot \zeta_3 \cdot u_{M-5} \pmod{p^2}$$

$$v_{M-1} \equiv 2 \cdot \zeta_2 \cdot u_{M-3} + 2 \cdot \zeta_3 \cdot u_{M-4} \pmod{p}$$

IN SUMMARY, given $(u_1, u_2)$ and the selection of $u_3$, IF the pair (r, s) is represented as follows:

$$\begin{cases} u_{M-1} = 0 \\ u_{M-2} = 0 \\ r = \tilde{A}_1 + \tilde{u}_1 \cdot p + \zeta_2 \cdot p^2 + \zeta_3 \cdot p^3 + 2 \cdot \tilde{u}_2 \cdot p^2 + 2 \cdot \sum_{i=2}^{M-4} u_i \cdot p^i \\ s = \tilde{A}_1 + \tilde{u}_1 \cdot p + \zeta_2 \cdot p^2 + \zeta_3 \cdot p^3 \pmod{p}, \end{cases} \quad (79)$$

multiplication of r by s modulo $p^M$ yields:

$$\begin{cases} u_{M-2} = 0 \\ u_{M-1} = 0 \\ v_0 \equiv \bar{\omega}_0^2 (\bmod\, p^M) \\ v_1 \equiv 2 \cdot \bar{\omega}_0 \cdot \bar{\omega}_1 (\bmod\, p^{M-1}) \\ v_2 \equiv \bar{\omega}_1^2 - u_1^2 + 2 \cdot \bar{\omega}_0 \cdot \zeta_2 + 2 \cdot \bar{\omega}_0 \cdot u_2 (\bmod\, p^{M-2}) \\ v_3 \equiv 2 \cdot \bar{\omega}_0 \cdot u_3 + 2 \cdot (\bar{\omega}_1 - u_1) \cdot u_2 + 2 \cdot \bar{\omega}_1 \cdot \zeta_2 + 2 \cdot \bar{\omega}_0 \cdot \zeta_3 (\bmod\, p^{M-3}) \\ v_4 \equiv 2 \cdot \omega_0 \cdot u_4 + 2 \cdot (\omega_1 - u_1) \cdot u_3 + 2 \cdot \zeta_2 \cdot u_2 + 2 \cdot \bar{\omega}_1 \zeta_3 + \zeta_2^2 (\bmod\, p^{M-4}) \\ v_5 \equiv 2 \cdot \omega_0 \cdot u_5 + 2 \cdot (\omega_1 - u_1) \cdot u_4 + 2 \cdot \zeta_2 \cdot u_3 + 2 \cdot \zeta_3 \cdot u_2 + 2 \cdot \zeta_2 \cdot \zeta_3 (\bmod\, p^{M-5}) \\ v_6 \equiv 2 \cdot \omega_0 \cdot u_6 + 2 \cdot (\omega_1 - u_1) \cdot u_5 + 2 \cdot \zeta_2 \cdot u_4 + 2 \cdot \zeta_3 \cdot u_3 + \zeta_3^2 (\bmod\, p^{M-6}) \\ \text{for } i > 6 \\ v_i \equiv 2 \cdot \omega_0 \cdot u_i + 2 \cdot (\omega_1 - u_1) \cdot u_{i-1} + 2 \cdot \zeta_2 \cdot u_{i-2} + 2 \cdot \zeta_3 \cdot u_{i-3} (\bmod\, p^{M-i}) \\ \ldots \ldots \ldots \ldots \ldots \ldots \ldots \ldots \ldots \ldots \ldots \\ v_{M-3} \equiv 2 \cdot \omega_0 \cdot u_{M-3} + 2 \cdot (\omega_1 - u_1) \cdot u_{M-4} + 2 \cdot \zeta_2 \cdot u_{M-5} + 2 \cdot \zeta_3 \cdot u_{M-6} (\bmod\, p^3) \\ v_{M-2} \equiv 2 \cdot (\omega_1 - u_1) \cdot u_{M-3} + 2 \cdot \zeta_2 \cdot u_{M-4} + 2 \cdot \zeta_3 \cdot u_{M-5} (\bmod\, p^2) \\ v_{M-1} \equiv 2 \cdot \zeta_2 \cdot u_{M-3} + 2 \cdot \zeta_3 \cdot u_{M-4} \end{cases} \quad (80)$$

For each initial selection of the pair ($u_1$, $u_2$), the system (80) may produce a quintuple ($u_1$, $u_2$, $u_3$, $\zeta_2$, $\zeta_3$) such that $r \cdot s \equiv N \pmod{p^M}$.

Supercongruence for $u_4$

After the determination of the roster of candidates quintuples ($\tilde{u}_1$, $\tilde{u}_2$, $\tilde{u}_3$, $\tilde{\zeta}_2$, $\tilde{\zeta}_3$), a similar procedure can be used to determine the roster $\{(u_4, \zeta_4)\}$.

In this case, (68) yields:

$$\begin{cases} v_0 \equiv \bar{\omega}_0^2 (\bmod\, p^M) \\ v_1 \equiv 2 \cdot \bar{\omega}_0 \cdot \bar{\omega}_1 (\bmod\, p^{M-1}) \\ v_2 \equiv -\tilde{u}_1^2 + \bar{\omega}_1^2 + 2 \cdot \bar{\omega}_0 \cdot \zeta_2 + 2 \cdot \bar{\omega}_0 \cdot \tilde{u}_2 (\bmod\, p^{M-2}) \\ v_3 \equiv 2 \cdot \bar{\omega}_0 \cdot u_3 + 2 \cdot (\bar{\omega}_1 - \tilde{u}_1) \cdot \tilde{u}_2 + 2 \cdot \bar{\omega}_1 \cdot \tilde{\zeta}_2 + 2 \cdot \bar{\omega}_0 \cdot \tilde{\zeta}_3 (\bmod\, p^{M-3}) \\ v_4 \equiv 2 \cdot \bar{\omega}_1 \cdot \tilde{\zeta}_3 + 2 \cdot (\bar{\omega}_1 - \tilde{u}_1) \cdot \tilde{u}_3 + 2 \cdot \bar{\omega}_0 \cdot (\bar{\omega}_4 - v_{4,1}) + \tilde{\zeta}_2^2 + 2 \cdot \tilde{u}_2 \cdot \tilde{\zeta}_2^2 (\bmod\, p^{M-4}) \\ v_5 \equiv 2 \cdot (\bar{\omega}_1 - \tilde{u}_1) \cdot u_4 + 2 \cdot \bar{\omega}_0 \cdot u_5 + 2 \cdot \bar{\omega}_1 \cdot \tilde{\zeta}_4 + \sum_{k=2}^{3} \tilde{\zeta}_k \cdot \tilde{\zeta}_{5-k} + 2 \cdot \sum_{k=2}^{3} \tilde{u}_{5-k} \cdot \tilde{\zeta}_k (\bmod\, p^{M-5}) \\ \text{For } 6 \leq h \leq 8 \\ v_h \equiv 2 \cdot (\bar{\omega}_1 - \tilde{u}_1) \cdot u_{h-1} + 2 \cdot \bar{\omega}_0 \cdot u_h + \sum_{k=h-4}^{4} \tilde{\zeta}_k \cdot \tilde{\zeta}_{h-k} + 2 \cdot \sum_{k=2}^{3} \tilde{u}_{h-k} \cdot \tilde{\zeta}_k + 2 \cdot u_{h-4} \cdot \zeta_4 (\bmod\, p^{M-h}) \\ \text{For } 6 \leq h \leq M - 4 \\ v_h \equiv 2 \cdot (\bar{\omega}_1 - \tilde{u}_1) \cdot u_{h-1} + 2 \cdot \bar{\omega}_0 \cdot u_h + 2 \cdot \sum_{k=2}^{3} \tilde{u}_{h-k} \cdot \tilde{\zeta}_k + 2 \cdot u_{h-4} \cdot \zeta_4 (\bmod\, p^{M-h}) \end{cases} \quad (81)$$

To determine $u_4$ (mod p), consider the raster of candidate triads ($\tilde{u}_1$, $\tilde{u}_2$, $\tilde{u}_3$) which were already produced. Substitute $\tilde{u}_1$, $\tilde{u}_2$, and $\tilde{u}_3$ into (81) in lieu of $u_1$, $u_2$, and $u_3$, respectively, and search for an integer $u_4$ modulo p which satisfies (81).

The General Supercongruence, Persistent Solutions

Consider the case when a candidate set ($\tilde{u}_1$, $\tilde{\zeta}_2$, ..., $\tilde{\zeta}_{j_0}$, $\zeta_{j_0}|M$) has been determined. It is desired to determine a candidate set ($\tilde{u}_1$, $\tilde{\zeta}_2$, ..., $\tilde{\zeta}_{j_0}$, $\zeta_{j_0+1}|M$), if such a set exists.

Notice that in (68) the unknown variables are $\zeta_{j_0+1}$ and the integers $u_i$, or $j_0+1 \leq i \leq M-j_0-1$.

Proceeding as in (75) and (80), multiply r by s modulo $p^M$ and define the corresponding congruences modulo $p^{M-i}$. The congruences which are defined modulo $p^{M-2}$ through $p^{M-j_0}$ are not affected by $\zeta_{j_0+1} \cdot p^{j_0+1}$).

The congruence modulo $p^{M-j_0-1}$ does not contain $u_{j_0+1}$. After the computation of $u_{j_0+1,1}$, the system of congruences allows one to determine the whole set $\{u_i\}$.

In general, multiplication of r by s modulo $p^M$ using (68) yields $$\begin{cases} v_{j_0+1} \equiv 2 \cdot \tilde{\omega}_0 \cdot \zeta_{j_0+1} + 2 \cdot \tilde{\omega}_1 \cdot \zeta_{j_0} + \sum_{k=2}^{j_0-1} \zeta_k \cdot \zeta_{j_0+1-k} + 2 \cdot \tilde{\omega}_0 \cdot \tilde{u}_{j_0+1} + 2 \cdot (\tilde{\omega}_1 - \tilde{u}_1) \cdot \tilde{u}_{j_0} + 2 \cdot \sum_{k=2}^{j_0-1} \tilde{u}_{j_0+1-k} \cdot \zeta_k \pmod{p^{M-j_0-1}} \\ v_{j_0+2} \equiv 2 \cdot \tilde{\omega}_1 \cdot \zeta_{j_0+1} + \sum_{k=2}^{j_0-1} \zeta_{j_0+2-k} \cdot \zeta_k + 2 \cdot \tilde{\omega}_0 \cdot \tilde{u}_{j_0+2} + 2 \cdot (\tilde{\omega}_1 - \tilde{u}_1) \cdot \tilde{u}_{j_0+1} + 2 \cdot \sum_{k=2}^{j_0} \tilde{u}_{j_0+2-k} \cdot \zeta_k \pmod{p^{M-j_0-2}} \\ \text{For } 3 \leq \delta \leq j_0 + 2 \\ v_{j_0+\delta} = \sum_{k=\delta-1}^{j_0+1} \zeta_{j_0+\delta-k} \cdot \zeta_k + 2 \cdot \tilde{\omega}_0 \cdot u_{j_0+\delta} + 2 \cdot (\tilde{\omega}_1 - \tilde{u}_1) \cdot u_{j_0+\delta-1} + 2 \cdot \sum_{k=2}^{j_0+1} u_{j_0+\delta-k} \cdot \zeta_k \pmod{p^{M-j_0-\delta}} \\ \text{For } j_0 + 4 \leq \delta \leq n - 1 - j_0 \\ v_{j_0+\delta} \equiv 2 \cdot \tilde{\omega}_0 \cdot u_{j_0+\delta} + 2 \cdot (\tilde{\omega}_1 - \tilde{u}_1) \cdot u_{j_0+\delta-1} + 2 \cdot \sum_{k=2}^{j_0+1} u_{j_0+\delta-k} \cdot \zeta_k \pmod{p^{M-j_0-\delta}}. \end{cases} \quad (82)$$

Note that $u_{j_0+\delta}=0$ for $n-2-j_0 \leq \delta \leq M-1-j_0$.

A set of coefficients $(\tilde{u}_1, \tilde{u}_2, \ldots, \tilde{u}_{M-1})$ and $(\tilde{v}_2, \tilde{v}_3, \ldots, \tilde{v}_{M-1})$ is called a persistent solution if the first $j_0+1$ of the $u_i$ satisfy the corresponding supercongruence (82).

Standard Polynomials

The supercongruences can be clarified with the use of polynomials. The approach here shall be slightly more general than that taken previously.

This section shall make use of vectors of non-negative integers $k=[k_0, \ldots, k_{M-1}]$. If k and k' are two such vectors, then write $k \leq k'$ if $k_i \leq k'_i$ for $i=0, \ldots, M-1$. It is also occasionally convenient to regard k and k' as zero-padded on the right, so that the comparison $k \leq k'$ becomes meaningful even if k and k' have different lengths.

A vector $k=[k_0, \ldots, k_{M-1}]$ is called monotone decreasing if $k_0 \geq k_1 \geq \ldots \geq k_{M-1}$.

Definition 1. Let p be prime, M be a positive integer, and $k=[k_0, \ldots, k_{M-1}]$ be a vector of non-negative integers. A polynomial $f(x)=f_0+f_1 x+f_2 x^2+ \ldots +f_{M-1} x^{M-1}$ is called $p^k$-standard if $0 \leq f_i < p^{k_i}$ for $i=0,1, \ldots, M-1$.

Definition 2. Let p, k be as in Definition 1. Let $f(x)=f_0+f_1 x+ \ldots +f_n x^n$ be a polynomial with integer coefficients. The $p^k$-standard part of $f(x)$ is the polynomial $SP_{p^k} f(x) = \bar{f}_0 + \bar{f}_1 x + \ldots + \bar{f}_n x^n$ where, for $0 \leq i < M$, $\bar{f}_i = f_i \bmod p^{k_i}$.

Note that if f is $p^k$-standard, then it is $p^{k'}$-standard for all $k' \geq k$. When p and k are understood, $SP_{p^k}$ may be abbreviated as SP.

Definition 3. If f and g are integer polynomials, then $f \equiv g \ (SP_{p^k})$ shall mean that $SP_{p^k} f = SP_{p^k} g$.

Digit expansions of positive integers:

Suppose the integer N is prepared as above, and $N=v_0+v_1 p+ \ldots +v_{n-1} p^{n-1}$ is the p-adic digit expansion of N. Then $v(x) = v_0 + v_1 x + \ldots + v_{n-1} x^{n-1}$ is $p^{1_n}$-standard where $1_n=[1, 1, \ldots, 1]$ (n times).

Theorem 1. Given a non-negative integer N, there exists a unique $1_n$-standard polynomial $v(x)$ such that $v(p)=N$.

The following recursive algorithm produces the coefficients of the polynomial $v(x)$.

If $N=0$, then $v(x)=0$.

Otherwise, let $N_1$, $a_0$ be the quotient and remainder of N on division by p, respectively. Then let $v(x)=\alpha_0+x v_1(x)$ where $v_1(x)$ is the polynomial obtained from applying this algorithm to $N_1$.

This algorithm terminates after $[1+\log_p N]$ steps, and it is clear by induction that $N=v(p)$. For uniqueness, if v and it are two standard polynomials such that $v(p)=\mu(p)$, say $v(x)=a_0+x v_1(x)$ and $\mu(x)=b_0+x \mu_1(x)$, then $v(p) \equiv \mu(p) \pmod{p}$ implies that $a_0 \equiv b_0 \pmod{p}$ and therefore $a_0 = b_0$ since both are non-negative integers less than p. It then follows that $v_1(p)=\mu_1(p)$, which now implies uniqueness by induction on the degree.

Properties of the standard part

Proposition 1. $f+g \equiv SP_{p^k} f + SP_{p^k} g \ (SP_{p^k})$ and, if k is monotone decreasing, then $f \cdot g \equiv SP_{p^k} f \cdot SP_{p^k} g \ (SP_{p^k})$ The following proposition motivates a choice of standard polynomials relevant to the supercongruences:

Proposition 2. Suppose that $k=[M, M-1, \ldots, 1]$. If $f(x) \equiv g(x) \ (SP_{p^k})$, then $f(p) \equiv g(p) \pmod{p^M}$.

In particular, this implies that if standard polynomials A, U, V are chosen such that $v(x) \equiv (A(x)-U(x)-V(x))(A(x)+U(x)-V(x)) \ (SP_{p^k})$, then the difference $(A(p)-U(p)-V(p))(A(p)-U(p)+V(p))-v(p)$ is a multiple of $p^M$, and represents the accumulated carry of the product, which for the purposes of factorization is desired to be zero. The advantage of this approach is that it allows the carry to be deferred to the final stage of the process.

Standard Polynomial Inversion

Theorem 2. Let p be prime and k a nonempty vector of positive exponents. Suppose that $f(x)$ is a $p^k$-standard polynomial such that $f(0) \not\equiv 0 \pmod{p}$. Then there exists a unique $p^k$-standard polynomial $g(x)$ such that $f(x) g(x) \equiv 1 \ (SP_{p^k})$.

Proof The theorem shall be established by first giving its iterative solution. Since $f(0) \not\equiv 0$ (mod p), there exists an integer $\gamma_0$ such that $\gamma_0 f(0) \equiv 1$ (mod p). Let $g_0(x) = \gamma_0$ and, for $j = 0, 1, \ldots$, define $$g_{j+1}(x) = SP((2 - f(x)g_j(x))g_j(x)).$$

The iteration reaches a fixed point within $\lceil \log_2 \max(k_0, k_1+1, \ldots, k_{M-1}+M-1) \rceil$ iterations. Indeed, define a norm on the set of integer polynomials via $$|f|_p = \inf\{p^{-r-s} | r, s \in \mathbb{N}, f \equiv O(x^r) \pmod{p^s}\}.$$

Then, it shall be shown below that $$|1 - fg_{j+1}|_p \leq |1 - fg_j|_p^2. \tag{83}$$

The constant term of $1 - fg_0$ is zero mod p: i.e., $|1 - fg_0| \leq p^{-1}$. Consequently it follows by repeated squaring that $|1 - fg_j| \leq p^{-2^j}$ for all j. Thus as soon as $2^j > \max(k_0, k_1+1, \ldots, k_{M-1}+M-1)$, the standard part of $1 - fg_j$ is zero and $g_j$ is the standard polynomial inverse to f.

It remains to compute $1 - fg_{j+1}$:

$$1 - fg_{j+1} = 1 - f(2 - fg_j)g_j$$
$$= (1 - fg_j) - (1 - fg_j)g_j$$
$$= (1 - fg_j)^2$$

whence (83) by multiplicativity of the norm. □

Standard Polynomial Square Root

Theorem 3. Let p be an odd prime and k a nonempty vector of positive exponents. If $v(x)$ is an integer polynomial such that $v(0) \equiv \alpha^2$ (mod p), then there exists a unique standard polynomial $A(x)$ such that:

$$A^2(x) \equiv v(x) \ (SP_{p^k}),$$

and $$A(0) \equiv \alpha \pmod{p}.$$

(This theorem implies in particular that, given $\tilde\omega_0$, there is a unique sequence $\tilde\omega_1, \tilde\omega_2, \ldots, \tilde\omega_{M-1}$ such that (64) holds.)

Proof. By assumption, $v(0)$ is a quadratic residue. Let $\alpha^2 \equiv v(0)$ (mod p). Define $A_0(x) = \alpha$ and, for $k = 0, 1, \ldots$, define $$A_{k+1}(x) = 2^{-1}(A_k(x) + v(x)A_k(x)^{-1}) \ (SP)$$

where at each stage of the iteration, the inverses are computed as in the previous section.

Consider the difference $$v - A_{j+1}^2 \equiv v - \frac{1}{4}A_j^2 - \frac{1}{2}v - \frac{1}{4}v^2 A_j^{-2}$$
$$= \frac{1}{2}(v - A_j^2) + \frac{1}{4}\left(A_j^2 - \frac{v^2}{A_j^2}\right)$$
$$= \frac{1}{2}(v - A_j^2) + \frac{1}{2}\frac{A_{j+1}}{A_j}\left(A_j - \frac{v}{A_j}\right)$$
$$= \frac{1}{2}(v - A_j^2)\left(1 - \frac{A_{j+1}}{A_j}\right).$$

Next, note that $$1 - \frac{A_{j+1}}{A_j} = \frac{1}{2}\left(\frac{v - A_j^2}{A_j}\right).$$

Substituting into the above gives $$v - A_{j+1}^2 = \frac{1}{4}(v - A_j^2)^2 A_j^{-1}$$

and therefore, by multiplicativity of the norm from the proof of Theorem 2, $$|v - A_{j+1}^2|_p \leq |v - A_j^2|_p^2.$$

Hence, $$A_j^2 \equiv v \ (SP)$$

as soon as $2^j > \max(k_0, k_1+1, \ldots, k_{M-1}+M-1)$. □

Standard Polynomial Factorization

Let N be an integer prepared as in the previous section, and let $v(x)$ be the polynomial obtained from the p-adic digit expansion of N. Let $A(x)$ be a standard polynomial such that $$A^2(x) \equiv v(x) \ (SP_{p^k}).$$

Definition 4. A standard polynomial factorization of $v(x)$ is a pair of standard polynomials $U(x)$, $V(x)$ such that $U(0) = V(0) = V'(0) = 0$ for which:

the standard part of the polynomial $$(A(x) + U(x) - V(x))(A(x) - U(x) - V(x))$$

is equal to $v(x)$.

That is:

$$(A(x) + U(x) - V(x))(A(x) - U(x) - V(x)) \equiv v(x) \ (SP_{p^k}). \tag{84}$$

The condition $U(0) = 0$ shall be abbreviated $U(x) = O(x)$, and the pair of conditions $V(0) = V'(0) = 0$ shall be abbreviated $V(x) = O(x^2)$. Note polynomial factorization in the usual sense will not work: $v(x)$ is very unlikely to factor completely, even if N is guaranteed to have factors. For example, with $N = 15$, $p = 11$, $v(x) = 2 + 91x + 6x^2$ is irreducible, even though $N = v(11) = 15$ has factors $3 \times 5$.

$U(x)$ determines $V(x)$ uniquely:

Theorem 4. Suppose $A(x)$ is a standard polynomial such that $A(x)^2 \equiv v(x) \ (SP_{p^k})$. Let $U(x)$ be a standard polynomial satisfying $U(x) = O(x)$, Then there exists a unique standard polynomial $V(x)$ satisfying $V(x) = O(x^2)$ such that $(A(x) + U(x) - V(x))(A(x) - U(x) - V(x)) \equiv v(x) \ (SP_{p^k})$ Proof. Rearranging $$(A + U - V)(A - U - V) - v = 0$$

as a quadratic equation in V gives:

$$V^2 - 2AV + (A^2 - U^2 - v) = 0.$$

Let $\Delta(x) = U^2(x) + v(x)$ be the quarter discriminant of the quadratic. Since $U(0) = 0$ and $v(0)$ is a quadratic residue modulo p, $\Delta(0)$ is also a quadratic residue modulo p, having square root $\omega_0$ mod p. Therefore by Theorem 3, there exists a unique standard polynomial $\sqrt{\Delta}(x)$ with the property that $\sqrt{\Delta}(0) \equiv \omega_0 \pmod{p}$ and $$\sqrt{\Delta}(x)^2 \equiv \Delta(x) \ (SP)$$

Note that $$\sqrt{\Delta}(x) = A(x) + O(x^2)$$

Therefore $$V(x) = A(x) - \sqrt{\Delta}(x) \ (SP_{p^k})$$

satisfies $V(x) = O(x^2)$.

For uniqueness, notice that the other candidate solution to the quadratic is $$A(x)+\sqrt{A}(x) \equiv 2A(x)+O(x^2) \ (SP_{p^k})$$

has nonzero lower order terms in x. □

Different Forms of Standard Polynomial Factorization

Definition 5. Given a Factorization

$$v(x) \equiv (A(x)+U(x)-V(x))(A(x)-U(x)-V(x)) \ (SP_{p^k})$$

where $U(0)=V(0)=V'(0)=0$, define a polynomial $\zeta(x)$ by $$\zeta(x) = A_{(2)}(x) - U_{(2)}(x) - V(x),$$

where $A_{(2)}(x)$ and $U_{(2)}(x)$ are the quadratic Taylor remainders of $A(x)$ and $U(x)$:

$$A_{(2)}(x) = A(x) - A_1(x), \ U_{(2)}(x) = U(x) - U_1(x)$$

where $A_1$ and $U_1$ denote the linearizations of A an U, respectively:

$$A_1(x) = A(0) + A'(0)x = \omega_0 + \omega_1 x$$

$$U_1(x) = U'(0)x = u_1 x.$$

Plugging the definition of $\zeta(x)$ into the standard factorization problem $$(A(x)+U(x)-V(x))(A(x)-U(x)-V(x)) \equiv v(x) \ (SP_{p^k}).$$

gives $$(A_1(x) - U_1(x) + 2U(x) + \zeta(x))(A_1(x) - U_1(x) + \zeta(x)) \equiv v(x) \quad (SP) \qquad (85)$$

That is, $$r(x)s(x) \equiv v(x) \ (SP)$$

where $$\begin{cases} r(x) = A_1(x) - U_1(x) + 2U(x) + \zeta(x)) \\ s(x) = A_1(x) - U_1(x) + \zeta(x) \end{cases} \qquad (86)$$

Persistent factorizations

Definition 6. A k-Standard Polynomial Factorization

$$v(x) \equiv r(x)s(x) \ (SP_{p^k})$$

is called persistent if, for all k'≥k, there exist k'-standard polynomials r'(x) and s'(x) having the same degree as r(x) and s(x), respectively, such that $$r'(x) \equiv r(x) \ (SP_{p^k})$$

$$s'(x) \equiv s(x) \ (SP_{p^k})$$

$$v(x) \equiv r'(x)s'(x) \ (SP_{p^k}).$$

Persistent factorizations as lifts of factorizations mod p:

The following theorem allows polynomials $U(x)$ and $\zeta(x)$ modulo p to be determined from a factorization modulo p of $v(x)$. A standard polynomial factorization may then be obtained by applying a lift.

Theorem 5. Suppose that $v(x) \equiv a(x)b(x) \pmod{p}$ where a, b are polynomials mod p, and $a(0) \equiv b(0) \equiv \omega_0 \pmod{p}$. Then the polynomials $$A_1(x) = \omega_0 + \omega_1 x$$

$$\zeta(x) = b(x) - b(0) - b'(0)x \bmod p$$

$$U(x) = (a(x) - b(x))/2 \bmod p$$

satisfy $$A_1(x) - u_1 x + 2U(x) + \zeta(x) = a(x)$$

$$A_1(x) - u_1 x + \zeta(x) = b(x),$$

where $u_1 = U'(0)$. That is, $$(A_1(x) - u_1 x + 2U(x) + \zeta(x))(A_1(x) - u_1 x + \zeta(x)) \equiv v(x)$$
$$\pmod{p}.$$

Proof. Write $a(x) = \omega_0 + a_1 x + a_2 x^2 + \ldots$, $b(x) = \omega_0 + b_1 x + b_2 x^2 + \ldots$ Then since $a(x)b(x) \equiv v(x) \equiv \omega_0^2 + 2\omega_0 \omega_1 x + O(x^2) \pmod{p}$, it follows that $$2\omega_1 = a_1 + b_1$$

and so $u_1 = (a_1 - b_1)/2 = \omega_1 - b_1$ Now, $$A_1(x) - u_1 x + \zeta(x) = \omega_0 + \omega_1 x - (\omega_1 - b_1)x + \zeta(x)$$

$$= \omega_0 + b_1 x + \zeta(x)$$

$$= b(x).$$

Also, since $2U(x) = a(x) - b(x)$, $$A_1(x) - u_1 x + 2U(x) + \zeta(x) = \omega_0 + 1/2(\alpha_1 + b_1)x - 1/2(a_1 - b_1)x + a(x) - b(x) + \zeta(x)$$

$$= \omega_0 + b_1 x + a(x) - b(x)\zeta(x)$$

$$= a(x)$$

as claimed. □

Carry Phase

The final phase is concerned with an equation of the form $$A^2 = T \cdot N + correction$$

where the correction is a multiple of $p^M$. That is $$A^2 = T \cdot N + k \cdot p^M$$

expresses $A^2$ as the sum of a main term $T \cdot N$ and a correction $k \cdot p^M$. To analyze the correction term in more detail, a standard polynomial factorization yields a standard polynomial $A(x)$ and a roster of pairs of standard polynomials $(U(x), V(x))$ such that $$(A(x)-U(x)-V(x))(A(x)+U(x)-V(x))-v(x) \equiv 0 \ (SP_p^k). \quad (87)$$

Consider the case where $k=[M, M-1, \ldots, 2, 1]$. Then, evaluating at $x=p$ yields $$(A(p)-U(p)-V(p))(A(p)+U(p)-V(p)) \equiv v(p) \ (\text{mod } p^M).$$

This equation implies that the difference $$(A(p)-U(p)-V(p))(A(p)+U(p)-V(p))-v(p)$$

is a multiple of $p^M$, which shall be thought of as a carry, comprised of the carries from the individual terms of the difference $(A-U-V)(A+U-V)-v$, and deferred to the final phase of the process.

In the carry phase, the roles of the correction term and main term are reversed. What was formerly the correction term, the "carry" $-k \cdot p^M$ is now the main term. And what was formerly the main term $T \cdot N$ is now the correction.

Geometric Semigroup Law

Henceforth, set $A=A(p)$, $U=U(p)$, $V=V(p)$ with $U \equiv 0 \pmod{p}$, $V \equiv 0 \pmod{p^2}$. Let C be an integer for which $(A-U-V)(A+U-V)-N \equiv C \pmod{V}$, which is to say that:

$$(A-U-V)(A+U-V)-N=BV+C$$

for some integers B and C. Assume that C does not share a factor with N. Regard the integer V as a parameter and consider the quadratic polynomial in V:

$$q(V)=(A-U-V)(A+U-V)-BV-C.$$

Note that $q(V) \equiv 0 \pmod{N_0}$. The discriminant of this quadratic is $$\Delta = B^2 + 4(U^2 + AB + C).$$

To facilitate the goal of factorization of $q(V)$, it is desired to change parameters $(U, V, C)$ such that the discriminant becomes a perfect square, because in this case $\Delta$ will factor over the integers.

A set of rescalings of the parameters is proposed that shall preserve the property of being a perfect square. Specifically, rescale U, V, C such that CU and UV remain constant. To this end, introduce free homogeneous parameters $X_0$, $X_1$ and:

rescale C so that $X_0 C' \equiv X_1 \pmod{N_0}$;
rescale V so that $X_1 V \equiv X_0 C V' \pmod{N_0}$; and
rescale U so that $X_0 U \equiv X_1 U' \pmod{N_0}$.

Prolong by introducing a parameter $X_2$ such that $C^2 \Delta \equiv X_2^2 \pmod{N}$, and $X_3$ such that $X_0 X_3 \equiv X_1^2 \pmod{N}$. Then points $[X_0, X_1, X_2, X_3]$ are desired such that the quadratic equations are satisfied:

$$\left. \begin{array}{ll} Q_1: & X_0 X_3 - X_1^2 \equiv 0 \pmod{N_0} \\ Q_2: & 4 X_1 X_3 + (B^2 + 4AB) X_0 X_3 + 4 U^2 C^2 X_0^2 - 4 X_2^2 \equiv 0 \pmod{N_0} \end{array} \right\} \quad (88)$$

A factor is found once one of the scaling parameters $[X_0, X_1, X_2, X_3]$ has a non-trivial factor in common with N. Note that the first equation of (88) is a cylinder over a plane conic. The lines $X_0, X_1, X_3 =$ constant are the reguli of the cylinder. An initial non-trivial point on the intersection is $[X_0, X_1, X_2, X_3] = [1, 0, CU, 0]$.

The following operations are well-defined on the quartuples P: $[X_0, X_1, X_2, X_3]$ satisfying (88), are defined:

The point $[X_0, X_1, -X_2, X_3]$ is the other point on the quadric $Q_2$ lying on the same regulus as P.

Given two points in general position P: $[X_0, X_1, X_2, X_3]$, Q: $[Y_0, Y_1, Y_2, Y_3]$, there is a third point R: $[Z_0, Z_1, Z_2, Z_3]$ satisfying both (88) such that OPQR are coplanar, where $O=[0,0,0,1]$.

Let $a=(B^2/4+AB) \bmod N_0$. Let $[X_0, X_1, X_2, X_3]$ be coordinates of the first point and $[Y_0, Y_1, Y_2, Y_3]$ coordinates of the second point, so the congruences hold:

$$X_2^2 \equiv X_1 X_3 + a X_0 X_3 + C^2 U^2 X_0^2 \pmod{N_0}$$

$$Y_2^2 \equiv Y_1 Y_3 + a Y_0 Y_3 + C^2 U^2 Y_0^2 \pmod{N_0}.$$

Then the coordinates of the third point $[Z_0, Z_1, Z_2, Z_3]$ are determined mod $N_0$ by:

If $[X_0: X_1: X_2: X_3] = [Y_0: Y_1: Y_2: Y_3]$, then $$Z_0 = 16 X_0^4 X_2^4$$

$$Z_1 = X_0^4 X_2^2 (4 X_3^2 - 16 C^2 U^2 X_0^2 a - 32 C^2 U^2 X_0 X_1)$$

$$Z_2 = -2 X_0 X_2 \left( \begin{array}{c} 8 X_0^3 X_1^3 a^3 + 36 X_0^2 X_1^4 a^2 - 8 X_0^3 X_1 X_2^2 a^2 + 54 X_0 X_1^5 a - \\ -36 X_0^2 X_1^2 X_2^2 a + 27 X_1^6 - 36 X_0 X_1^3 X_2^2 + 8 X_0^2 X_2^4 \end{array} \right)$$

$$Z_3 = (4 X_0^2 X_1^2 a^2 + 12 X_0 X_1^3 a - 4 X_0^2 X_2^2 a + 9 X_1^4 - 8 X_0 X_1 X_2^2)^2$$

Otherwise, $$Z_0 = (X_1 Y_0 - X_0 Y_1)^4 X_0^2 Y_0^2$$

$$Z_1 = X_0^3 Y_0^3 (X_1 Y_0 - X_0 Y_1)^2 (2 C^2 U^2 X_0 y_0 + 2 X_1 Y_1 a + X_3 Y_1 - 2 X_2 Y_2 + X_1 Y_3)$$

$$Z_2 = X_0^3 Y_0^3 (X_1 Y_0 - X_0 Y_1) \left( \begin{array}{c} -4 C^2 U^2 X_0 X_2 Y_0^2 + 4 C^2 U^2 X_0^2 Y_0 Y_2 + X_1 X_3 Y_0 Y_2 + \\ + 3 X_0 X_3 Y_1 Y_2 - 3 X_1 X_2 Y_0 Y_3 - X_0 X_2 Y_1 Y_3 - \\ -2 a (X_1 X_2 Y_0 Y_1 - X_0 X_3 Y_0 Y_2 - X_0 X_1 Y_1 Y_2 + X_0 X_2 Y_0 Y_3) \end{array} \right)$$

$$Z_3 = \left( \begin{array}{c} (X_1 Y_0 - X_0 Y_1)^2 X_0 Y_0 a + X_1^3 Y_0^3 - X_0 X_2^2 Y_0^3 - X_0 X_1^2 Y_0^2 Y_1 - \\ - X_0^2 X_1 Y_0 Y_1^2 + X_0^3 Y_1^3 + 2 X_0^2 X_2 Y_0^2 Y_2 - X_0^3 Y_0 Y_2^2 \end{array} \right)^2$$

The following theorem motivates this choice of polynomial transformation:

Theorem 6. Suppose that the points $[X_0: X_1: X_2: X_3]$ and $[Y_0: Y_1: Y_2: Y_3]$ obey (88). Then $[Z_0: Z_1: Z_2: Z_3]$ given above also satisfies (88).

This can be proven by a brute-force calculation.

Polynomial Reformulation

Similarly to how the integer factorization problem can be partially reformulated using standard polynomials, the treatment of the carries can be reformulated using polynomial operations. This reformulation has the advantage of being more general than the prior discussion.

Suppose that $A(x)$ has been determined, and $U(x)$ is a polynomial coming from a standard polynomial factorization of v. There is an associated polynomial $V(x)$, such that $$(A(x)-U(x)-V(x))(A(x)+U(x)-V(x)) \equiv v(x) \pmod{p}.$$

The carry is the obstruction to factorization of N that comes when evaluated at $x=p$:

$$(A-U-V)(A+U-V)-N$$

where the notations are used $A=A(p)$, $U=U(p)$, $V=V(p)$. One would like a way to manipulate this carry in order to guarantee a greater likelihood of factorization. To that end, let C be an integer for which $(A-U-V)(A+U-V)-N \equiv C \pmod V$, which is to say that:

$$(A-U-V)(A+U-V)-N=BV+C$$

for some integer C. Assume that C does not share a factor with N. Replace the integer V by an indeterminate v, and then consider the quadratic polynomial in v:

$$q(v)=(A-U-v)(A+U-v)-Bv-C.$$

Note that $q(V) \equiv 0 \pmod N$. The constants A, U, B, C are regarded as parameters in this quadratic. In particular, its discriminant $$\Delta=B^2+4(U^2+AB+C)$$

depends on all four parameters. To change parameters to achieve a factorization, first rescale the parameters v, C, U, in such a way that Uv, UC, and v/C mod $N_0$ remain constant (modulo $N_0$). Consider therefore a residue x modulo $N_0$, and rescalings of the form $v \to xv$, $C \to xC \bmod N_0$, and $U \to x^{-1}U$ where $x^{-1}$ is computed modulo $N_0$ so that $xx^{-1} \equiv 1 \pmod{N_0}$. (Assume that x has no factor in common with $N_0$.) The new quadratic is thus $$\tilde{q}(v)=(A-x^{-1}U-xv)(A+x^{-1}U-xv)-xBv-xC,$$

and the new discriminant modulo $N_0$ is $$\tilde{\Delta} \equiv 4Cx^3+(B^2+4AB)x^2+4U^2 \pmod{N_0}.$$

Now, it is desired that the discriminant becomes a perfect square modulo $N_0$. That is, a solution is desired to $$y^2 \equiv \tilde{\Delta} \pmod{N_0}.$$

That is $$y^2 \equiv 4Cx^3+(B^2+4AB)x^2+4U^2 \pmod{N_0}.$$

Multiply both sides by $C^2/4 \pmod{N_0}$:

$$\frac{C^2}{4}y^2 \equiv C^3x^3+\left(\frac{B^2}{4}+AB\right)C^2x^2+C^2U^2 \pmod{N_0}.$$

Letting $Y=Cy/2$ and $X=Cx$, this equation becomes $$y^2 \equiv X^3+\left(\frac{B^2}{4}+AB\right)X^2+C^2U^2 \pmod{N_0}. \tag{89}$$

Let $f(X)$ denote the right-hand side of (89). Associate to any solution of (89) an affine-linear form ξ with the property that $\xi(X)=0$. The pair $(\xi, Y)$ can be used in place of a solution $(X, Y)$.

Note that $\xi(X)=0$, $Y=CU$ is a solution. The following semigroup law takes a pair of solutions $(\xi_1, Y_1)$ and $(\xi_2, Y_2)$ and produces a third solution $(\xi_3, Y_3)$.

If $\deg\xi_1 < 1$, then let $(\xi_3, Y_3) \leftarrow (\xi_2, Y_2)$. Else $\deg\xi_2 < 1$, then let $(\xi_3, Y_3) \leftarrow (\xi_1, Y_1)$. Return $(\xi_3, Y_3)$ and exit.

Else let $g=\gcd(\xi_1, \xi_2)$.

If $g=1$, let μ be the linear polynomial such that $\mu \equiv Y_i \pmod{\xi_i}$ for $i=1,2$. Let $\xi_3=(f-\mu^2)/(\xi_1\xi_2)$, and let $Y_3$ be the value of μ evaluated at the zero of $\xi_3$. Return the pair $(\xi_3, Y_3)$ and exit.

Else if $Y_1+Y_2=0$, then return $(\xi_3, Y_3) \leftarrow (1,0)$ and exit.

Otherwise, let $\mu=((Y_1+f/Y_1)/2) \bmod \xi_1^2$, where the multiplicative inverses are determined modulo $N_0$. Then let $\xi_3=(f-\mu^2)/(\xi_1^2)$, and let $Y_3$ be the value of μ evaluated at the zero of $\xi_3$. Return $(\xi_3, Y_3)$ and exit.

To turn this into a factorization method, it is desirable to have versions of the polynomial extended Euclid algorithm (xgcd) and Chinese remainder theorem (crt) that return a factor if their inputs are degenerate modulo $N_0$: i.e., if a factor is "discovered" by polynomial division.

The Semigroup Law in General

In general, suppose that F is a (fixed) squarefree polynomial modulo $N_0$ of even degree $2k \geq 4$. Let $\partial$ be the set of polynomials $(\alpha(x), \beta(x), \gamma(x))$ modulo N, where β is a monic polynomial, $\deg\alpha < \deg\beta < k$ and $$\alpha(x)^2 \equiv F(x)+\beta(x)\gamma(x) \pmod{N_0}.$$

Define a binary operation ⊕ on δ as follows. Suppose given a pair $X_1=(\alpha_1, \beta_1, \gamma_1)$, $X_2=(\alpha_2, \beta_2, \gamma_2)$. Let δ be the greatest common divisor of $\beta_1$, $\beta_2$, and d the greatest common divisor of $\alpha_1+\alpha_2$, $\beta_1$, $\beta_2$. Let $\beta_3=\beta_1\beta_2/d^2 \bmod N_0$. Then there exists a polynomial $\alpha_3$ of degree $< \deg\beta_3$ such that $$\alpha_3 \equiv \alpha_1 \pmod{\beta_1/\delta}$$

$$\alpha_3 \equiv \alpha_2 \pmod{\beta_2/\delta}$$

$$F-\alpha_3^2 \equiv 0 \pmod{\beta_3}.$$

To determine this $\alpha_3$, there exist polynomials $\sigma_1$ and and $\sigma_2$ such that $$\sigma_1\beta_1+\sigma_2\beta_2 \equiv \delta \pmod{N_0}$$

and polynomials ρ and ε such that $$\rho\delta+\epsilon(\alpha_1+\alpha_2) \equiv d \pmod{N_0}.$$

Then $$\alpha_3 = \frac{1}{d}(\rho(\sigma_2\beta_2\alpha_1+\sigma_1\beta_1\alpha_2)+\epsilon(F+\alpha_1\alpha_2))(\bmod\ \beta_3).$$

Next, put $$\gamma_3 = \frac{F-\alpha_3^2}{\beta_3}(\bmod\ N_0).$$

While $\deg\beta_3 \geq k$, let $$\beta_3 = \gamma_3, \gamma_3 = \frac{F - \alpha_3^2}{\beta_3} \pmod{N_0},$$

and $\alpha_3 \equiv -\alpha_3 \pmod{\beta_3}$.

Finally make $\beta_3$ monic by dividing by its leading coefficient. The binary operation $\oplus$ is thus defined as $X_1 \oplus X_2 = X_3$ where $X_3 = (\alpha_3, \beta_3, \gamma_3)$.

Since $N_0$ is assumed to be composite, the polynomial division operations (or the normalization of $\beta_3$ in the last step) of the semigroup law may not be well defined. In that case, a factor of $N_0$ shall have been discovered, and the process terminates.

Examples

Small Example

Let $N_0 = 797 \times 991 = 789827$. Select the parameters $p=13$, $M=4$, and $k=[1,1,1,1]$. Note that $N_0$ is a quadratic residue mod $p$, so that $\alpha=1$ is a possible candidate $\alpha$. Note that $T=790087$ is a prime greater than $N_0$ such that $N_0 \equiv T\alpha^2 \pmod{p}$. Then, with $N=TN_0=624032044949$, the digits of $N$ modulo $p$ form the polynomial:

$v(x) = 1+5x+5x^2+6x^3+9x^4+7x^5+12x^6+12x^7+10x^8+6x^9+4x^{10}$.

Modulo $p=13$, this polynomial factorizes as:

$v(x) = (4)(x^2+8)(x^3+6x^2+4x+1)(x^5+2x^4+11x^3+7x^2+11x+11)$.

The coefficients $\omega_0, \omega_1, \omega_2, \omega_3$ are determined so that $A(x) = \omega_0 + \omega_1 x + \omega_2 x^2 + \omega_3 x^3$ obeys $A(x)^2 \equiv v(x) \pmod{p, x^4}$.

To begin the process, let $\omega_0$ be a root of $\omega_0^2 \equiv v_0 \pmod{p}$, for instance $\omega_0 = 1$ satisfies $1^2 \equiv 1 \pmod{13}$. The remaining coefficients $w_i$ must satisfy congruences $v_1 \equiv 2\omega_0 \omega_1 \pmod{p}$ $v_2 \equiv 2\omega_0 \omega_2 + \omega_1^2 \pmod{p}$ $v_3 \equiv 2\omega_0 \omega_3 + 2\omega_1 \omega_2 \pmod{p}$ The first of these congruences reads $5 \equiv 2\omega_1 \pmod{13}$ and a solution of $\omega_1 = 9$ is found by modular inversion ($2^{-1} \equiv 7 \pmod{13}$). The second congruence now reads $5 \equiv 2\omega_2 + 3 \pmod{13}$ giving $\omega_2 = 1$. The third congruence is now $6 \equiv 2\omega_3 + 18 \pmod{13}$ That is, $2\omega_3 \equiv 1 \pmod{13}$, giving $\omega_3 = 7$. Thus the polynomial $A(x) = 1 + 9x + x^2 + 7x^3$ satisfies $A(x)^2 \equiv v(x) \; (SP_{p^k})$ With the trivial divisor of 1, the associated polynomial $U$ is $$U = SP_{p^k}\left(\frac{\omega_0}{2}\left(1 - \frac{v}{v_0}\right)\right).$$
$$= 4x + 4x^2 + 10x^3$$

The polynomial $V$ is now determined from the data of $v$, $A$, $U$ as $V = A \pm \sqrt{v + U^2} \; (SP)$ where the square root is taken in $p^k$-standard polynomials, and the sign is chosen so that the result is $O(x^2)$. Note that $v + U^2 \equiv 1 + 5x + 8x^2 + 12x^3 \; (SP)$.

Denoting $\sqrt{v+U^2} = \sigma_0 + \sigma_1 x + \sigma_2 x^2 + \sigma_3 x^3$ (SP), the unknown coefficients $\sigma_0, \sigma_1, \sigma_2, \sigma_3$ must obey $1 \equiv \sigma_0^2 \pmod{p}$ $5 \equiv 2\sigma_0 \sigma_1 \pmod{p}$ $8 \equiv 2\sigma_0 \sigma_2 + \sigma_1^2 \pmod{p}$ $12 \equiv 2\sigma_0 \sigma_3 + 2\sigma_1 \sigma_2 \pmod{p}$ where the integers on the left-hand side are the corresponding coefficients of the standard part of $v + U^2$. Solving this system as above gives or $\sigma_0 = \omega_0 = 1$, $\sigma_1 = \omega_1 = 9$, $\sigma_2 = 9$, $\sigma_3 = 3$. Thus:

$V = A - (1 + 9x + 9x^2 + 3x^3) \equiv 4x^2 + 5x^3 \pmod{13}$.

In summary, the polynomials $A$, $U$, $V$ are $A(x) = 1 + 9x + x^2 + 7x^3$ $U(x) = 4x + 4x^2 + 10x^3$ $V(x) = 4x^2 + 5x^3$ Evaluating these polynomials at $x = p$ gives integers $A(p) = 15666, \; U(p) = 22698, \; V(p) = 9633$ which are henceforth denoted $A$, $U$, $V$, respectively.

However, observe that the difference $(A - U - V)(A + U - V) - N = -624510847064$ is not zero, nor do either $r = A - U - V$ nor $s = A + U - V$ share a nontrivial factor with $N_0$. So, decompose the difference mod $V$:

$-624510847064 = (-64830359)V + 1183$.

This gives values for the parameters $B = -64830359$ and $C = 1183$.

The objective is now to consider variables $x$ such that the discriminant $$\Delta = x^3 + \left(\frac{B^2}{4} + AB\right)x^2 + U^2 C^2 \mod N_0$$
$$= x^3 + 536317x^2 + 154667$$

is a perfect square modulo $N_0$. To that end, let $(\xi_1, y_1)$ be a pair comprising the monic affine-linear form $\xi_1$ modulo $N_0$ in one variable, and the integer $y_1$ modulo $N_0$, given by:

$$\xi_1 = x,$$

$$y_1 = CU \bmod N_0 = 787443.$$

The pair $(\xi_1, y_1)$ is the initial point for an iteration. The next point in the iteration $(\xi_2, y_2)$ shall be determined as follows:

Let $\xi_2 = \xi_1^2 = x^2$ and $y_2 = (\Delta + y_1^2) \bmod \xi_2 = 152283$.
Now let $$\xi_2 = \frac{\Delta - y_2^2}{\xi_2}$$

and $y_2 = y_2 \bmod \xi_2$. So $\xi_2 = x + 536317$ and $y_2 = 2384$.

To find the next point $(\xi_{n+1}, y_{n+1})$ from the previous point $(\xi_n, y_n)$, the following procedure can be used.

If $\xi_n \equiv \xi_1 \pmod{N_0}$, let $\delta = \xi_1$, $\sigma_1 = 0$, $\sigma_n = 1$. Otherwise, $\xi_n - \xi_1$ is a nonzero constant modulo $N_0$. If it is not invertible modulo $N_0$, then a factor is found. Otherwise, let $\delta = 1$, $\lambda = (\xi_n - \xi_1)^{-1} \pmod{N_0}$, $\sigma_1 = -\lambda$, $\sigma_2 = \lambda$. In either case, one has $\sigma_1 \xi_1 + \sigma_n \xi_n = \delta$ where $\delta$ is the polynomial gcd of $\xi_1$ and $\xi_n$.

Next, if $y_n \equiv -y_1 \pmod{N_0}$, then let $d = \delta$, $\rho = 1$, $\epsilon = 0$. Else, if $y_n + y_1$ is not invertible modulo $N_0$, it means that a factor is found. Otherwise, let $d = 1$, $\rho = 0$, and $\lambda = (y_n + y_1)^{-1} \bmod N_0$. In any case, the congruence $\rho\delta + \epsilon(y_1 + y_n) \equiv d \pmod{N_0}$ now holds, where d is the polynomial gcd of $\delta$ and $y_1 + y_n$.

Let $\xi_{n+1} \leftarrow \xi_n \xi_1 / d^2$. Define $y_{n+1} \pmod{N_0}$ such that the congruence holds:

$$dy_{n+1} \equiv \rho(\sigma_1 \xi_1 y_n + \sigma_n \xi_n y_1) + \epsilon \delta \pmod{\xi_{n+1}}$$

where the modulo is with respect to polynomial division by $\xi_{n+1} \pmod{N_0}$. (Note: because at this step, $\xi_{n+1}$ is guaranteed to be monic, no factorization will be discovered here.) If $\xi_{n+1}$ is quadratic rather than linear, then let $$\xi_{n+1} \leftarrow \frac{\Delta - y_{n+1}^2}{\xi_{n+1}}.$$

Test if the greatest common divisor of the leading coefficient of $\xi_{n+1}$ and $N_0$ is nontrivial: if so, then it means a factor is found. Otherwise, normalize $\xi_{n+1}$ by dividing (modulo $N_0$) by its leading coefficient. Now update $y_{n+1}$:

$$y_{n+1} \leftarrow y_{n+1} \bmod \xi_{n+1},$$

with the same meaning of mod.

To illustrate, to find $(\xi_3, y_3)$ given the previously determined $(\xi_1, y_1)$ and $(\xi_2, y_2)$, note that $\xi_2 - \xi_1 = 536317$, whose inverse modulo $N_0$ is 114631. Let $\delta = 1$, $\sigma_1 = -114631$ and $\sigma_2 = 114631$. Now, $y_2 \equiv -y_1 \pmod{N_0}$, so let $d = \delta = 1$, $\rho = 1$, $\epsilon = 0$. Let $$\xi_3 = \frac{\xi_1 \xi_2}{d^2} = x^2 + 536317x$$

and $$y_3 = (-114631\xi_1 y_2 + 114631\xi_2 y_1) \bmod \xi_3$$
$$= (-114631)(2384)x + 114631(787443)(x + 536317) \bmod \xi_3$$
$$= 789503x + 787443$$

after taking coefficients modulo $N_0$ and obtaining the remainder from polynomial long division by $\xi_3$. Because $\xi_3$ is quadratic and not linear, replace it with $$\xi_3 \leftarrow \frac{\Delta - y_3^2}{\xi_3} = x + 684851$$

and update $y_3$ via $$y_3 \leftarrow y_3 \pmod{\xi_3} = 52047.$$

The results of continuing this process for successive iterations is presented in Table 1. The final line gives $y = 704548$. The gcd with $N_0$ is then $\gcd(N_0, y) = \gcd(789827, 704548) = 797$, and so a factor of $N_0$ has been found. (The other factor can be obtained by division: $N_0/797 = 991$.)

TABLE 1

| First seven iterations of the process | |
|---|---|
| $\xi(x)$ | $y$ |
| $x$ | 787443 |
| x + 536317 | 2384 |
| x + 684851 | 52047 |
| x + 225605 | 682442 |
| x + 572007 | 587941 |
| x + 538246 | 275646 |
| x + 369405 | 385164 |
| x + 711460 | 704548 |

Large Example

Consider the integer of 201 digits, composed of two large prime factors:
$N_0$=22967931147801119577057392151555297515908528818203114721284113333931699387670392378598444117533089955456178792579060805189095768433429092047830345207451926941075428246929075122113723634319517491078477.

Let p=1299721 and α=89. The integer
T=22967931147801119577057392151555529751590852881820311472128411333393169938767039237859844411753308995545617879257906080518909576843342909204783034520745192694107542824692907512211372363431951759241471 9
is a prime greater than $N_0$ such that $N_0 \equiv T\alpha^2 \pmod{p}$. Then
v=1008831 +1136976$x^1$+956702$x^2$+288775$x^3$+618031$x^4$+786694$x^5$++959534$x^6$+982257$x^7$+1079763$x^8$+606595$x^9$+1119948$x^{10}$+315803$x^{11}$++163055$x^{12}$+277569$x^{13}$+397201$x^{14}$+845775$x^{15}$+325656$x^{16}$+401316$x^{17}$++938657$x^{18}$+445914$x^{19}$+700279$x^{20}$+1078663$x^{21}$+1021990$x^{22}$+267966$x^{23}$++980433$x^{24}$+864073$x^{25}$+424418$x^{26}$+501729$x^{27}$+36106$x^{28}$+24162$x^{29}$++27979$x^{30}$+250922$x^{31}$+289611$x^{32}$+1050104$x^{33}$+1050583$x^{34}$+442750$x^{35}$++1280878$x^{36}$+1072587$x^{37}$+

$460680x^{38}+1126283x^{39}+679997x^{40}+1014612x^{41}++1071670x^{42}+478751x^{43}+479058x^{44}+1180741x^{45}+832872x^{46}+508143x^{47}++63586x^{48}+170412x^{49}+851654x^{50}+673439x^{51}+1294284x^{52}+760587x^{53}++906884x^{54}+973676x^{55}+50261x^{56}+1032425x^{57}+903379x^{58}+1286973x^{59}++180314x^{60}+1066029x^{61}+213083x^{62}+1032351x^{63}+1284994x^{64}+20x^{65}$.

It is now desired to find integers $\omega_0, \omega_1, \ldots$ modulo p such that $$v_0 \equiv \omega_0^2 \pmod{p}$$
$$v_1 \equiv 2\omega_0\omega_1 \pmod{p}$$
$$v_2 \equiv 2\omega_0\omega_2 + \omega_1^2 \pmod{p}$$
$$v_3 \equiv 2\omega_0\omega_3 + 2\omega_1\omega_2 \pmod{p}$$
$$v_4 \equiv 2\omega_0\omega_4 + 2\omega_1\omega_3 + \omega_2^2 \pmod{p}$$
$$\vdots \qquad \vdots \qquad \vdots$$
$$v_k \equiv \sum_{i=0}^{k} \omega_i\omega_{k-i} \pmod{p}$$
$$\vdots \qquad \vdots \qquad \vdots$$

With $\omega$=649676, the unique integers $\omega_i$ determined by these congruences are found in 1 millisecond on a single thread of an Intel(®) Core(™) i7-10700 CPU at 2.90 GHz, and are tabulated in Table 1, up to M=99.

| $\omega_i$ for $0 \leq i < M = 99$ in the example | | | | | |
|---|---|---|---|---|---|
| $\omega_0$ | 649676 | $\omega_1$ | 176555 | $\omega_2$ | 1210316 |
| $\omega_3$ | 880935 | $\omega_4$ | 990258 | $\omega_5$ | 1193444 |
| $\omega_6$ | 61049 | $\omega_7$ | 404278 | $\omega_8$ | 301580 |
| $\omega_9$ | 869756 | $\omega_{10}$ | 1182221 | $\omega_{11}$ | 157526 |
| $\omega_{12}$ | 106958 | $\omega_{13}$ | 412412 | $\omega_{14}$ | 97078 |
| $\omega_{15}$ | 1058759 | $\omega_{16}$ | 601585 | $\omega_{17}$ | 283394 |
| $\omega_{18}$ | 30547 | $\omega_{19}$ | 1154202 | $\omega_{20}$ | 85723 |
| $\omega_{21}$ | 1230004 | $\omega_{22}$ | 478092 | $\omega_{23}$ | 124906 |
| $\omega_{24}$ | 537915 | $\omega_{25}$ | 1149285 | $\omega_{26}$ | 811132 |
| $\omega_{27}$ | 25307 | $\omega_{28}$ | 181194 | $\omega_{29}$ | 334252 |
| $\omega_{30}$ | 1122689 | $\omega_{31}$ | 1274176 | $\omega_{32}$ | 582005 |
| $\omega_{33}$ | 65984 | $\omega_{34}$ | 767541 | $\omega_{35}$ | 966192 |
| $\omega_{36}$ | 26289 | $\omega_{37}$ | 1255833 | $\omega_{38}$ | 1277307 |
| $\omega_{39}$ | 930123 | $\omega_{40}$ | 666184 | $\omega_{41}$ | 168986 |
| $\omega_{42}$ | 1095395 | $\omega_{43}$ | 653414 | $\omega_{44}$ | 28041 |
| $\omega_{45}$ | 353354 | $\omega_{46}$ | 273125 | $\omega_{47}$ | 980499 |
| $\omega_{48}$ | 218587 | $\omega_{49}$ | 739819 | $\omega_{50}$ | 632834 |
| $\omega_{51}$ | 1055915 | $\omega_{52}$ | 715651 | $\omega_{53}$ | 156745 |
| $\omega_{54}$ | 885257 | $\omega_{55}$ | 1024532 | $\omega_{56}$ | 1188376 |
| $\omega_{57}$ | 296168 | $\omega_{58}$ | 474923 | $\omega_{59}$ | 1083529 |
| $\omega_{60}$ | 948621 | $\omega_{61}$ | 1024778 | $\omega_{62}$ | 539727 |
| $\omega_{63}$ | 53812 | $\omega_{64}$ | 176433 | $\omega_{65}$ | 825291 |
| $\omega_{66}$ | 1093610 | $\omega_{67}$ | 91679 | $\omega_{68}$ | 1019182 |
| $\omega_{69}$ | 937590 | $\omega_{70}$ | 754793 | $\omega_{71}$ | 441590 |
| $\omega_{72}$ | 343128 | $\omega_{73}$ | 507560 | $\omega_{74}$ | 272679 |
| $\omega_{75}$ | 536524 | $\omega_{76}$ | 1069159 | $\omega_{77}$ | 255311 |
| $\omega_{78}$ | 325334 | $\omega_{79}$ | 919125 | $\omega_{80}$ | 541698 |
| $\omega_{81}$ | 995762 | $\omega_{82}$ | 679297 | $\omega_{83}$ | 910068 |
| $\omega_{84}$ | 1116934 | $\omega_{85}$ | 832307 | $\omega_{86}$ | 1066863 |
| $\omega_{87}$ | 302115 | $\omega_{88}$ | 360316 | $\omega_{89}$ | 188493 |
| $\omega_{90}$ | 260955 | $\omega_{91}$ | 286776 | $\omega_{92}$ | 6525 |
| $\omega_{93}$ | 1128692 | $\omega_{94}$ | 842066 | $\omega_{95}$ | 135610 |
| $\omega_{96}$ | 382721 | $\omega_{97}$ | 705108 | $\omega_{98}$ | 658922 |

The complete factorization of v(x) modulo p is determined using the procedure described in 2 milliseconds on a single thread of an Intel(®) Core(™) i7-10700 CPU at 2.90 GHz:

$$v = (20) \times (x + 1164545) \times (x^3 + 401265x^2 + 1232398x + 446873) \times$$

$$\begin{pmatrix} x^{25} + 1126379x^{24} + 1007770x^{23} + 566898x^{22} + 468042x^{21} + \\ 1072384x^{20} + 1286593x^{19} + 1165876x^{18} + 531903x^{17} + 427926x^{16} + \\ 731970x^{15} + 461270x^{14} + 245668x^{13} + 98598x^{12} + 641038x^{11} + \\ 605298x^{10} + 217543x^9 + 174186x^8 + 1081462x^7 + 315399x^6 + \\ 203594x^5 + 659685x^4 + +325480x^3 + 150243x^2 + 11211680x + \\ 456996 \end{pmatrix} \times$$

$$\begin{pmatrix} x^{36} + 361419x^{35} + 314100x^{34} + 375904x^{33} + 338514x^{32} + 648035x^{31} + \\ 529983x^{30} + 640529x^{29} + 382523x^{28} + 920414x^{27} + 899851x^{26} + \\ 276259x^{25} + 227435x^{24} + 1192845x^{23} + 262010x^{22} + 846862x^{21} + \\ 475004x^{20} + 31544x^{19} + 1140348x^{18} + 914003x^{17} + 107624x^{16} + \\ 350295x^{15} + 407742x^{14} + 138534x^{13} + 756626x^{12} + 391910x^{11} + \\ 83332x^{10} + 741465x^9 + 822812x^8 + 456431x^7 + 890299x^6 + \\ 181841x^5 + 852774x^4 + +499863x^3 + 248842x^2 + 107144x + 399396 \end{pmatrix}$$

Up to a constant multiple, there are $2^4$=16 divisors of the polynomial v(x) modulo p, and so 16 pairs of polynomials (U(x),V(x)) to inspect. Inspecting all of these, the procedure discovers a factor at $U(x) = 1123166x + 523890x^2 + 927142x^3 + 167222x^4 + 822823x^5 +$
$502764x^6 + 583838x^7 + 1249813x^8 + 1012538x^9 + 203805x^{10} +$
$141747x^{11} + 14531x^{12} + 729864x^{13} + 916869x^{14} + 1111810x^{15} +$
$1205502x^{16} + 233558x^{17} + 270237x^{18} + 159711x^{19} + 875423x^{20} +$
$189604x^{21} + 411354x^{22} + 793239x^{23} + 2657x^{24} + 738498x^{25} +$
$99774x^{26} + 1216546x^{27} + 683420x^{28} + 486140x^{29} + 746799x^{30} +$
$997485x^{31} + 381191x^{32} + 207138x^{33} + 443132x^{34} + 1075495x^{35} +$
$1035499x^{36} + 245944x^{37} + 550724x^{38} + 1211194x^{39} + 206135x^{40} +$
$108418x^{41} + 62783x^{42} + 765632x^{43} + 1057982x^{44} + 1140896x^{45} +$
$594000x^{46} + 656521x^{47} + 324222x^{48} + 898643x^{49} + 999113x^{50} +$
$480855x^{51} + 753753x^{52} + 1185547x^{53} + 978129x^{54} + 523936x^{55} +$
$35359x^{56} + 407860x^{57} + 252530x^{58} + 700899x^{59} + 1039561x^{60} +$
$520664x^{61} + 247137x^{62} + 1217984x^{63} + 200730x^{64} + 870003x^{65}$.

The entire procedure takes 5263 seconds on a Slurm cluster consisting of 4 PCs, each with 16 threads running on an Intel(®) Core(™) i7-10700 CPU at 2.90 GHz.

Appendices

The Euclidean Algorithm

The extended Euclidean algorithm is an iteration of the division algorithm that allows one to compute s, t such that $sa+tb=gcd(a, b)$, Inputs: Positive integers a and b.
Outputs: Integers s,t,d $sa+tb=d$ where $$d = \inf\{sa+tb \mid s, t \in \mathbb{Z}, sa+tb > 0\}$$

is the greatest common divisor of a and b.

1. Let $\alpha \leftarrow a$, $\beta \leftarrow b$, $S \leftarrow 1$, $T \leftarrow 0$, $s \leftarrow 0$, $t \leftarrow 1$
2. If $\beta = 0$ then output s, t, $\alpha$ and exit the program.
3. Let q and r be the unique integers (from the division algorithm) such that $$\alpha = q\beta + r$$

4. Let $(S, s) \leftarrow (s - q*S, S)$, $(T, t) \leftarrow (t - q*T, T)$, $\alpha \leftarrow \beta$, $\beta \leftarrow r$, and go to 2.

Python Source Code

Here is an implementation in Python:

```
def euclid(a, b) :
    S=0
    T=1
    s=1
    t=0
    alpha = a
    beta = b
    while beta != 0:
        (q, r) = divmod(alpha, beta)
        (S, s) = (s-q*S, S)
        (T, t) = (t-q*T, T)
        alpha=beta
        beta=r
    return(s, t, alpha)
```

Modular Inversion

Given a modulus M and integer a relatively prime to M, a modular inverse of a is an integer b such that $ab \equiv 1 \pmod{M}$. The Euclidean algorithm can be used to determine a modular inverse as follows. Since a and M are relatively prime, apply the Euclidean algorithm to find integers s, t such that $$sa + tM = 1.$$

Then, $sa = 1 - tM$ implies $sa \equiv 1 \pmod{M}$. That is $b = s$ is a modular inverse of a.

Euclidean Algorithm for Polynomials Modulo N

Suppose that N is an integer, possibly composite.
Inputs: Polynomials a and b modulo N.
Outputs: Integers s, t, d such that $$sa + tb = d$$

where $$\deg d = \inf\{\deg(sa+tb) \mid s, t \in \mathbb{Z}, sa+tb \neq 0\}$$

is the greatest common divisor of a and b, or else a nontrivial factor of N.

1. Let $\alpha \leftarrow a$, $\beta \leftarrow b$, $S \leftarrow 1$, $T \leftarrow 0$, $s \leftarrow 0$, $t \leftarrow 1$
2. If $\beta = 0$, then let $\alpha_0$ be the leading coefficient of $\alpha$. If $\alpha_0$ is not coprime to N, then output their greatest common divisor. Else, output $s/a_0$, $t/a_0$, $a/a_0$ and exit the program.
3. If the leading coefficient of $\beta$ is not coprime with N, then output their greatest common divisor. Else let q and r be the unique polynomials (from the division algorithm) such that $\deg r < \deg \alpha$ and $$\alpha = q\beta + r$$

4. Let $(S, s) \leftarrow (s - q*S, S)$, $(T, t) \leftarrow (t - q*T, T)$, $\alpha \leftarrow \beta$, $\beta \leftarrow r$, and go to 2.

```
Python-Sage code
def euclid(g, a, b) :
    S=0
    T=1
    s=1
    t=0
    alpha = a
    beta = b
    while beta != 0:
        assert(s*a+t*b == alpha and S*a+T*b == beta)
        beta0 = beta.leading_coefficient( )
        d = gcd(beta0,beta.base_ring( ).characteristic( ))
        if d > 1:
            g.append(d)
            return(alpha, s, t)
        q = alpha // beta
        r = alpha % beta
        (S, s) = (s-q*S, S)
        (T, t) = (t-g*q*T, T)
        alpha=beta
        beta=r
    alpha0 = alpha.leading_coefficient( )
    d = gcd(beta0,beta.base_ring( ).characteristic( ))
    if d > 1:
        g.append (d)
    else:
        alpha = alpha / alpha0
        s = s / alpha0
        t = t / alpha0
    return(alpha, s, t)
```

Chinese Remainder Theorem

A version of the Chinese remainder theorem is needed that operates on polynomials modulo N, in the following sense. Suppose that $x_1$ and $x_2$ are two given polynomials modulo N and $m_1$ and $m_2$ are relatively prime, meaning that there exist $u_1$ and $u_2$ such that $u_1 m_1 + u_2 m_2 \equiv 1 \pmod{N}$. Then there exists a polynomial x such that $x \equiv x_1 \pmod{m_1}$ and $x \equiv x_2 \pmod{m_2}$, namely $x = x_1 u_2 m_2 + x_2 u_1 m_1$. The polynomial x is unique modulo $m_1 m_2$.

The following algorithm is sufficient to produce the required polynomial x, or else to produce a factor of N.

```
def    crt_f(g, x1, x2, m1, m2) :
   (d, u1, u2)   =    euclid(g, m1, m2)
   if     d.degree( )   >    0    and    g    =    [ ] :
      print("Unsupported:    m1    and    m2    must    be    coprime")
   elif    d    !=    1    and    g    =    [ ] :
      d    =    gcd(d[0],d.base_ring( ).characteristic( ) )
      g.apend(d)
   return(x1*u2*m2 + x2*u1*m1)
```

Digit Expansions

Division Theorem

Suppose that p is prime and N, r are given integers. It is of interest to determine whether there is an integer s such that $$N \equiv rs \pmod{p^k}. \quad (90)$$

Basically one can perform ordinary digitwise long division to compute s mod $p^k$ for which this holds. Note that this can be done for any r that is not divisible by p, so that solutions of (90) do not confer anything about potential factors of N. More precisely:

Theorem 7. Let N be an integer. For any integer r not divisible by p, there exists for every positive k a unique integer s with $0 \leq s < p^k$ such that (90) holds. The solution $s = s_k$ to (90) depends only on the reduction of r modulo $p^k$. Furthermore, when r is fixed, $s_k \equiv s_l \pmod{p^k}$ whenever k<l.

Proof. Since p is prime and r is not divisible by p, $\gcd(r, p^k) = 1$ for all $k \geq 0$. From the division algorithm, there exist integers $\alpha_k, \beta_k$ such that $$\alpha_k r + \beta_k p^k = 1. \quad (91)$$

Moreover, the residues $\alpha_k \pmod{p^k}$, $\beta_k \pmod r$ of a pair satisfying (91), are uniquely determined. Let s be the unique residue in $0 \leq s < p^k$ such that $N \alpha_k \equiv s \pmod{p^k}$. Then $$rs \equiv N \cdot (\alpha_k r) = N \cdot (1 - \beta_k p^k) = N - \beta_k N p^k \equiv N \pmod{p^k}.$$

This proves existence.

For the uniqueness of the residue $s_k \pmod{p^k}$, suppose s, s' both satisfy (90). Then $rs \equiv rs' \pmod{p^k}$, or $r \cdot (s-s') \equiv 0 \pmod{p^k}$. Since r is not divisible by p, this implies that $p^k | (s-s')$. That is, $s \equiv s' \pmod{p^k}$. The residue $s_k \pmod{p^k}$ is thus unique.

Finally, since $s \equiv s_k$ and $s \equiv s_l$ both satisfy $N \equiv rs \pmod{p^k}$, it follows by uniqueness of the residue $s_k$ that $s_l \equiv s_k \bmod p^k$. □

Long Division

Corollary 1. Given the integers N and r as in Theorem 7, there exists a unique sequence of digits $(a_0, a_1, \ldots)$ having the property that, for each k, $N \equiv r \cdot (a_0 + a_1 p + a_2 p^2 + \ldots + a_k p^k) \pmod{p^{k+1}}$.

One way to find the sequence $a_i$ is by "long division" of r into N, working from the lowest digits to the highest (unlike ordinary long division, which works from the most significant to least).

For example, long division of 137/352 in base p=5 returns the sequence of digits (up to the 18th digit);

$$1,1,3,4,4,4,2,2,1,4,1,2,4,0,1,1,4,3 \ldots$$

That is, $$s_{18} = 1 + 1p + 3p^2 + 4p^3 + 4p^4 + 4p^5 + 2p^6 + 2p^7 + 1p^8 + 4p^9 + 1p^{10} +$$
$$2p^{11} + 4p^{12} + 0p^{13} + 1p^{14} + 1p^{15} + 4p^{16} + 3p^{17} = 2936883406206.$$

This integer satisfies $$352 \cdot s_{18} \equiv 137 \pmod{p^k}$$

for k=1, 2, ..., 18.

The long division can be prolonged to obtain more terms of the digit sequence. For example, $$S_{24} = 1 + 1p + 3p^2 + 4p^3 + 4p^4 + 4p^5 + 2p^6 + 2p^7 + 1p^8 + 4p^9 + 1p^{10} +$$
$$2p^{11} + 4p^{12} + 0p^{13} + 1p^{14} + 1p^{15} + 4p^{16} + 3p^{17} + 2p^{18} +$$
$$0p^{19} + 3p^{20} + 3p^{21} + 0p^{22} + 2p^{23} = 255690379957624956$$

which satisfies $$352 \cdot s_{24} \equiv 137 \pmod{p^k}$$

for k=1,2, ... ,24.

However, despite the fact that and $352 \cdot s_k \equiv 137 \pmod{5^k}$ for all k, and $s_k$ and $s_l$ will share the first k digits whenever $l \geq k$, there is clearly no integer s that satisfies $352 \cdot s = 137$.

Factorization by Trial Division

Consider an example where an integer N=rs has been prepared, say N=250641205046503. With p=29, one has $$N = 10 + 14p + 11p^2 + 4p^3 + 14p^4 + 24p^5 + 0p^6 + 1p^7 + 8p^8 + 17p^9.$$

The goal of factorization is to find integers r, s>1 such that $N = r \cdot s$. Assuming r is a candidate divisor, a possible s can be constructed using long division. For example, if a hypothesis is made that the first two digits of r are 12 and 6, that is $r \equiv 12 + 6p \pmod{p^2}$. Then an s, should it exist, would be found by long division of r into N, tabulated in (92).

```
              25  12                                    (92)

12    6  10  14

10  15

28

28
```

Note that there is no obstruction to performing the division out to this number of digits. Corollary 1 implies that "long division" can be carried out to arbitrarily many digits, so there will never be an obstruction. Information on whether r is a divisor of N must therefore come from a magnitude constraint: that is, is the resulting quotient s obtained by long division null-terminated? Since the product $(25+12 \cdot p)(12+6 \cdot p)$ has fewer digits than N, no information is inferred on whether r could be a divisor of N from this division. It is necessary to consider more digits.

For example, hypothesizing that $$r = 12 + 6p + 1p^2 + 5p^3,$$

then (93) tabulates the resulting long division.

```
              25  12  21   4                           (93)

12    6   1   5  10  14  11   4

10  15   1  10

28   9  23

28  18  14

20   8

20  18

19

19
```

Because the integer r·s is still not as long as N, it is required to specify still more digits. Since N has ten digits mod p, it will only be possible for r·s to have enough digits if at least six digits of r are known. For example, hypothesizing that $$r = 12 + 6p + 1p^2 + 5p^3 + 23p^4 + 26p^5,$$

the answer is tabulated in (94).

```
              25  12  21   4   4  18  23   6  20  21   (94)

12    6   1   5  23  26  10  14  11   4  14  24   0   1   8  17

10  15   1  10  28   2  23

28   9  23  14  21   6   0   8  17

28  18  14   2  17   2  11

20   8  12   4   4  18   7  17

20  18  25  18  22  11  19

19  15  14  10   6  17  16

19  25   4  20   5  20   3

19   9  19   0  26  12
```

```
                              19  25   4  20   5  20

13  14   9  20  21

13  28  21   3  11

15  16  16  10

15   2  28  28

14  17  10

14   9   7

8   3

8  12

20

20
```

Only now, in (94), does it become clear that there is no divisor $r \equiv 12 + 6p + 1p^2 + 5p^3 + 23p^4 + 26p^5 \pmod{p^6}$, because the product of r and the digit sequence s resulting from long division (mod $p^6$) has more digits than the integer N to be factored.

A seemingly plausible way to factor is to inspect all choices of digits in r, testing whether there is an s such that rs=N. Unfortunately, Corollary 1 implies that any selection of digits in r, provided the first digit is not zero, gives rise to a unique digit sequence s. This digit sequence corresponds to an integer if and only if it terminates. However, to check the termination condition requires to carry the long division out far enough. This example illustrates a general principle that no information on the feasibility of a factor r can be determined until about half the digits of N are specified. So searching over r and using long division is no better than brute force trial division,

Inversion Modulo $p^k$

Related to the problem of division modulo powers of p is that of inversion: given the digits of an integer a, to find a digit expansion x such that $xa \equiv 1 \pmod{p^k}$. The following theorem characterizes the solutions to this problem. Later an algorithm shall be given for finding them.

Theorem 8. Let p be prime and a an integer not divisible by p. Then, for any positive integer k, there exists a unique integer $x_k$ between 0 and $p^k$ such that $x_k a \equiv 1 \pmod{p^k}$. Furthermore, if k<l, then $x_l \equiv x_k \pmod{p^k}$.

Proof For uniqueness, suppose that two solutions $x_k$ and $y_k$ are given. Then:

$$(x_k - y_k)a \equiv 0 \pmod{p^k}.$$

Since p is prime and does not divide a, it follows that $p^k | (x_k - y_k)$. That is, $x_k - y_k \equiv 0 \pmod{p^k}$ or $x_k \equiv y_k \pmod{p^k}$. Because $x_k$ and $y_k$ are between 0 and $p^k$ by assumption, they must therefore be equal.

For existence, since a is prime to $p^k$, the Euclidean algorithm gives integers s, t such that $$sa + tp^k = 1.$$

Thus $sa \equiv 1 \pmod{p^k}$, so setting $x_k = s \bmod p^k$ gives the required (unique) solution. □

An alternative algorithm can be given that usually requires fewer divisions. Specifically, an iteration is given that computes $x_{2^j}$. The case of general $x_k$ can be inferred from this by exploiting the uniqueness established in the theorem: $x_k \equiv x_{2^j} \pmod{p^k}$ for any power of two $2^j \geq k$.

For j=0, the Euclidean algorithm is applied to obtain s, t such that sa+tp=1. Then take $x_1 = s$ mod p, which then satisfies $x_1 a \equiv 1$ (mod p). Next, supposing that $x_{2^j}$ has been calculated, let $$x_{2^{j+1}} = (2 - x_{2^j} \alpha) x_{2^j} \mod p^{2^{j+1}}.$$

Let $|\cdot|_p$ denote the p-adic norm on the integers:

$$|n|_p = \inf\{p^{-r} | p^r | n\}.$$

Note that $$|1 - x_1 \alpha|_p \leq p^{-1} \tag{95}$$

because p divides $1 - x_1 a$. It shall be shown that $$|1 - x_{2^{j+1}} \alpha|_p \leq |1 - x_{2^j} \alpha|_p^2. \tag{96}$$

From (95) and (96) it follows by induction that $$|1 - x_{2^j} \alpha|_p \leq p^{-2^j}$$

for all j; that is:

$$x_{2^j} \alpha \equiv 1 \pmod{p^{2^j}},$$

as required.

It remains to show that (96) holds. Consider:

$$1 - x_{2^{j+1}} a = 1 - 2(2 - x_{2^j} a) x_{2^j} a$$
$$= (1 - x_{2^j} a) - (1 - x_{2^j} a) x_{2^j} a$$
$$= (1 - x_{2^j} a)^2.$$

So (96) now follows by multiplicativity of the norm.

The Algorithm

To summarize, the following algorithm can be used for inversion:

Inputs: A prime p, non-negative integer j, and integer a that is not divisible by p.

Output: An integer $0 < x_{2^k} < p^{2^k}$ such that $x_{2^k} \alpha \equiv 1$ (mod $p^{2^k}$).

1. Let (s, t, 1) be the output of the Euclidean algorithm with inputs a and p, so that $sa+tp=1$.

Let $x \leftarrow s$ mod p.
2. For j=1 to k, let $x \leftarrow (2 - x*a)*x$ mod $p^{2^k}$.
3. Return x.

Python Source Code

Here is an implementation:

```
#Compute   the   inverse   of   modulo   p^(2^k)
def         modInv(a, p, k) :
    (s, t, d)   =     euclid(a, p)
    x=s    %    p
    q=p
    for     _    in    range (0, k) :
        q   *=    q
        x   =    ( (2-x*a) *x)    %    q
    return(x)
```

Square Root of Digit Expansions

Let N be a quadratic residue modulo p.

Theorem 9. Let p be an odd prime and N a positive integer not divisible by p. Suppose that $0 \leq A_1 < p$ satisfies $A_1^2 \equiv N$ (mod p). Then, for any positive integer k there exists a unique integer $A_k$ in $0 \leq A_k < p^k$ such that $A_k^2 \equiv N$ (mod $p^k$) and $A_k \equiv A_1$ (mod p). Furthermore, if k<l, then $A_l \equiv A_k$ (mod $p^k$).

Proof For uniqueness, if $A_k$, $B_k$ are two solutions between 0 and $p^k$, then $$A_k^2 - B_k^2 = (A_k - B_k)(A_k + B_k) \equiv 0 \pmod{p^k}.$$

Reducing modulo p, it follows that p divides $A_k - B_k$. If p were to also divide $A_k + B_k$, then p would divide $A_k$ and $B_k$, and therefore would also divide N (because $A_k^2 \equiv N$ (mod p)). But this is contrary to the choice of N. Therefore, $p^k$ divides $A_k - B_k$. That is $A_k \equiv B_k$ (mod $p^k$). Since $A_k$ and $B_k$ are between 0 and $p^k$ by hypothesis, this implies $A_k = B_k$, and hence uniqueness. The last statement of the theorem is a consequence of the uniqueness, since $A_k$ and $A_l$ satisfy $A_k^2 \equiv N$ (mod $p^k$) and $A_l^2 \equiv N$ (mod $p^k$) implies that $A_l \equiv A_k$ (mod $p^k$).

This leaves only the matter of existence. The solution $A_k$ is computed as $A_k = A_{2^j}$ mod $p^k$ for a power of two $2^j \geq k$. The solution with $k = 2^j$ is constructed by the following iteration $$A_{2^{j+1}} = 2^{-1}(A_{2^j} + N A_{2^j}^{-1}) \tag{97}$$

where the inverses are computed modulo $p^{2^{j+1}}$ using the algorithm of inversion modulo p.

Note that $|N - A_1^2|_p \leq p^{-1}$. It will be shown that $$|N - A_{2^{j+1}}^2|_p = |N - A_{2^j}^2|_p^2$$

so that, by induction, $$|N - A_{2^j}^2|_p = p^{-2^j},$$

i.e., $$A_{2^j}^2 \equiv N \pmod{p^{2^j}},$$

as desired.

To prove it, denote by $1/A_{2^j}$ the inverse of $A_{2^j}$ modulo $p^{2^{j+1}}$. Then:

$$N - A_{2^{j+1}}^2 \equiv N - \frac{1}{4} A_{2^j}^2 - \frac{1}{2} N - \frac{1}{4} N^2 A_{2^j}^{-2}$$
$$\equiv \frac{1}{2}(N - A_{2^j}^2) + \frac{1}{4}\left(A_{2^j}^2 - \frac{N^2}{A_{2^j}^2}\right)$$
$$\equiv \frac{1}{2}(N - A_{2^j}^2) + \frac{1}{2}\frac{A_{2^j} + 1}{A_{2^j}}\left(A_{2^j} - \frac{N}{A_{2^j}}\right)$$
$$\equiv \frac{1}{2}(N - A_{2^j}^2)\left(1 - \frac{A_{2^j} + 1}{A_{2^j}}\right) \pmod{p^{2^{j+1}}}.$$

Next, note that $$1 - \frac{A_{2^{j+1}}}{A_{2^j}} \equiv \frac{1}{2}\left(\frac{N - A_{2^j}^2}{A_{2^j}}\right).$$

Substituting into the above now gives $$N - A_{2^{j+1}}^2 \equiv \frac{1}{4}(N - A_{2^j}^2)^2 A_{2^j}^{-1}$$

and therefore, by multiplicativity of the norm and since $|A_{2^j}|_p = 1$, $$|N - A_{2^{j+1}}^2|_p = |N - A_{2^j}^2|_p^2$$

as required. □

The Algorithm

The proof above contains the following algorithm, optimized to compute all of the required inverses together with the iterations.

Inputs: An odd prime p, integer N, integer $A_1$ such that $A_1^2 \equiv N \pmod{p}$, and a non-negative integer k.

Output: An integer $A_{2^k}$ such that $A_{2^k}^2 \equiv N \pmod{p^{2^k}}$.

1. If k=0 then output $A_1$ and exit. Else continue.
2. Let (s, t, 1) be the result of applying the Euclidean algorithm with inputs 2 and p, so that 2s+pt=1. Let s←mod p.
3. Let A←$A_1$, q←p.
4. Let (u, v, 1) be the result of applying the Euclidean algorithm with inputs $A_1$ and p, so that $A_1$u+pv=1. Let u←u mod p.
5. For j=1 to k repeat:
q←q*q
s←2*(1−s)*s (mod q)
u←(2−u*A)*u (mod q)
u←(2−u*A)*u (mod q)
A←s*(A+N*u) (mod q)
6. Return A.

(Note the repeated step in the inner loop.)

| Python source code |
|---|
| #Return the A such that A^2 == N (mod p^(2^k) ) and A==A1 (mod p) |
| #Uses the algorithm euclid(a,b) from earlier |
| def        modSqrt(N, A1, p, k) : |
|     if   k==0: |
|       return(A1     %     p) |
|     q=p |
|     (s, _, _)   =   euclid(2, p) |
|     s   =   s   %   p |
|     (u, _, _)   =   euclid (A1, p) |
|     u   =u   %   p |
|     A=   A1   %   p |
|     for   j   in   range(0, k) : |
|       q   *=   q |
|       s= (2*s* (1−s) )   %   q |
|       u= (u* (2−u*A) )   %   q |
|       u= (u* (2−u*A) )   %   q |
|       A= (s* (A+N*u) )   %   q |
|     return (A) |

Infinite Digit Expansions:

Naturally an infinite digit expansion cannot be fully represented on a computer, so consider such digit expansions as a computation that can be continued indefinitely:

An infinite digit expansion is a rule that, for each n=0,1 . . . , given the first n digits ($x_0$, $x_1$, . . . , $x_{n-1}$), gives the next digit $x_n$.

In representing an infinite digit expansion in computer memory, it is necessary to truncate it to some machine-sized limit. If such a cutoff is employed, it shall be chosen large enough not to interfere with any relevant features of the problem.

Carry Arithmetic

A digit expansion shall be a sequence of integers ($x_0$, $x_1$, . . . ) with $0 \leq x_i < p$, i=0,1, . . . Sequences can be subjected to the usual rules of addition-with-carry, multiplication-with-carry, subtraction-with-borrow, without regard for their size. Note that it is necessary to introduce some non-terminating sequences. For example, with p=5, the difference $(3+5 \cdot 5^2)-(1+2 \cdot 5+5^2)$ can be found. After subtracting one from three without difficulty in the ones' place, it is now required to subtract two from one in the p's place, so a borrow of one. That leaves a deficit of one in the $p^2$ place, so it is then necessary to borrow one from the next place, and so forth. Note that borrowing converts a 0 into p−1 (=4) plus a borrow from the next digit. Taken out to several digits, that is:

```
  3 1 1 0 0 0
− 1 2 1 0 0 0
─ ─ ─ ─ ─ ─
  2 4 4 4 4 4
```

But clearly this process of borrowing from 0 can be continued indefinitely, and the outcome of this computation is the non-terminating sequence (2,4,4,4,4, . . . ). It is also instructive to reverse the process, adding (1,2,1) to (2,4, 4,4, . . . ):

```
  2 4 4 4 4 4
+ 1 2 1 0 0 0
─ ─ ─ ─ ─ ─
  3 1 1 0 0 0
```

All of the borrows are now carries: whenever a 1 overflows into a 4, it gives zero with a carry of one to the next 4 in the chain, and so on ad infinitum.

It is convenient to identify the sequence ($x_0$, $x_1$, . . . ) with a formal sum of powers of p, $$x = \sum_{n=0}^{\infty} x_n p^n.$$

Then the arithmetic operations have their usual meanings, with carry, on infinite expressions.

Explicitly, suppose $$x = \sum_{n=0}^{\infty} x_n p^n$$

$$y = \sum_{n=0}^{\infty} y_n p^n.$$

Then the following rules hold:

Addition $$x + y = \sum_{n=0}^{\infty} z_n p^n$$

where for n=0,1, . . . , $$z_n = (x_n + y_n + c_n) \bmod p,$$

$$c_{n+1} = \lfloor (x_n + y_n + c_n)/p \rfloor$$

and $c_0$=0.

Subtraction $$x - y = \sum_{n=0}^{\infty} z_n p^n$$

where for n=0,1, ... , $z_n = (x_n - y_n + c_n) \bmod p,$ $c_{n+1} = \lfloor (x_n - y_n + c_n)/p \rfloor$ and $c_0 = 0$.

Multiplication $$x \cdot y = \sum_{n=0}^{\infty} z_n p^n$$

where for n=0,1, ... , $$z_n = \left(c_n + \sum_{k=0}^{n} x_k y_{n-k}\right) \bmod p$$

$$c_{n+1} = \left\lfloor p^{-1}\left(c_n + \sum_{k=0}^{n} x_k y_{n-k}\right)\right\rfloor$$

and $c_0 = 0$.

Theorem 9 can be reformulated using infinite digit expansions:

Theorem 10. Let p be an odd prime and N a positive integer not divisible by p. Suppose that $0 \le a_0 < p$ satisfies $a_0^2 \equiv N \pmod{p}$. Then there exists a unique digit expansion $A = (a_0, a_1, \ldots)$ such that $A^2 = N$.

Every quadratic residue has a square root.

Clearly not every quadratic residue is a perfect square. For example, the integer 6 is a quadratic residue modulo 5, but is plainly not a perfect square.

However, because of Theorem 10, any integer N that is a quadratic residue modulo p is a "perfect square" in the sense that there exists a digit expansion A such that $N = A^2$. Clearly such a digit expansion A must be infinite, unless N is a perfect square in the usual sense, as the example N=6, p=5 shows.

Because of Theorem 10, it is possible to solve the equation N=r·s, with the constraint that r and s have the same digits as one another (i.e., s=r). So although N has a "factorization" N=r·s where r and s are the same digit sequence, this common digit sequence does not terminate (unless N is a perfect square, which it is not in these applications). The algorithm described in conjunction with Theorem 9 supplies a rule for producing as many digits of the expansion A as desired.

In the example of 6 modulo 5, if A denotes the infinite digit expansion $A = 1 + 3 \cdot 5 + 0 \cdot 5^2 + 4 \cdot 5^3 + 2 \cdot 5^4 + 1 \cdot 5^5 + 2 \cdot 5^6 + 3 \cdot 5^7 + 1 \cdot 5^8 + 3 \cdot 5^9 + \ldots$ then $A^2 1 + 1 \cdot 5 + 0 \cdot 5^2 + 0 \cdot 5^3 + 0 \cdot 5^4 + 0 \cdot 5^5 + 0 \cdot 5^6 + 0 \cdot 5^7 + 0 \cdot 5^8 + 0 \cdot 5^9 + \ldots$ i.e., one has $A^2 = 6$ even though obviously no integer has this property.

Congruences

Definition 7. Let A, B, M be integers. The notation $A \equiv B \pmod{M}$ means that there exists an integer k such that
$A = B + kM$.

Here are properties of integer congruences:

Proposition 3

(a) $A \equiv A \pmod{M}$.
(b) For any integer l, $lM \equiv 0 \pmod{M}$.
(c) If $A \equiv B \pmod{M}$ then $B \equiv A \pmod{M}$.
(d) If l is a non-zero integer and $A \equiv B \pmod{l}M$, then $A \equiv B \pmod{M}$.
(e) If $A \equiv B \pmod{M}$ and $C \equiv D \pmod{M}$, then $A+C \equiv B+D \pmod{M}$ and $AC \equiv BD \pmod{M}$.
(f) If $A \equiv B \pmod{M}$ and f(x) is a polynomial with integer coefficients, then $f(A) \equiv f(B) \pmod{M}$.

Proof (a) Consider Definition 7 with k=0. Then A=A+kM. That is, $A \equiv A \pmod{M}$.
(b) Taking k=1, M=0+1M, so $M \equiv 0 \pmod{M}$.
(c) If A=B+kM, then B=A−kM=A+(−k)M. That is, $B \equiv A \pmod{M}$.
(d) If $A \equiv B \pmod{M}$, then A=B+klM=B+(kl)M, so $A \equiv B \pmod{M}$ (with kl playing the role of k in Definition 7).
(e) Suppose that A=B+kM and C=D+lM. Then A+C=B+D+(k+l)M and AC=BD+(Bl+Dk)M show, respectively, that $A+C \equiv B+D$ and $AC \equiv BD \pmod{M}$.
(f) This is true when $f(x)=x^k$, by the previous part. It is true for $f(x)=ax^k$, by (a) and the previous part. Then it is true if f(x) is an arbitrary integral linear combination of power functions, again by the previous part.

□

Proposition 4. Let M be a positive integer. Then, for each integer A, there exists a unique integer r with $0 \le r < M$, such that $A \equiv r \pmod{M}$.

Proof Recall that Euclidean division guarantees that there exist unique integers q and r, the quotient and remainder upon division of A by M, such that A=qM+r where the remainder satisfies $0 > r < M$. □

Theorem 11. If A and M are coprime integers, then, for any integer B, there exists an integer x such that $Ax \equiv B \pmod{M}$. Moreover, there is a unique x in the interval $0 \le x < M$, and any two solutions differ by a multiple of M.

The uniqueness is of special importance here because of the fact that it is usually simpler to check whether an integer x satisfies $Ax \equiv B \pmod{M}$ than it is to construct a solution. In cases where such solutions are desired, it is sufficient to check explicitly that the solution is correct: the details of the applications of the Euclidean division required to produce the solution in the first place can be omitted.

Proof The following lemma holds: the greatest common divisor of A and M is the least positive integer of the form sA+tM for integers s, t. To prove the lemma, let d=sA+tM be the least such positive integer. Since any common divisor of A and M divides d, it follows that gcd(A, M)|d. To show the opposite, that d divides A and M, and it is sufficient by symmetry to show that it divides A. Recall that if q and r are the quotient and remainder of division of A by d, then $$A = qd + r$$

where $0 \leq r < d$. To show that r=0, were it not the case, then note that $r = A - qd = A - q(sA+tM) = (1-qs)A + (-qt)M$ is a positive integer of the form s'A+t'M that is less than d. But d was supposed to be the least such positive integer, so this contradicts the choice of d. Thus it has been shown that d|A. Since also then d|M by symmetry, it now follows that d|gcd(A, M) and now it is proven these positive integers divide one another and thus they are equal.

Returning to the proof of the theorem, since A, M are coprime, there are integers s and t such that As+Mt=1. Multiplying by B this is A(Bs)+M(Bt)=B so that A(Bs)≡B (mod M). Thus x=Bs is the required solution.

For uniqueness, suppose two solutions x, x' are given, with $0 \leq x, x' < M$, then $A(x-x') \equiv 0$ (mod M). Since A has no divisors in common with M, this implies that $|x-x'|$ is divisible by M and the only integer in the interval $0 \leq |x-x'| < M$ with this property is $|x-x'|=0$, so x=x'. This completes the proof. □

Systems of Congruences

The systems of congruence employed here have the following form where p is a prime and the exponents $k_i$ are positive integers:

$$\begin{cases} A_1 \equiv B_1 \pmod{p^{k_1}} \\ A_2 \equiv B_2 \pmod{p^{k_2}} \\ \vdots \quad \vdots \\ A_m \equiv B_m \pmod{p^{k_m}} \end{cases} \quad (98)$$

The following corollary to Proposition 3 holds:

Proposition 5. Suppose that the pairs of integers $(A_i, B_i)$ satisfy the system (98) and $k_i'$ are any positive integers such that $k_i' \leq k_i$ for $1 \leq i \leq m$. Then for any integer pairs $(A_i', B_i')$ such that $$A_i' \equiv A_i \pmod{p^{k_i'}}$$

$$B_i' \equiv B_i \pmod{p^{k_i'}}$$

for $1 \leq i \leq m$, the system of congruences (99) also holds:

$$\begin{cases} A_1' \equiv B_1' \pmod{p^{k_1'}} \\ A_2' \equiv B_2' \pmod{p^{k_2'}} \\ \vdots \quad \vdots \\ A_m' \equiv B_m' \pmod{p^{k_m'}} \end{cases} \quad (99)$$

This proposition facilitates checking certain systems of congruences by hand.

Lifting Solutions of Systems of Congruences

When a system of congruences (99) is obtained from (98) as in Proposition 5, the system of congruences (99) arises from (98) by truncation. Proposition 5 implies that every solution to a system of congruence is also a solution to its truncation.

The converse is not true. However, the following principle does hold: every solution to a truncated system of non-degenerate polynomial congruences can be prolonged to a solution of the original system.

In more detail,

Theorem 12. Let $F_1(X_1, \ldots, X_n), \ldots, F_n(X_1, \ldots, X_n)$ be integer polynomials in the indeterminates $X_1, \ldots, X_n$. For any solution any positive integers $k_1, \ldots, k_1$, and for every solution $(X_1^*, X_2^*, \ldots, X_n^*)$ modulo p to the system of congruences $$F_1^*(X_1^*, \ldots, X_n^*) \equiv 0 \pmod{p}$$

$$F_2(X_1^*, \ldots, X_n^*) \equiv 0 \pmod{p}$$

$$\vdots \quad \vdots$$

$$F_M(X_1^*, \ldots, X_n^*) \equiv 0 \pmod{p}$$

such that the determinant of the matrix of partial derivatives $(\partial F_i/\partial X_j)(X_1^*, \ldots, X_n^*)$ is not divisible by p. Then there exists a unique solution $(X_1', \ldots, X_n')$ of $$F_1(X_1', \ldots, X_n') \equiv 0 \pmod{p^{k_1}}$$

$$F_2(X_1', \ldots, X_n') \equiv 0 \pmod{p^{k_2}}$$

$$\vdots \quad \vdots$$

$$F_M(X_1', \ldots, X_n') \equiv 0 \pmod{p^{k_m}}$$

such that $(X_1', \ldots, X_n')$ modulo p is congruent to $(X_1^*, \ldots, X_n^*)$.

Proof Let $X=(X_1, \ldots, X_n)$ and DF(X) be the matrix of partial derivatives of F. If Σ is any n-dimensional vector of integers, then $$F(X^* + p\Sigma) = F(X^*) + p DF(X^*) \cdot \Sigma \pmod{p^2}. \quad (100)$$

Since $F(X^*) \equiv 0$ (mod p), all components of the vector $F(X^*)$ are divisible by p, and so the following definition is allowed:

$$\Sigma = -DF(X^*)^{-1} (F(X^*)/p)$$

where the inverse matrix $DF(X^*)^{-1}$ is computed modulo p (by hypothesis, it is invertible).

Then (100) implies that $F(X^* + p\Sigma) \equiv 0$ (mod $p^2$). Now iterate this construction with $p^2$ instead of p, and so on. The iteration is none other than Newton's method:

$$X_{n+1} = X_n - DF(X_n)^{-1} F(X_n)$$

and the same argument shows by induction that $F(x_{n+1}) \equiv 0$ (mod $p^{2^{n+1}}$).

For uniqueness, it is sufficient to exhibit a metric space for which the iteration $\Phi(X) = X - DF(X)^{-1} F(X)$ is strictly contractive. To this end, let $\mathbb{Z}_p$ denote the p-adic integers and extend Φ by density onto $\mathbb{Z}_p^n$, where $\mathbb{Z}_p^n$ is given the finite-dimensional $l^\infty$ metric. Then:

Φ(x) is contractive on the closed subset $F(X) \equiv 0$ (mod p). To prove it, suppose $F(X), F(Y) \equiv 0$ (mod p). Denote by A the linear form such that $DF(Y)^{-1} = DF(X)^{-1} + A(Y-X) + o(|Y-X|_\infty)$. Note that A is an integral form (i.e., has entries in $\mathbb{Z}_p$), because of the hypothesis on the determinant of DF(X). Then $$\phi(Y) - \phi(X) = (Y-X) + \left(DF(X)^{-1} F(X) - DF(Y)^{-1} F(Y)\right) + o(|Y-X|)$$

$$= (Y-X) + \left(DF(X)^{-1} F(X) - DF(X)^{-1} + \right.$$

-continued $$A(Y-X))(F(X)+DF(X)(Y-X)))+o(|Y-X|)$$
$$=A(Y-X)F(X)+o(|Y-X|).$$

Since $F(X)\equiv 0 \pmod{p}$, it then follows that $|\Phi(Y)-\Phi(X)| \le p^{-1}|Y-X|$. Thus $\Phi$ is a strict contraction on a closed subset of a complete metric space, and therefore has a unique fixed point. □

Note that the proof of the theorem also contains an effective method for constructing the lifted solution (Newton's method).

Triangular Systems

A system of polynomials $F_1(X_1)$, $F_2(X_1, X_2)$, ..., $F_n(X_1, \ldots, X_n)$, where the k-th polynomial of the system depends only on the first k variables, is called lower triangular. It is easier to formulate uniqueness for lower-triangular systems, and these are the only kinds of systems that shall be considered henceforth.

Theorem 13. Suppose that $F_1(X_1)$, $F_2(X_1, X_2)$, ..., $F_n(X_1, X_2, \ldots, X_n)$ is a lower-triangular system such that the diagonal partial derivatives $\infty F_1$, $\infty X_1$, $\infty F_2/\infty X_2$, ..., $\infty F_n/\infty X_n$ are non-zero constants modulo p. Then for any positive integers $k_i$, there exists a unique solution to the system $$F_1(X_1) \equiv 0 \pmod{p^{k_1}}$$
$$F_1(X_1, X_2) \equiv 0 \pmod{p^{k_2}}$$
$$\vdots \qquad \vdots$$
$$F_n(X_1, X_2, \ldots, X_n) \equiv 0 \pmod{p^{k_n}}$$

such that $0 \le X_i < p^{k_i}$ for $i=1, \ldots n$. Moreover, any two solutions $X_i$ and $X_i'$ are congruent modulo $p^{k_i}$.

Proof. The proof is by induction on the number of equations. The condition on $\infty F_1/\infty X_1$ implies that $F_1$ has the following form $$F_1(X_1) = a_1 X_1 + b_1 + p R_1(X_1)$$

where $R_1(X_1)$ is an integral polynomial. By hypothesis, $a_1$ is not zero modulo p, and so $a_1 X_1 + b_1 \equiv 0 \pmod{p}$ has a unique solution modulo p. Theorem 12 implies the uniqueness of the lift.

Assuming the theorem has been established for a lower triangular system $F_1(X_1), \ldots, F_n(X_1, \ldots, X_n)$ it is now sufficient to show how to prove it when there is one more relation $F_{n+1}(X_1, \ldots, X_{n+1})$. As in the n=1 case, the hypothesis implies $$F_{n+1}(X_1, \ldots, X_{n+1}) = a_{n+1} X_{n+1} + b_{n+1} + p R_{n+1}(X_1, \ldots, X_{n+1}))$$

where $a_{n+1}$ is a nonzero constant and $b_{n+1}$ is a polynomial in $(X_1, \ldots, X_n)$, which have already been determined and so can be eliminated. Because $a_{n+1} X_{n+1} + b_{n+1} \equiv 0 \pmod{p}$ has a unique solution for $X_{n+1}$, it therefore follows, again by Theorem 12, that the equation $a_{n+1} X_{n+1} + b_{n+1} + p R_{n+1} \equiv 0 \pmod{p^{k_{n+1}}}$ also has a unique solution. □

Polynomial Factorization

Suppose that f(x) is a polynomial of degree $d \ge 1$ modulo $p^M$ where p is prime and $M \ge 1$. Factorization of f has two phases. The second phase is known as Hensel lifting: given any factorization of f(x) modulo p, say $f(x) \equiv f_1(x) f_2(x) \ldots f_r(x) \pmod{p}$, there exists a unique factorization of f(x) modulo $p^M$, $f(x) \equiv \bar{f}_1(x) \bar{f}_2(x) \ldots \bar{f}_r(x) \pmod{p^M}$ such that $\bar{f}_i(x) \equiv f_i(x) \pmod{p}$ for each i. Moreover, there exists a $O^\sim(dM)$ algorithm for determining the factors $\bar{f}_i$. Therefore, the problem of factoring modulo a prime power reduces to the problem of factoring modulo a prime.

Factorization Modulo a Prime

Factorization modulo an odd prime p is achieved with the following algorithm.

Input

A monic polynomial f(x) of degree $d \ge 1$, modulo an odd prime p.

Output

A set of pairs $\{(f_i(x), e_i)\}$ of monic polynomials $f_i(x)$ that are irreducible mod p, and multiplicities $e_i$, for $1 \ge i \ge r$, such that $f(x) \equiv f_1(x)^{e_1} f_2^{e_2} \ldots f_r(x)^{e_r}$.
1. Initialize: Let $h \leftarrow x$, $\phi \leftarrow f$, $i \leftarrow 0$, $U \leftarrow \{\ \}$.
2. Let $i \leftarrow i+1$
3. By repeated squaring mod f, compute $$h \leftarrow h^p \bmod f.$$

Then set $$g \leftarrow gcd(h-x, \phi)$$

4. If $g \ne 1$, then call the equal-degree factorization subroutine, with input g and i, and keep the list of irreducible factors $g_1, \ldots, g_s$ of g.
5. For j=1 to s do:
    Let $e \leftarrow 0$ While $g_j | \phi$ do $\phi \leftarrow \dfrac{\phi}{g_j}$ and $e \leftarrow e+1$.

$U \leftarrow U \cup \{(g_j, e)\}$
6. If $\phi \ne 1$, then go to 2. Else return U.

Equal-Degree Factorization Subroutine

The following subroutine is used in the main algorithm.

Input

A square-free monic polynomial f modulo p of degree $n > 0$, and a divisor $d < n$ of n, such that all irreducible factors of f have degree d.

Output

The monic irreducible factors f mod p.
1. If n=d, return $\{f\}$.
2. Choose a polynomial a mod p with $1 < \deg \alpha < n$.
3. Let $g_1 \leftarrow gcd(a, f)$. If $g_1 \ne 1$, then call the algorithm recursively with $g_1$ and $f/g_1$, and return the union of the outputs of the two function calls. Else, go to 4.
4. Compute $b \leftarrow a^{(p^d-1)/2} \bmod f$, by using repeated squaring modulo f, p.
5. Let $g_2 \leftarrow gcd(b-1, f)$. If $g_2 \ne 1$ and $g_2 \ne f$, then call the algorithm recursively with $g_2$ and $f/g_2$, and return the union of the outputs of the two function calls. Else go to 2.

Lifting to Higher Powers of p

Recall Hensel's lemma:

Theorem 14. Let p be a prime and f(x) be an integer polynomial admitting a factorization $f(x) \equiv a(x)b(x) \pmod{p}$. Then, for any $M \geq 1$, there exist unique (p,M)-standard polynomials $\tilde{a}(x)$, $\tilde{b}(x)$ with $\tilde{a}(x) \equiv a(x) \pmod{p}$ and $\tilde{b}(x) \equiv b(x) \pmod{p}$ such that $f(x) \equiv \tilde{a}(x)\tilde{b}(x) \pmod{p^k}$.

The polynomials $\tilde{a}(x)$ and $\tilde{b}(x)$ are called the lifts of the factors $a(x)$ and $b(x)$.

A corollary in the present application is:
Every persistent solution to $$r(x)s(x) \equiv v(x) \pmod{p}$$

where $r(x)=A(x)+U(x)-V(x)$, $s(x)=A(x)-U(x)-V(x)$, lifts to a unique solution to $$r(x)s(x) \equiv v(x) \; (\text{SP}_{p^k})$$

where U(x) and V(x) are standard polynomials.

One Step of the Lift

For a factorization f=gh into a pair of factors, the lift is constructed using the following recursive procedure.

Inputs: A p-adic polynomial f and p-adic polynomials $g_k$, $h_k$, $s_k$, $t_k$ such that $$f \equiv g_k h_k \pmod{p^{2^k}}$$

$$s_k g_k + t_k h_k \equiv 1 \pmod{p^{2^k}}.$$

Outputs: p-adic polynomials $g_{k+1}, h_{k+1}, s_{k+1}, t_{k+1}$ such that $$f \equiv g_k h_k \pmod{p^{2^{k+1}}}$$

$$s_k g_k + t_k h_k \equiv 1 \pmod{p^{2^{k+1}}}.$$

Let $e \leftarrow f - g_k h_k$, and then $s_k e \leftarrow qh_k + r$ using the division algorithm for polynomials.
Let $h_{k+1} \leftarrow h_k + r$ and $g_{k+1} \leftarrow g_k + t_k e + qg_k$.
Let $b \leftarrow s_k g_{k+1} + t_k h_{k+1} - 1$ and then $s_k b \leftarrow ch_{k+1} + d$ using the division algorithm for polynomials.
Let $s_{k+1} \leftarrow s_k - d$ and $t_{k+1} \leftarrow t_k - t_k b - cg_{k+1}$.

Multifactor Lifting

To lift several factors, one employs a divide and conquer approach. Given a (pairwise coprime) factorization of $f = g_1 g_2 \cdots g_r$:

If r is 1, there is nothing to do. Otherwise, divide the $g_i$ into two sets, and let (say) g be the product of the polynomials $g_i$ in the first set and h the product of the polyniomials $h_i$ in the second. For the factorizations $g = \Pi_i g_i$ and $h = \Pi_i h_i$, recursively call the (multifactor) algorithm. Then, for f=gh call the algorithm of (12.4.4).

Polynomials Modulo a Prime

Polynomial Inversion

Let p be an odd prime and consider polynomials $v(x) = \alpha_0 + \alpha_1 x + \ldots + \alpha_n x^n$ where the coefficients are integers $0 \leq \alpha_i < p$ for each i. The usual rules for polynomial arithmetic are observed, but the coefficients are reduced modulo p. The rules for arithmetic are then extended to power series modulo p. Operating on sequences, the rules are the same as those of digit sequences except that the carry is discarded. Thus the arithmetic of power series modulo p is arithmetic without carry.

Theorem 15. Let f(x) be a polynomial modulo p and suppose that p does not divide f(0). Then there exists a unique power series g(x) such that $f(x)g(x) \equiv 1 \pmod{p}$.

Proof. For uniqueness, if there were two solutions g and g', then $f(x)(g(x)-g'(x)) \equiv 0 \pmod{p}$ implies that $g(x)-g'(x) \equiv 0 \pmod{p}$ and so the polynomials g(x) and g'(x) are the same modulo p.

For existence, it will suffice to give an efficient algorithm for constructing the inverse. Since p does not divide f(0), the Euclidean algorithm gives a coefficient $g_0$ modulo p such that $$f(0)g_0 \equiv 1 \pmod{p}.$$

Then, for k=0,1,..., define $$g_{k+1} = (2 - g_k f)g_k \bmod p^{2^{k+1}}.$$

Let $|\cdot|$ denote the x-adic norm on the power series:

$$|g(x)| = \inf\{2^{-k} | x^k | g(x)\}.$$

Note that $$|1 - g_0 f| \leq 2^{-1} \qquad (101)$$

because x divides $1 - g_0 f$. It is now shown that also $$|1 - g_{k+1} f| \leq |1 - g_k f|^2. \qquad (102)$$

From (101) and (102) it follows by induction that $$|1 - g_k f| \leq 2^{-2^k}$$

for all j; that is:

$$g_k f \equiv 1 \pmod{x^{2^k}}.$$

Also, if k<k', $|g_k - g_{k'}| < 2^{-2^k}$, and it follows that $g_k$ and $g_{k'}$ agree for the first $2^k$ terms. Thus the series whose first $2^k$ terms agree with $g_k$ is well-defined.

It remains to show that (102) holds. Consider $$\begin{aligned} 1 - g_{k+1} f &= 1 - 2(2 - g_k f) g_k f \\ &= (1 - g_k f) - (1 - g_k f) g_k f \\ &= (1 - g_k f)^2. \end{aligned}$$

So (102) now follows by multiplicativity of the norm. □

Square Root

Theorem 16. Suppose that v(x) is a polynomial modulo p such that v(0) is a quadratic residue modulo p, say $\alpha^2 \equiv v(0) \pmod{p}$. Then there exists a unique power series A(x) mod p such that $A(x)^2 \equiv v(x) \pmod{p}$ and $A(0) \equiv \alpha \pmod{p}$.

Proof. For uniqueness, if A, B are two solutions, then $$A^2 - B^2 = (A-B)(A+B) \equiv 0 \pmod{p}.$$

Thus p divides either A−B or A+B, meaning that $A \equiv \pm B \pmod{p}$. Hence, only one of A, B can satisfy $A \equiv \alpha \pmod{p}$. Therefore the solution is unique.

This leaves only the matter of existence. Define a sequence $A_0, A_1, \ldots$ by $A_0 = \alpha$, and $$A_{k+1} = 2^{-1}(A_k + vA_k^{-1}) \bmod x^{2^{k+1}} \qquad (103)$$

where the inverses are computed modulo $x^{2^{k+1}}$ using the algorithm of inversion modulo p.

Note that $|v - A_0^2| \leq 2^{-1}$. It shall be shown that $$|v - A_{k+1}^2| = |v - A_k|^2$$

so that, by induction, $$|v-A_k^2|_p = 2^{-2^k},$$

i.e., $$A_k^2 \equiv v \pmod{x^{2^k}}.$$

as desired.

To prove it, denote by $1/A_k$ the inverse of $A_k$ modulo $x^{2^{k+1}}$. Then:

$$v - A_{k+1}^2 \equiv v - \frac{1}{4}A_k^2 - \frac{1}{2}v - \frac{1}{4}v^2 A_k^{-2}$$
$$\equiv \frac{1}{2}(v - A_k^2) + \frac{1}{4}\left(A_k^2 - \frac{v^2}{A_k^2}\right)$$
$$\equiv \frac{1}{2}(v - A_k^2) + \frac{1}{2}\frac{A_{k+1}}{A_k}\left(A_k - \frac{v}{A_k}\right)$$
$$\equiv \frac{1}{2}(v - A_k^2)\left(1 - \frac{A_{k+1}}{A_k}\right) \pmod{x^{2^{k+1}}}.$$

Next, note that $$1 - \frac{A_{k+1}}{A_k} \equiv \frac{1}{2}\left(\frac{v - A_k^2}{A_k}\right).$$

Substituting into the above now gives $$v - A_{k+1}^2 \equiv \frac{1}{4}(v - A_k^2)^2 A_k^{-1}$$

and therefore, by multiplicativity of the norm and since $|A_k|=1$, $$|v-A_{k+1}^2| = |v-A_k^2|^2,$$

as required. □

References, All of Which are Incorporated by Reference Herein

1. Coraluppi, Giorgio, Method and apparatus for factoring large integers, U.S. Pat. No. 10,298,393, 21 May 2019.
2. von zur Gathen, Joachim and Gerhard, Jürgen, Modern computer algebra, Cambridge University Press, 2013.
3. C. F. Gauss, Disquisitiones Arithmeticae, New York, NY: Springer-Verlag, 1986.
4. R. L. Rivest, A. Shamir, L. Adleman, A Method for Obtaining Digital Signatures and Public-Key Cryptosystems, Communications of the ACM, 21, 120-125, 1978.

Preferred Embodiment

An integer $N_0$ to be factored is given. A prime p and vector of positive integers $k=[k_0, k_1, \ldots, k_{M-1}]$ are selected. See FIG. 2.

A polynomial $v(x) = v_0 + v_1 x + \ldots + v_{n-1} x^{n-1}$ is determined such that $v(p) = N$ is a predetermined multiple of $N_0$.

A $p^k$-standard polynomial $A(x)$ is determined such that $A(x)^2 \equiv v(x)$ $(SP_{p^k})$.

A polynomial $f(x) = f_0 + f_1 x + f_2 x^2 + \ldots + f_{M-1} x^{M-1}$ is called $p^k$-standard if $$0 \leq f_i < p^{k_i}$$

for $i = 0, 1, \ldots, M-1$.

The "$p^k$-standard part" of a polynomial $f(x)$ is computed by reducing the coefficient of $x^i$ by $p^{k_i}$, using the division algorithm.

The standard polynomial $A(x)$ is determined by starting with the constant polynomial $A_0(x) = \omega_0$ where $\omega_0$ is an integer such that $\omega_0^2 \equiv N_0 \pmod p$, and then performing the iteration $$A_{j+1}(x) = 2^{-1}(A_j(x) + v(x) A_j(x)^{-1}) \ (SP_{p^k}).$$

The roster of pairs $(U(x), V(x))$ is determined such that there is a persistent standard polynomial factorization:

$$(A(x)-U(x)-V(x))(A(x)+U(x)-V(x)) \equiv v(x) \ (SP_{p^k})$$

A standard polynomial factorization $v(x) \equiv r(x) s(x)$ is called persistent if $r(x)$ and $s(x)$ have the same degree as their reductions modulo p.

The persistent factorizations are determined by first factoring $v(x)$ modulo p, and then lifting to a standard polynomial factorization.

The factorization of $v(x)$ is achieved by first splitting factors by iterating, with repeated squaring, $x \to x^p \pmod v$, using the division algorithm to compute the remainder on division by v, then computing the greatest common divisor using the Euclidean algorithm with $x^q - x$ and $v(x)$. Then, with each of the factors so split, further splitting into factors of equal degree.

The Euclidean algorithm for inputs f and g is a procedure for determining their greatest common divisor. Exchange f and g if necessary so that $\deg f \geq \deg g$. If g is the zero polynomial, return f. If f or g has degree 0, then the output is 1. Otherwise use the division algorithm to compute the remainder r of f on division by g, which will have degree less than that of g, and recursively call the Euclidean algorithm with inputs g, r.

Factors of a polynomial f of degree n that splits as a product of distinct polynomials all known to have the same degree d proceeds by starting with a random non-constant polynomial a of degree less than f, computing $\alpha^{(p^d-1)} \pmod f$ using the division algorithm and repeated squaring, using the Euclidean algorithm to test if $\alpha^{p^d-1} - 1$ shares a factor with f. If so, then f splits and the algorithm is called recursively on the parts. If not, then a new (random) polynomial a is selected.

The lift is computed as follows. If $v(x)$ factors modulo p as a product $g_0(x) h_0(x)$, where $g_0, h_0$ share no common factor, then the extended Euclidean algorithm is employed to find polynomials $s_0(x), t_0(x)$ modulo p such that $s_0(x) g(x) + t_0(x) h(x) = 1$. For each integer j starting from 0 and increasing until the desired lift is obtained (for a $p^k$-standard factorization), a polynomial is computed $e = f - g_j h_j$, then polynomials q, r are computed using the division algorithm so that $s_j e = q h_j + r$. Let $h_{j+1} = h_j + r$ and $g_{j+1} = g_j + t_j e_j + q g_j$. Then let $b = s_j g_{j+1} + t_j h_{j+1}$ and use the division algorithm to find c, d where $s_j b = c h_{j+1} + d$. Then let $s_{j+1} = s_j - d$ and $t_{j+1} = t_j - t_j b - c g_{j+1}$.

The extended Euclidean algorithm takes inputs a, b and produces (s, t, α) where $sa + tb = a$ and a is the greatest common divisor of a, b. (1) Let $\alpha = \alpha$, $\beta = b$, $S = 1$, $T = 0$, $s = 0$, $t = 1$. (2) If $\beta = 0$, then output (s, t, α). Use the division algorithm to find q, r such that $\deg r < \deg \beta$ and $\alpha = q\beta + r$. Let $(S, s) = (s - qS, S)$ and $(T, t) = (t - qT, T)$, $\alpha = \beta$, $\beta = r$ and go back to (2).

For each persistent standard polynomial factorization $$v(x) \equiv (A(x) - U(x) - V(x))(A(x) + U(x) - V(x)) \ (SP)$$

the carry is determined by $$(A(p)-U(p)-V(p))(A(p)+U(p)-V(p))-v(p) \equiv BV(p)+C$$

which defines constants B and C.

An integer a is computed using the division and extended Euclidean algorithms such that $a=(B^2/4+A(p)B)$ mod $N_0$. (The extended Euclidean algorithm is necessary to invert 4 modulo $N_0$.)

An initial point in a set of quartuples of integers modulo $N_0$ (the projective space) is $[X_0, X_1, X_2, X_3]=[1,0,CU(p) \bmod N_0, 0]$, and the semigroup law is repeated starting from this point.

The semigroup law applies, given a pair of elements $[X_0: X_1: X_2: X_3]$ and $[Y_0: Y_1: Y_2: Y_3]$ of the projective space, to produce a third point $[Z_0, Z_1, Z_2, Z_3]$:

It is tested whether $[X_0: X_1: X_2: X_3] \equiv [Y_0: Y_1: Y_2: Y_3]$ (mod $N_0$). If so, then the point $[Z_0, Z_1, Z_2, Z_3]$ is $$Z_0 \equiv 16 X_0^4 X_2^4 \pmod{N_0}$$

$$Z_1 \equiv X_0^4 X_2^2 \left(4 X_3^2 - 16 C^2 U^2 X_0^2 a - 32 C^2 U(p)^2 X_0 X_1\right) \pmod{N_0}$$

$$Z_2 \equiv -2 X_0 X_2 \begin{pmatrix} 8 X_0^3 X_1^3 a^3 + 36 X_0^2 X_1^4 a^2 - 8 X_0^3 X_1 X_2^2 a^2 + 54 X_0 X_1^5 a - \\ -36 X_0^2 X_1^2 X_2^2 a + 27 X_1^6 - 36 X_0 X_1^3 X_2^2 + 8 X_0^2 X_2^4 \end{pmatrix} \pmod{N_0}$$

$$Z_3 \equiv \left(4 X_0^2 X_1^2 a^2 + 12 X_0 X_1^3 a - 4 X_0^2 X_2^2 a + 9 X_1^4 - 8 X_0 X_1 X_2^2\right)^2 \pmod{N_0}$$

Otherwise, the point $[Z_0, Z_1, Z_2, Z_3]$ is:

$$Z_0 \equiv (X_1 Y_0 - X_0 Y_1)^4 X_0^2 Y_0^2 \pmod{N_0}$$

$$Z_1 \equiv X_0^3 Y_0^3 (X_1 Y_0 - X_0 Y_1)^2 \left(2 C^2 U(p)^2 X_0 Y_0 + 2 X_1 Y_1 a + X_3 Y_1 - 2 X_2 Y_2 + X_1 Y_3\right) \pmod{N_0}$$

$$Z_2 \equiv X_0^3 Y_0^3 (X_1 Y_0 - X_0 Y_1) \begin{pmatrix} -4 C^2 U(p)^2 X_0 X_2 Y_0^2 + 4 C^2 U(p)^2 X_0^2 Y_0 Y_2 + \\ + X_1 X_3 Y_0 Y_2 + 3 X_0 X_3 Y_1 Y_2 - 3 X_1 X_2 Y_0 Y_3 - \\ -X_0 X_2 Y_1 Y_3 - 2a \begin{pmatrix} X_1 X_2 Y_0 Y_1 - X_0 X_3 Y_0 Y_2 - \\ -X_0 X_1 Y_1 Y_2 + X_0 X_2 Y_0 Y_3 \end{pmatrix} \end{pmatrix} \pmod{N_0}$$

$$Z_3 \equiv \begin{pmatrix} (X_1 Y_0 - X_0 Y_1)^2 X_0 Y_0 a + X_1^3 Y_0^3 - X_0 X_2^2 Y_0^3 - X_0 X_1^2 Y_0^2 Y_1 - \\ -X_0^2 X_1 Y_0 Y_1^2 + X_0^3 Y_1^3 + 2 X_0^2 X_2 Y_0^2 Y_2 - X_0^3 Y_0 Y_2^2 \end{pmatrix}^2 \pmod{N_0}$$

The semigroup law is repeated, possibly in batches to minimize the number of arithmetic operations performed. There is a test if the semigroup reaches the boundary of the projective space; when it does so, a factorization of $N_0$ is achieved.

If a factorization of $N_0$ is not achieved after a preselected amount of time, a different multiple of $N_0$ shall be selected in lieu of N, and the process is repeated until a factor is found.

DESCRIPTION OF THE INVENTION

The present invention pertains to a method for decoding an encrypted electromagnetic signal W encoded by a first computer with public key $N_0=r \times s$, where $N_0$, r and s are integers. See FIGS. 1-4. The method comprises the steps of obtaining the electromagnetic signal W from a telecommunications network, or a data network or an Internet or a first non-transient memory. There is the step of storing the signal W in a second non-transient memory. There is the step of decoding with a second computer in communication with the second non-transient memory the signal W in the second non-transient memory by factoring the public key $N_0$ in at most a time $O(\log^6 N_0)$ with the second computer generated steps of selecting integers a, b. There is the step of electing an initial point in a set of quartuples of integers modulo $N_0$ (a projective space) $[X_0, X_1, X_2, X_3]=[1,0,b,0]$. There is the step of applying a semigroup law repeatedly starting from the initial point, where the semigroup law is defined as: given a pair of elements $[X_0: X_1: X_2: X_3]$ and $[Y_0: Y_1: Y_2: Y_3]$ of the projective space, there is produced a third point $[Z_0, Z_1, Z_2, Z_3]$. There is the step of determining that $[X_0: X_1: X_2: X_3] \equiv [Y_0: Y_1: Y_2: Y_3] \pmod{N_0}$, and thus the third point is $$Z_0 \equiv 16 X_0^4 X_2^4 \pmod{N_0}$$

$$Z_1 \equiv X_0^4 X_2^2 \left(4 X_3^2 - 16 b^2 X_0^2 a - 32 b^2 X_0 X_1\right) \pmod{N_0}$$

-continued $$Z_2 \equiv -2X_0X_2\begin{pmatrix} 8X_0^3X_1^3a^3 + 36X_0^2X_1^4a^2 - 8X_0^3X_1X_2^2a^2 + 54X_0X_1^5a - \\ -36X_0^2X_1^2X_2^2a + 27X_1^6 - 36X_0X_1^3X_2^2 + 8X_0^2X_2^4 \end{pmatrix}(\bmod N_0)$$

$$Z_3 \equiv (4X_0^2X_1^2a^2 + 12X_0X_1^3a - 4X_0^2X_2^2a + 9X_1^4 - 8X_0X_1X_2^2)^2 (\bmod N_0);$$

otherwise, the point $[Z_0, Z_1, Z_2, Z_3]$ is:

$$Z_0 \equiv (X_1Y_0 - X_0Y_1)^4 X_0^2 Y_0^2 (\bmod N_0)$$

$$Z_1 \equiv X_0^3 Y_0^3 (X_1Y_0 - X_0Y_1)^2 (2b^2 X_0Y_0 + 2X_1Y_1a + X_3Y_1 - 2X_2Y_2 + X_1Y_3)(\bmod N_0)$$

$$Z_2 \equiv X_0^3 Y_0^3 (X_1Y_0 - X_0Y_1)\begin{pmatrix} -4b^2 X_0X_2Y_0^2 + 4b^2 X_0^2 Y_0Y_2 + X_1X_3Y_0Y_2 + \\ +3X_0X_3Y_1Y_2 - 3X_1X_2Y_0Y_3 - X_0X_2Y_1Y_3 - \\ -2a(X_1X_2Y_0Y_1 - X_0X_3Y_0Y_2 - X_0X_1Y_1Y_2 + X_0X_2Y_0Y_3) \end{pmatrix}(\bmod N_0)$$

$$Z_3 \equiv \begin{pmatrix} (X_1Y_0 - X_0Y_1)^2 X_0Y_0a + X_1^3 Y_0^3 - X_0X_2^2 Y_0^3 - X_0X_1^2 Y_0^2 Y_1 - \\ -X_0^2 X_1Y_0Y_1^2 + X_0^3 Y_1^3 + 2X_0^2 X_2Y_0^2 Y_2 - X_0^3 Y_0Y_2^2 \end{pmatrix}^2 (\bmod N_0).$$

There is the step of testing if any component of the third point shares a factor with $N_0$ and is a shared factor with $N_0$. There is the step of identifying the shared factor with $N_0$ as one of plurality of prime factors of $N_0$, and a quotient of $N_0$ by the shared factor as another prime factor. There is the step of decrypting with the second computer the signal W with the public key $N_0$ and prime factors of the integer $N_0$. There is the step of reviewing the decrypted signal W for predetermined words with the second computer to determine if the decrypted signal W indicates an act has occurred or will occur that violates a law, or will violate a law, wherein the signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

There may be the step of displaying on a display the decrypted signal W. The display may be any type of computer display, tablet display, telephone display or paper which allows the decrypted signal W to be read by a person.

There may be the steps of, if a factorization of $N_0$ is not found after a preselected amount of time, re-initializing the semigroup law with different values of a and b; and repeating the electing, applying, determining, testing and Identifying steps until a factor with $N_0$ is found.

There may be the second computer generated steps of selecting a prime p and vector of positive integers $k=[k_0, k_1, \ldots, k_{M-1}]$. There may be the step of determining a polynomial $v(x)=v_0+v_1x+\ldots+v_{n-1}x^{n-1}$ such that $v(p)=N$ is a predetermined multiple of $N_0$. There may be the step of determining a $p^k$-standard polynomial $A(x)$ such that $A(x)^2 \equiv v(x)$ ($SP_{p^k}$), where a polynomial $f(x)=f_0+f_1x+f_2x^2+\ldots+f_{M-1}x^{M-1}$ is called $p^k$-standard if $$0 \leq f_i < p^{k_i}$$

for $i=0,1,\ldots,M-1$, a $p^k$-standard part of the polynomial $f(x)$ is computed by reducing the coefficient of $x^i$ modulo $p^{k_i}$ and truncating all terms $x^m$ for $m \geq M$. There may be the step of determining a roster of pairs $(U(x), V(x))$ such that there is a persistent standard polynomial factorization:

$$(A(x)-U(x)-V(x))(A(x)+U(x)-V(x)) \equiv v(x) \; (SP_{p^k})$$

where a standard polynomial factorization $v(x) \equiv r(x)s(x)$ is called persistent if $r(x)$ and $s(x)$ have the same degree as their reductions modulo p.

There may be the second computer generated steps of for each item of the roster, a standard polynomial factorization is $$v(x) \equiv (A(x)-U(x)-V(x))(A(x)+U(x)-V(x)) \; (SP)$$

determining a carry by $$(A(p)-U(p)-V(p))(A(p)+U(p)-V(p))-v(p) \equiv BV(p)+C$$

which defines constants B and C for each pair of the roster, for those elements of the roster of $(U(x), V(x))$ such that both corresponding constants B, C are simultaneously zero, the integers $r(p)=A(p)-U(p)-V(p)$ and $s(p)=A(p)+U(p)-V(p)$ contain divisors of $N_0$. There may be the step of extracting the divisors to obtain the prime factors of $N_0$.

The present invention pertains to a second computer for decoding an encrypted electromagnetic signal W encoded by a first computer with public key $N_0=r\times s$, where $N_0$, r and s are integers and W is a function of r and s, as shown in FIG. 1 and FIG. 3. The second computer comprises an input for obtaining the electromagnetic signal W from a telecommunications network, or a data network or an Internet or a first non-transient memory, a second non-transient memory in communication with the input in which the signal W is stored. The second computer comprises a cpu in communication with the second non-transient memory with the signal W in the second non-transient memory that decodes the signal W by factoring the public key $N_0$ in time $O(\log^6 N_0)$ by the second computer generated steps of selecting integers a, b. There is the step of electing an initial point in a set of quartuples of integers modulo $N_0$ (a projective space) $[X_0, X_1, X_2, X_3]=[1,0,b,0]$. There is the step of applying a semigroup law repeatedly starting from the initial point, where the semigroup law is defined as: given a pair of elements $[X_0: X_1: X_2: X_3]$ and $[Y_0: Y_1: Y_2: Y_3]$ of the projective space, there is produced a third point $[Z_0, Z_1, Z_2, Z_3]$. There is the step of determining that $[X_0: X_1: X_2: X_3] \equiv [Y_0: Y_1: Y_2: Y_3] \pmod{N_0}$, and thus the third point is $$Z_0 \equiv 16 X_0^4 X_2^4 \pmod{N_0}$$

$$Z_1 \equiv X_0^4 X_2^2 (4 X_3^2 - 16 b^2 X_0^2 a - 32 b^2 X_0 X_1) \pmod{N_0}$$

$$Z_2 \equiv -2 X_0 X_2 \begin{pmatrix} 8 X_0^3 X_1^3 a^3 + 36 X_0^2 X_1^4 a^2 - 8 X_0^3 X_1 X_2^2 a^2 + 54 X_0 X_1^5 a - \\ -36 X_0^2 X_1^2 X_2^2 a + 27 X_1^6 - 36 X_0 X_1^3 X_2^2 + 8 X_0^2 X_2^4 \end{pmatrix} \pmod{N_0}$$

$$Z_3 \equiv (4 X_0^2 X_1^2 a^2 + 12 X_0 X_1^3 a - 4 X_0^2 X_2^2 a + 9 X_1^4 - 8 X_0 X_1 X_2^2)^2 \pmod{N_0};$$

otherwise, the point $[Z_0, Z_1, Z_2, Z_3]$ is:

$$Z_0 \equiv (X_1 Y_0 - X_0 Y_1)^4 X_0^2 Y_0^2 \pmod{N_0}$$

$$Z_1 \equiv X_0^3 Y_0^3 (X_1 Y_0 - X_0 Y_1)^2 (2 b^2 X_0 Y_0 + 2 X_1 Y_1 a + X_3 Y_1 - 2 X_2 Y_2 + X_1 Y_3) \pmod{N_0}$$

$$Z_2 \equiv X_0^3 Y_0^3 (X_1 Y_0 - X_0 Y_1) \begin{pmatrix} -4 b^2 X_0 X_2 Y_0^2 + 4 b^2 X_0^2 Y_0 Y_2 + X_1 X_3 Y_0 Y_2 + \\ +3 X_0 X_3 Y_1 Y_2 - 3 X_1 X_2 Y_0 Y_3 - X_0 X_2 Y_1 Y_3 - \\ -2a(X_1 X_2 Y_0 Y_1 - X_0 X_3 Y_0 Y_2 - X_0 X_1 Y_1 Y_2 + X_0 X_2 Y_0 Y_3) \end{pmatrix} \pmod{N_0}$$

$$Z_3 \equiv \begin{pmatrix} (X_1 Y_0 - X_0 Y_1)^2 X_0 Y_0 a + X_1^3 Y_0^3 - X_0 X_2^2 Y_0^3 - X_0 X_1^2 Y_0^2 Y_1 - \\ -X_0^2 X_1 Y_0 Y_1^2 + X_0^3 Y_1^3 + 2 X_0^2 X_2 Y_0^2 Y_2 - X_0^3 Y_0 Y_2^2 \end{pmatrix}^2 \pmod{N_0}.$$

There is the step of testing if any component of the third point shares a factor with $N_0$ and is a shared factor with $N_0$. There is the step of identifying the shared factor with $N_0$ as one of plurality of prime factors of $N_0$, and a quotient of $N_0$ by the shared factor as another prime factor. The cpu decrypting the signal W with the public key $N_0$ and prime factors of integer $N_0$. The cpu reviewing the decrypted signal W for predetermined words to determine if the decrypted signal W indicates an act has occurred or will occur that violates a law, or will violate a law, wherein the signal W representative of the message is effectively decrypted and deciphered thereby a threat to property or individuals in violation of the law can be quickly acted upon to eliminate the threat before the threat occurs and actual damage to property or injury to individuals is prevented or mitigated. The steps described above for the method are also applicable to the second computer.

The present invention pertains to a non-transitory readable storage medium which includes a computer program stored on the storage medium for decoding an encrypted electromagnetic signal W encoded by a first computer with public key $N_0 = r \times s$, where $N_0$, r and s are integers and W is a function of r and s, where the signal W has been stored in a second non-transient memory of a second computer, and the second computer factoring the public key $N_0$ in time $O(\log^6 N_0)$. The signal W obtained from a telecommunications network, or a data network or an Internet or a first non-transient memory. The computer program having the second computer generated steps of selecting integers a, b. There is the step of electing an initial point in a set of quartuples of integers modulo $N_0$ (a projective space) $[X_0, X_1, X_2, X_3] = [1,0,b,0]$. There is the step of applying a semigroup law repeatedly starting from the initial point, where the semigroup law is defined as: given a pair of elements $[X_0: X_1: X_2: X_3]$ and $[Y_0: Y_1: Y_2: Y_3]$ of the projective space, there is produced a third point $[Z_0, Z_1, Z_2, Z_3]$. There is the step of determining that $[X_0: X_1: X_2: X_3] \equiv [Y_0: Y_1: Y_2: Y_3] \pmod{N_0}$, and thus the third point is $$Z_0 \equiv 16 X_0^4 X_2^4 \pmod{N_0}$$

$$Z_1 \equiv X_0^4 X_2^2 (4 X_3^2 - 16 b^2 X_0^2 a - 32 b^2 X_0 X_1) \pmod{N_0}$$

$$Z_2 \equiv -2 X_0 X_2 \begin{pmatrix} 8 X_0^3 X_1^3 a^3 + 36 X_0^2 X_1^4 a^2 - 8 X_0^3 X_1 X_2^2 a^2 + 54 X_0 X_1^5 a - \\ -36 X_0^2 X_1^2 X_2^2 a + 27 X_1^6 - 36 X_0 X_1^3 X_2^2 + 8 X_0^2 X_2^4 \end{pmatrix} \pmod{N_0}$$

$$Z_3 \equiv (4 X_0^2 X_1^2 a^2 + 12 X_0 X_1^3 a - 4 X_0^2 X_2^2 a + 9 X_1^4 - 8 X_0 X_1 X_2^2)^2 \pmod{N_0};$$

otherwise, the point $[Z_0, Z_1, Z_2, Z_3]$ is:

$$Z_0 \equiv (X_1 Y_0 - X_0 Y_1)^4 X_0^2 Y_0^2 \pmod{N_0}$$

$$Z_1 \equiv X_0^3 Y_0^3 (X_1 Y_0 - X_0 Y_1)^2 (2 b^2 X_0 Y_0 + 2 X_1 Y_1 a + X_3 Y_1 - 2 X_2 Y_2 + X_1 Y_3) \pmod{N_0}$$

$$Z_2 \equiv X_0^3 Y_0^3 (X_1 Y_0 - X_0 Y_1) \begin{pmatrix} -4 b^2 X_0 X_2 Y_0^2 + 4 b^2 X_0^2 Y_0 Y_2 + X_1 X_3 Y_0 Y_2 + \\ +3 X_0 X_3 Y_1 Y_2 - 3 X_1 X_2 Y_0 Y_3 - X_0 X_2 Y_1 Y_3 - \\ -2a(X_1 X_2 Y_0 Y_1 - X_0 X_3 Y_0 Y_2 - X_0 X_1 Y_1 Y_2 + X_0 X_2 Y_0 Y_3) \end{pmatrix} \pmod{N_0}$$

$$Z_3 \equiv \begin{pmatrix} (X_1 Y_0 - X_0 Y_1)^2 X_0 Y_0 a + X_1^3 Y_0^3 - X_0 X_2^2 Y_0^3 - X_0 X_1^2 Y_0^2 Y_1 - \\ -X_0^2 X_1 Y_0 Y_1^2 + X_0^3 Y_1^3 + 2 X_0^2 X_2 Y_0^2 Y_2 - X_0^3 Y_0 Y_2^2 \end{pmatrix}^2 \pmod{N_0}.$$

There is the step of testing if any component of the third point shares a factor with $N_0$ and is a shared factor with $N_0$. There is the step of identifying the shared factor with $N_0$ as one of plurality of prime factors of $N_0$, and a quotient of $N_0$ by the shared factor as another prime factor. There is the step of decrypting with the second computer the signal W with the public key $N_0$ and prime factors of the integer $N_0$. There is the step of reviewing the decrypted signal W for predetermined words with the second computer to determine if the decrypted signal W indicates an act has occurred or will occur that violates a law, or will violate a law, wherein the signal W representative of the message is effectively decrypted and deciphered thereby a threat to property or individuals in violation of the law can be acted upon to mitigate or eliminate the threat before the threat occurs and actual damage to property or injury to individuals is prevented or mitigated. The steps described above for the method are also applicable for the computer program.

Alternatively, the present invention pertains to a method for decoding an encrypted electromagnetic signal W encoded by a first computer with public key $N_0 = r \times s$, where $N_0$, r and s are integers. The method comprises the steps of obtaining the electromagnetic signal W from a telecommunications network, or a data network or an Internet or a first non-transient memory. There is the step of storing the signal W in a second non-transient memory. There is the step of decoding with a second computer in communication with the second non-transient memory the signal W in the second non-transient memory by factoring the public key $N_0$ in at most a time $O(\log^6 N_0)$ with the second computer generated steps of selecting a prime p and vector of positive integers $k = [k_0, k_1, \ldots, k_{M-1}]$. There is the step of determining a polynomial $v(x) = v_0 + v_1 x + \ldots + v_{n-1} x^{n-1}$ such that $v(p) = N$ is a predetermined multiple of $N_0$. There is the step of determining a $p^k$-standard polynomial $A(x)$ such that $A(x)^2 \equiv v(x)$ ($SP_{p^k}$), where a polynomial $f(x) = f_0 + f_1 x + f_2 x^2 + \ldots + f_{M-1} x^{M-1}$ is called $p^k$-standard if $$0 \leq f_i < p^{k_i}$$

for $i = 0, 1, \ldots, M-1$, a $p^k$-standard part of the polynomial $f(x)$ is computed by reducing the coefficient of $x^i$ modulo $p^{k_i}$ and truncating all terms $x^m$ for $m \geq M$. There is the step of determining a roster of pairs $(U(x), V(x))$ such that there is a persistent standard polynomial factorization:

$$(A(x) - U(x) - V(x))(A(x) + U(x) - V(x)) \equiv v(x) \ (SP_{p^k})$$

where a standard polynomial factorization $v(x) \equiv r(x) s(x)$ is called persistent if $r(x)$ and $s(x)$ have the same degree as their reductions modulo p. There is the step of determining a shared factor that integers $r(p)$ and $s(p)$ share with $N_0$, where the shared factor with $N_0$ as one of plurality of prime factors of $N_0$. There is the step of obtaining another prime factor by division of $N_0$ by the shared factor. There is the step of identifying the shared factor with $N_0$ as one of plurality of prime factors of $N_0$, and a quotient of $N_0$ by the shared factor as another prime factor. There is the step of decrypting with the second computer the signal W with the public key $N_0$ and prime factors of the integer $N_0$. There is the step of reviewing the decrypted signal W for predetermined words with the second computer to determine if the decrypted signal W indicates an act has occurred or will occur that violates a law, or will violate a law, wherein the signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

There may be the second computer generated steps of, for each item of the roster, a standard polynomial factorization is $$v(x) \equiv (A(x) - U(x) - V(x))(A(x) + U(x) - V(x)) \ (SP)$$

then determining a carry by $$(A(p) - U(p) - V(p))(A(p) + U(p) - V(p)) - v(p) = BV(p) + C$$

which defines constants B and C for each pair of the roster, for those elements of the roster of $(U(x), V(x))$ such that both corresponding constants B, C are simultaneously zero, the integers $r(p) = A(p) - U(p) - V(p)$ and $s(p) = A(p) + U(p) - V(p)$ contain divisors of $N_0$. There may be the step of extracting the divisors to obtain the prime factors of $N_0$.

There may be the second computer generated steps of given the initial pair $\xi_1 = 0$, $y_1 = CU(p) \bmod N_0$, calculating a discriminant $\Delta$ from $$\Delta = x^3 + \left(\frac{B^2}{4} + A(p)B\right) x^2 + U(p)^2 C^2 \mod N_0.$$

There may be the step of iterating a semigroup law until a factor is found, where the semigroup law is defined as:

If $\xi_n \equiv \xi_1 \pmod{N_0}$, let $\delta = \xi_1$, $\sigma_1 = 0$, $\sigma_n = 1$, otherwise, $\xi_n \ldots \xi_1$ is a nonzero constant modulo $N_0$; checking whether $\xi_n - \xi_1$ shares a factor with $N_0$; if so, then terminating the semigroup iteration and the factor identified is one of the prime factors of $N_0$, where the other prime factor is found by division of $N_0$ by the first factor; let $\delta = 1$, $\lambda = (\xi_n - \xi_1)^{-1} \pmod{N_0}$, $\sigma_1 = -\lambda$, $\sigma_2 = \lambda$; so irrespective of whether $\xi_n \equiv \xi_1 \pmod{N_0}$, it holds that $\sigma_1 \xi_1 + \sigma_n \xi_n = \delta$ where $\delta$ is a polynomial gcd of $\xi_1$ and $\xi_n$;

Next, if $y_n \equiv -y_1 \pmod{N_0}$, then let $d = \delta$, $\rho = 1$, $\epsilon = 0$; else, checking if $y_n + y_1$ shares a factor with $N_0$ and if so then terminating the semigroup iteration and the first factor identified as one of the prime factors of $N_0$, where the other prime factor is found by division of $N_0$ by the first factor; otherwise, let $d = 1$, $\rho = 0$, and $\lambda = (y_n + y_1)^{-1} \bmod N_0$, so that for either sign in $y_n \equiv \pm y_1 \pmod{N_0}$, a congruence $\rho \delta + \epsilon(y_1 + y_n) \equiv d \pmod{N_0}$ now holds, where d is a polynomial gcd of $\delta$ and $y_1 + y_n$;

Finally, let $\xi_{n+1} \leftarrow \xi_n \xi_1 / d^2$, define $y_{n+1} \pmod{N_0}$ such that the congruence holds:

$$dy_{n+1} \equiv \rho(\sigma_1 \xi_1 y_n + \sigma_n \xi_n y_1) + \epsilon \delta (\bmod \ \xi_{n+1})$$

where the modulo is with respect to polynomial division by $\xi_{n+1} \pmod{N_0}$, and, if $\xi_{n+1}$ is quadratic rather than linear, then let $$\xi_{n+1} \leftarrow \frac{\Delta - y_{n+1}^2}{\xi_{n+1}}.$$

There may then be the step of testing whether the leading coefficient of $\xi_{n+1}$ and $N_0$ share a factor, and if so, then terminating the semigroup iteration and the first factor is found by division of $N_0$ by the first factor; else, normalize $\xi_{n+1}$ by dividing (modulo $N_0$) by the leading coefficient of $\xi_{n+1}$ and update $y_{n+1}$:

$$y_{n+1} \leftarrow -y_{n+1} \bmod \xi_{n+1}.$$

There may be the step of iterating the semigroup law until a prime factor is found. There may be the step of identifying this prime factor as the first factor of $N_0$. There may be the step of obtaining the other prime factor by division of $N_0$ by the first prime factor.

The present invention pertains to a second computer for decoding an encrypted electromagnetic signal W encoded by a first computer with public key $N_0=r\times s$, where $N_0$, r and s are integers and W is a function of r and s. The second computer comprises an input for obtaining the electromagnetic signal W from a telecommunications network, or a data network or an Internet or a first non-transient memory. The second computer comprises a second non-transient memory in communication with the input in which the signal W is stored. The second computer comprises a cpu in communication with the second non-transient memory with the signal W in the second non-transient memory. The cpu decodes the signal W by factoring the public key $N_0$ in time $O(\log^6 N_0)$ by the second computer generated steps of selecting a prime p and vector of positive integers $k=[k_0, k_1, \ldots, k_{M-1}]$. There is the step of determining a polynomial $v(x)=v_0+v_1 x+,,,+v_{n-1}x^{n-1}$ such that $v(p)\equiv N$ is a predetermined multiple of $N_0$. There is the step of determining a $p^k$-standard polynomial $A(x)$ such that $A(x)^2 \equiv v(x)$ ($SP_{p^k}$), where a polynomial $f(x)=f_0+f_1 x+f_2 x^2+\ldots+f_{M-1}x^{M-1}$ called $p^k$-standard if $$0 \le f_i < p^{k_i}$$

for $i=0,1,\ldots,M-1$, a $p^k$-standard part of the polynomial $f(x)$ is computed by reducing the coefficient of $x^i$ modulo $p^{k_i}$ and truncating all terms $x^m$ for $m \ge M$. There is the step of determining a roster of pairs $(U(x), V(x))$ such that there is a persistent standard polynomial factorization:

$$(A(x)-U(x)-V(x))(A(x)+U(x)-V(x)) \equiv v(x) \ (SP_{p^k})$$

where a standard polynomial factorization $v(x) \equiv r(x)s(x)$ is called persistent if $r(x)$ and $s(x)$ have the same degree as their reductions modulo p. There is the step of determining a shared factor that integers $r(p)$ and $s(p)$ share with $N_0$, where the shared factor with $N_0$ as one of plurality of prime factors of $N_0$. There is the step of obtaining another prime factor by division of $N_0$ by the shared factor. There is the step of identifying the shared factor with $N_0$ as one of plurality of prime factors of $N_0$, and a quotient of $N_0$ by the shared factor as another prime factor. The cpu decrypting with the second computer the signal W with the public key $N_0$ and prime factors of the integer $N_0$. The cpu reviewing the decrypted signal W for predetermined words to determine if the decrypted signal W indicates an act has occurred or will occur that violates a law, or will violate a law, wherein the signal W representative of the message is effectively decrypted and deciphered thereby a threat to property or individuals in violation of the law can be acted upon to mitigate or eliminate the threat before the threat occurs and actual damage to property or injury to individuals is prevented or mitigated. The steps described above for the alternative method are also applicable for the second computer.

The present invention pertains to a non-transitory readable storage medium which includes a computer program stored on the storage medium for decoding an encrypted electromagnetic signal W encoded by a first computer with public key $N_0=r\times s$, where $N_0$, r and s are integers and W is a function of r and s, where the signal W has been stored in a second non-transient memory of a second computer, and the second computer factoring the public key $N_0$ in at most a time $O(\log^6 N_0)$. The signal W obtained from a telecommunications network, or a data network or an Internet or a first non-transient memory. The computer program having the second computer generated steps of: selecting a prime p and vector of positive integers $k=[k_0, k_1, \ldots, k_{M-1}]$. There is the step of determining a polynomial $v(x)=v_0+v_1 x+\ldots+v_{n-1}x^{n-1}$ such that $v(p) \equiv N$ is a predetermined multiple of $N_0$. There is the step of determining a $p^k$-standard polynomial $A(x)$ such that $A(x)^2 \equiv v(x)$ ($SP_{p^k}$), where a polynomial $f(x)=f_0+f_1 x+f_2 x^2+\ldots+f_{M-1}x^{M-1}$ is called $p^k$-standard if $$0 \le f_i < p^{k_i}$$

for $i=0,1,\ldots,M-1$, a $p^k$-standard part of the polynomial $f(x)$ is computed by reducing the coefficient of $x^i$ modulo $p^{k_i}$ and truncating all terms $x^m$ for $m \ge M$. There is the step of determining a roster of pairs $(U(x), V(x))$ such that there is a persistent standard polynomial factorization:

$$(A(x)-U(x)-V(x))(A(x)+U(x)-V(x)) \equiv v(x) \ (SP_{p^k})$$

where a standard polynomial factorization $v(x) \equiv r(x)s(x)$ is called persistent if $r(x)$ and $s(x)$ have the same degree as their reductions modulo p. There is the step of determining a shared factor that integers $r(p)$ and $s(p)$ share with $N_0$, where the shared factor with $N_0$ as one of plurality of prime factors of $N_0$. There is the step of obtaining another prime factor by division of $N_0$ by the shared factor. There is the step of identifying the shared factor with $N_0$ as one of plurality of prime factors of $N_0$, and a quotient of $N_0$ by the shared factor as another prime factor. There is the step of decrypting with the second computer the signal W with the public key $N_0$ and prime factors of the integer $N_0$. There is the step of reviewing the decrypted signal W for predetermined words with the second computer to determine if the decrypted signal W indicates an act has occurred or will occur that violates a law, or will violate a law, wherein the signal W representative of the message is effectively decrypted and deciphered thereby a threat to property or individuals in violation of the law can be acted upon to mitigate or eliminate the threat before the threat occurs and actual damage to property or injury to individuals is prevented or mitigated. The steps described above for the alternative method are also applicable for the computer program.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method for decoding an encrypted electromagnetic signal W encoded by a first computer with public key $N_0=r\times s$, where $N_0$, r and s are integers comprising the steps of:

obtaining an electromagnetic signal W from a telecommunications network, or a data network or an Internet or a first non-transient memory;

storing the electromagnetic signal W in a second non-transient memory;

decoding with a second computer in communication with the second non-transient memory the electromagnetic signal W in the second non-transient memory by factoring the public key $N_0$ in at most a time $O(\log^6 N_0)$ with the second computer generated steps of selecting integers a, b;

electing an initial point in a set of quartuples of integers modulo $N_0$ (a projective space) $[X_0, X_1, X_2, X_3]=[1,0,b,0]$;

applying a semigroup law repeatedly starting from the initial point, where the semigroup law is defined as: given a pair of elements $[X_0: X_1: X_2: X_3]$ and $[Y_0: Y_1: Y_2: Y_3]$ of the projective space, there is produced a third point $[Z_0, Z_1, Z_2, Z_3]$;

determining that $[X_0: X_1: X_2: X_3] \equiv [Y_0: Y_1: Y_2: Y_3] \pmod{N_0}$, and thus the third point is $$Z_0 \equiv 16 X_0^4 X_2^4 \pmod{N_0}$$

$$Z_1 \equiv X_0^4 X_2^2 (4X_3^2 - 16b^2 X_0^2 a - 32b^2 X_0 X_1) \pmod{N_0}$$

$$Z_2 \equiv -2 X_0 X_2 \begin{pmatrix} 8 X_0^3 X_1^3 a^3 + 36 X_0^2 X_1^4 a^2 - \\ 8 X_0^3 X_1 X_2^2 a^2 + 54 X_0 X_1^5 a - \\ -36 X_0^2 X_1^2 X_2^2 a + 27 X_1^6 - \\ 36 X_0 X_1^3 X_2^2 + 8 X_0^2 X_2^4 \end{pmatrix} \pmod{N_0}$$

$$Z_3 \equiv (4 X_0^2 X_1^2 a^2 + 12 X_0 X_1^3 a - 4 X_0^2 X_2^2 a + 9 X_1^4 - 8 X_0 X_1 X_2^2)^2 \pmod{N_0};$$

otherwise, the point $[Z_0, Z_1, Z_2, Z_3]$ is:

$$Z_0 \equiv (X_1 Y_0 - X_0 Y_1)^4 X_0^2 Y_0^2 \pmod{N_0}$$

$$Z_1 \equiv \frac{X_0^3 Y_0^3 (X_1 Y_0 - X_0 Y_1)^2 (2b^2 X_0 Y_0 + }{2 X_1 Y_1 a + X_3 Y_1 - 2 X_2 Y_2 + X_1 Y_3)} \pmod{N_0}$$

$$Z_2 \equiv X_0^3 Y_0^3 (X_1 Y_0 - X_0 Y_1) \begin{pmatrix} -4b^2 X_0 X_2 Y_0^2 + 4b^2 X_0^2 Y_0 Y_2 + \\ X_1 X_3 Y_0 Y_2 + + 3 X_0 X_3 Y_1 Y_2 - \\ 3 X_1 X_2 Y_0 Y_3 - X_0 X_2 Y_1 Y_3 - \\ -2a(X_1 X_2 Y_0 Y_1 - X_0 X_3 Y_0 Y_2 - \\ X_0 X_1 Y_1 Y_2 + X_0 X_2 Y_0 Y_3) \end{pmatrix} \pmod{N_0}$$

$$Z_3 \equiv \begin{pmatrix} (X_1 Y_0 - X_0 Y_1)^2 X_0 Y_0 a + X_1^3 Y_0^3 - X_0 X_2^2 Y_0^2 - X_0 X_1^2 Y_0^2 Y_1 - \\ -X_0^2 X_1 Y_0 Y_1^2 + X_0^3 Y_1^3 + 2 X_0^2 X_2 Y_0^2 Y_2 - X_0^3 Y_0 Y_2^2 \end{pmatrix}^2 \pmod{N_0};$$

testing if any component of the third point shares a factor with $N_0$ and is a shared factor with $N_0$;

identifying the shared factor with $N_0$ as one of plurality of prime factors of $N_0$, and a quotient of $N_0$ by the shared factor as another prime factor;

decrypting with the second computer the electromagnetic signal W with the public key $N_0$ and prime factors of integer $N_0$; and reviewing the decrypted electromagnetic signal W for predetermined words with the second computer to determine if the decrypted electromagnetic signal W indicates an act has occurred or will occur that violates a law, or will violate a law, wherein the electromagnetic signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

2. The method of claim 1 including the steps of if a factorization of $N_0$ is not found after a preselected amount of time, re-initializing the semigroup law with different values of a and b; and repeating the electing, applying, determining, testing and Identifying steps until a factor with $N_0$ is found.

3. The method of claim 2 including the second computer generated steps of selecting a prime p and vector of positive integers $k=[k_0, k_1, \ldots, k_{M-1}]$;

Determining a polynomial $v(x) = v_0 + v_1 x + \ldots + v_{n-1} x^{n-1}$ such that $v(p) = N$ is a predetermined multiple of $N_0$;

Determining a $p^k$-standard polynomial $A(x)$ such that $A(x)^2 \equiv v(x)$ ($SP_{p^k}$), where a polynomial $f(x) = f_0 + f_1 x + f_2 x^2 + \ldots + f_{M-1} x^{M-1}$ is called $p^k$-standard if $$0 \leq f_i < p^{k_i}$$

for $i=0,1,M-1$, a $p^k$-standard part of the polynomial $f(x)$ is computed by reducing the coefficient of $x^i$ modulo $p^{k_i}$ and truncating all terms $x^m$ for $m \geq M$, determining a roster of pairs $(U(x), V(x))$ such that there is a persistent standard polynomial factorization:

$$(A(x) - U(x) - V(x))(A(x) + U(x) - V(x)) \equiv v(x) \ (SP_{p^k})$$

where a standard polynomial factorization $v(x) \equiv r(x) s(x)$ is called persistent if $r(x)$ and $s(x)$ have the same degree as their reductions modulo p.

4. The method of claim 3 including the second computer generated steps of for each item of the roster, a standard polynomial factorization is $$v(x) \equiv (A(x) - U(x) - V(x))(A(x) + U(x) - V(x)) \ (SP)$$

determining a carry by $$(A(p) - U(p) - V(p))(A(p) + U(p) - V(p)) - v(p) \equiv BV(p) + C$$

which defines constants B and C for each pair of the roster, for those elements of the roster of $(U(x), V(x))$ such that both corresponding constants B, C are simultaneously zero, the integers $r(p) = A(p) - U(p) - V(p)$ and $s(p) = A(p) + U(p) - V(p)$ contain divisors of $N_0$; and extracting the divisors to obtain the prime factors of $N_0$.

5. A non-transitory readable storage medium which includes a computer program stored on the storage medium for decoding an encrypted electromagnetic signal W encoded by a first computer with public key $N_0 = r \times s$, where $N_0$, r and s are integers, where the electromagnetic signal W has been stored in a second non-transient memory of a second computer, and the second computer factoring the public key $N_0$ in time $O(\log^6 N_0)$, the electromagnetic signal W obtained from a telecommunications network, or a data network or an Internet or a first non-transient memory, the computer program having the second computer generated steps of: selecting Integers a, b;

electing an initial point in a set of quartuples of integers modulo $N_0$ (a projective space) $[X_0, X_1, X_2, X_3] = [1, 0, b, 0]$;

applying a semigroup law repeatedly starting from the initial point, where the semigroup law is defined as: given a pair of elements $[X_0: X_1: X_2: X_3]$ and $[Y_0: Y_1: Y_2: Y_3]$ of the projective space, there is produced a third point $[Z_0, Z_1, Z_2, Z_3]$;

determining that $[X_0: X_1: X_2: X_3] \equiv [Y_0: Y_1: Y_2: Y_3] \pmod{N_0}$, and thus the third point is $$Z_0 \equiv 16 X_0^4 X_2^4 \pmod{N_0}$$

$$Z_1 \equiv X_0^4 X_2^2 (4X_3^2 - 16b^2 X_0^2 a - 32b^2 X_0 X_1) \pmod{N_0}$$

-continued $$Z_2 \equiv -2X_0X_2\begin{pmatrix} 8X_0^3X_1^3a^3 + 36X_0^2X_1^4\alpha^2 - 8X_0^3X_1X_2^2a^2 + 54X_0X_1^5a - \\ -36X_0^2X_1^2X_2^2a + 27X_1^6 - 36X_0X_1^3X_2^2 + 8X_0^2X_2^4 \end{pmatrix}(\bmod \ N_0)$$

$$Z_3 \equiv (4X_0^2X_1^2a^2 + 12X_0X_1^3a - 4X_0^2X_2^2a + 9X_1^4 - 8X_0X_1X_2^2)^2 (\bmod \ N_0);$$

otherwise, the point $[Z_0, Z_1, Z_2, Z_3]$ is:

$$Z_0 \equiv (X_1Y_0 - X_0Y_1)^4 X_0^2 Y_0^2 (\bmod \ N_0)$$

$$Z_1 \equiv X_0^3 Y_0^3 (X_1Y_0 - X_0Y_1)^2 (2b^2 X_0Y_0 + 2X_1Y_1a + X_3Y_1 - 2X_2Y_2 + X_1Y_3)(\bmod \ N_0)$$

$$Z_2 \equiv X_0^3 Y_0^3 (X_1Y_0 - X_0Y_1)\begin{pmatrix} -4b^2 X_0X_2Y_0^2 + 4b^2 X_0^2 Y_0Y_2 + X_1X_3Y_0Y_2 + \\ +3X_0X_3Y_1Y_2 - 3X_1X_2Y_0Y_3 - X_0X_2Y_1Y_3 - \\ -2a(X_1X_2Y_0Y_1 - X_0X_3Y_0Y_2 - X_0X_1Y_1Y_2 + X_0X_2Y_0Y_3) \end{pmatrix}(\bmod \ N_0)$$

$$Z_3 \equiv \begin{pmatrix} (X_1Y_0 - X_0Y_1)^2 X_0Y_0a + X_1^3 Y_0^3 - X_0X_2^2 Y_0^3 - X_0X_1^2 Y_0^2 Y_1 - \\ -X_0^2 X_1 Y_0 Y_1^2 + X_0^3 Y_1^3 + 2X_0^2 X_2 Y_0^2 Y_2 - X_0^3 Y_0 Y_2^2 \end{pmatrix}^2 (\bmod \ N_0);$$

testing if any component of the third point shares a factor with $N_0$ and is a shared factor with $N_0$;

identifying the shared factor with $N_0$ as one of plurality of prime factors of $N_0$, and a quotient of $N_0$ by the shared factor as another prime factor;

decrypting the electromagnetic signal W with the public key $N_0$ and prime factors of integer $N_0$; and reviewing the decrypted electromagnetic signal W for predetermined words to determine if the decrypted electromagnetic signal W indicates an act has occurred or will occur that violates a law, or will violate a law, wherein the electromagnetic signal W representative of the message is effectively decrypted and deciphered thereby a threat to property or individuals in violation of the law can be quickly acted upon to eliminate the threat before the threat occurs and actual damage to property or injury to individuals is prevented or mitigated.

6. The non-transitory readable storage medium of claim 5 wherein the software program includes the second computer generated steps of if a factorization of $N_0$ is not found after a preselected amount of time, re-initializing the semigroup law with different values of a and b; and repeating the electing, applying, determining, testing and Identifying steps until a factor with $N_0$ is found.

7. The non-transitory readable storage medium of claim 6 wherein the software program includes the second computer generated steps of selecting a prime p and vector of positive integers $k=[k_0, k_1, \ldots, k_{M-1}]$;

determining a polynomial $v(x)=v_0+v_1x+ \ldots +v_{n-1}x^{n-1}$ such that $v(p)=N$ is a predetermined multiple of $N_0$;

determining a $p^k$-standard polynomial $A(x)$ such that $A(x)^2 \equiv v(x) \ (SP_{p^k})$, where a polynomial $f(x)=f_0+f_1x+f_2x^2+ \ldots +f_{M-1}x^{M-1}$ is called $p^k$-standard if $0 \leq f_i < p^{k_i}$ for i=0,1,M−1, a $p^k$-standard part of the polynomial f(x) is computed by reducing the coefficient of $x^i$ modulo $p^{k_i}$ and truncating all terms $x^m$ for m≥M, determining a roster of pairs (U(x), V(x)) such that there is a persistent standard polynomial factorization:

$(A(x)-U(x)-V(x))(A(x)+U(x)-V(x)) \equiv v(x) \ (SP_{p^k})$ where a standard polynomial factorization $v(x) \equiv r(x)s(x)$ is called persistent if r(x) and s(x) have the same degree as their reductions modulo p.

8. The non-transitory readable storage medium of claim 7 wherein the computer program includes the second computer generated steps of for each item of the roster, a standard polynomial factorization is $v(x) \equiv (A(x)-U(x)-V(x))(A(x)+U(x)-V(x)) \ (SP)$ determining a carry by $(A(p)-U(p)-V(p))(A(p)+U(p)-V(p))-v(p) \equiv BV(p)+C$ which defines constants B and C for each pair of the roster, for those elements of the roster of (U(x), V(x)) such that both corresponding constants B, C are simultaneously zero, the integers $r(p)=A(p)-U(p)-V(p)$ and $s(p)=A(p)+U(p)-V(p)$ contain divisors of $N_0$; and extracting the divisors to obtain the prime factors of $N_0$.

9. A method for decoding an encrypted electromagnetic signal W encoded by a first computer with public key $N_0=r \times s$, where $N_0$, r and s are integers comprising the steps of:

obtaining an electromagnetic signal W from a telecommunications network, or a data network or an Internet or a first non-transient memory;

storing the electromagnetic signal W in a second non-transient memory;

decoding with a second computer in communication with the second non-transient memory the electromagnetic signal W in the second non-transient memory by factoring the public key $N_0$ in at most a time $O(\log^6 N_0)$ with the second computer generated steps of selecting a prime p and vector of positive integers $k=[k_0, k_1, \ldots, k_{M-1}]$;

determining a polynomial $v(x)=v_0+v_1x+ \ldots +v_{n-1}x^{n-1}$ such that $v(p)=N$ is a predetermined multiple of $N_0$;

determining a $p^k$-standard polynomial $A(x)$ such that $A(x)^2 \equiv v(x) \ (SP_{p^k})$, where a polynomial $f(x)=f_0+f_1x+f_2x^2+ \ldots +f_{M-1}x^{M-1}$ is called $p^k$-standard if $0 \leq f_i < p^{k_i}$ for i=0,1,M−1, a $p^k$-standard part of the polynomial f(x) is computed by reducing the coefficient of $x^i$ modulo $p^{k_i}$ and truncating all terms $x^m$ for m≥M, determining a roster of pairs (U(x), V(x)) such that there is a persistent standard polynomial factorization:

$(A(x)-U(x)-V(x))(A(x)+U(x)-V(x)) \equiv v(x) \ (SP_{p^k})$ where a standard polynomial factorization $v(x) \equiv r(x)s(x)$ is called persistent if $r(x)$ and $s(x)$ have the same degree as their reductions modulo p;
  determining a shared factor that integers $r(p)$ and $s(p)$ share with $N_0$, where the shared factor with $N_0$ as one of plurality of prime factors of $N_0$;
  obtaining another prime factor by division of $N_0$ by the shared factor;
  identifying the shared factor with $N_0$ as one of plurality of prime factors of $N_0$, and a quotient of $N_0$ by the shared factor as another prime factor;
  decrypting with the second computer the electromagnetic signal W with the public key $N_0$ and prime factors of integer $N_0$; and
  reviewing the decrypted electromagnetic signal W for predetermined words with the second computer to determine if the decrypted electromagnetic signal W indicates an act has occurred or will occur that violates a law, or will violate a law, wherein the electromagnetic signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

10. The method of claim 9 including the second computer generated steps of for each item of the roster, a standard polynomial factorization is $$v(x) \equiv (A(x)-U(x)-V(x))(A(x)+U(x)-V(x)) \quad (SP)$$

determining a carry by $$(A(p)-U(p)-V(p))(A(p)+U(p)-V(p))-v(p) \equiv BV(p)+C$$

which defines constants B and C for each pair of the roster, for those elements of the roster of $(U(x), V(x))$ such that both corresponding constants B, C are simultaneously zero, the integers $r(p)=A(p)-U(p)-V(p)$ and $s(p)=A(p)+U(p)-V(p)$ contain divisors of $N_0$; and
  extracting the divisors to obtain the prime factors of $N_0$.

11. The method of claim 10 including the second computer generated steps of given the initial pair $\xi_1=0$, $y_1=CU(p) \bmod N_0$, calculating a discriminant $\Delta$ from $$\Delta = x^3 + \left(\frac{B^2}{4} + A(p)B\right)x^2 + U(p)^2 C^2 \bmod N_0$$

iterating a semigroup law until a factor is found, where the semigroup law is defined as:
  if $\xi_n \equiv \xi_1 \pmod{N_0}$, let $\delta=\xi_1$, $\sigma_1=0$, $\sigma_n=1$, otherwise, $\xi_n-\xi_1$ is a nonzero constant modulo $N_0$; checking whether $\xi_n-\xi_1$ shares a factor with $N_0$; if so, then terminating the semigroup iteration and the factor identified is one of the prime factors of $N_0$, where the other prime factor is found by division of $N_0$ by the first factor; let $\delta=1$, $\lambda=(\xi_n-\xi_1)^{-1} \pmod{N_0}$, $\sigma_1=-\lambda$, $\sigma_2=\lambda$; so irrespective of whether $\xi_n \equiv \xi_1 \pmod{N_0}$, it holds that $\sigma_1\xi_1+\sigma_n\xi_n=\delta$ where $\delta$ is the polynomial gcd of $\xi_1$ and $\xi_n$;
  next, if $y_n \equiv -y_1 \pmod{N_0}$, then let $d=\delta$, $\rho=1$, $\epsilon=0$; else, checking if $y_n+y_1$ shares a factor with $N_0$ and if so then terminating the semigroup iteration and the first factor identified as one of the prime factors of $N_0$, where the other prime factor is found by division of $N_0$ by the first factor; otherwise, let $d=1$, $\rho=0$, and $\lambda=(y_n+y_1)^{-1} \bmod N_0$, so that for either sign in $y_n \equiv \pm y_1 \pmod{N_0}$, a congruence $\rho\delta+\epsilon(y_1+y_n) \equiv d \pmod{N_0}$ now holds, where d is the polynomial gcd of $\delta$ and $y_1+y_n$;

finally, let $\xi_{n+1} \leftarrow \xi_n\xi_1/d^2$, define $y_{n+1} \pmod{N_0}$ such that the congruence holds:

$$dy_{n+1} \equiv \rho(\sigma_1\xi_1 y_n+\sigma_n\xi_n y_1)+\epsilon\delta \pmod{\xi_{n+1}}$$

where the modulo is with respect to polynomial division by $\xi_{n+1} \pmod{N_0}$, and, $\xi_{n+1}$ is quadratic rather than linear, then let $$\xi_{n+1} \leftarrow \frac{\Delta - y_{n+1}^2}{\xi_{n+1}};$$

testing is now made whether the leading coefficient of $\xi_{n+1}$ and $N_0$ share a factor, and if so, then terminating the semigroup iteration and the first factor is found by division of $N_0$ by the first factor; else, normalize $\xi_{n+1}$ by dividing (modulo $N_0$) by the leading coefficient of $\xi_{n+1}$ and update $y_{n+1}$:

$$y_{n+1} \leftarrow y_{n+1} \bmod \xi_{n+1},$$

with the same meaning of mod;
  by iterating the semigroup law until a prime factor is found, identifying this prime factor as the first factor of $N_0$, and obtaining the other prime factor by division of $N_0$ by the first prime factor;
  decrypting with the second computer the electromagnetic signal W with the public key $N_0$ and prime factors of integer $N_0$; and
  reviewing the decrypted electromagnetic signal W for predetermined words with the second computer to determine if the electromagnetic decrypted signal W indicates an act has occurred or will occur that violates a law, or will violate a law, wherein the electromagnetic signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

12. A non-transitory readable storage medium which includes a computer program stored on the storage medium for decoding an encrypted electromagnetic signal W encoded by a first computer with public key $N_0=r \times s$, where $N_0$, r and s are integers, where the electromagnetic signal W has been stored in a second non-transient memory of a second computer, and the second computer factoring the public key $N_0$ in time $O(\log^6 N_0)$, the electromagnetic signal W obtained from a telecommunications network, or a data network or an Internet or a first non-transient memory, the computer program having the second computer generated steps of: selecting a prime p and vector of positive integers $k=[k_0, k_1, \ldots, k_{M-1}]$;
  determining a polynomial $v(x)=v_0+v_1 x+ \ldots +v_{n-1}x^{n-1}$ such that $v(p)=N$ is a predetermined multiple of $N_0$;
  determining a $p^k$-standard polynomial $A(x)$ such that $A(x)^2 \equiv v(x)$ $(SP_{p^k})$, where a polynomial $f(x)=f_0+f_1 x+f_2 x^2+ \ldots +f_{M-1}x^{M-1}$ is called $p^k$-standard if $$0 \leq f_i < p^{k_i}$$

for $i=0,1,M-1$, a $p^k$-standard part of the polynomial $f(x)$ is computed by reducing the coefficient of $x^i$ modulo $p^{k_i}$ and truncating all terms $x^m$ for $m \geq M$,
  determining a roster of pairs $(U(x), V(x))$ such that there is a persistent standard polynomial factorization:

$$(A(x)-U(x)-V(x))(A(x)+U(x)-V(x)) \equiv v(x) \quad (SP_{p^k})$$

where a standard polynomial factorization $v(x) \equiv r(x)s(x)$ is called persistent if $r(x)$ and $s(x)$ have the same degree as their reductions modulo p;

determining a shared factor that integers $r(p)$ and $s(p)$ share with $N_0$, where the shared factor with $N_0$ as one of plurality of prime factors of $N_0$;

obtaining another prime factor by division of $N_0$ by the shared factor;

identifying the shared factor with $N_0$ as one of plurality of prime factors of $N_0$, and a quotient of $N_0$ by the shared factor as another prime factor;

decrypting the electromagnetic signal W with the public key $N_0$ and prime factors of integer $N_0$; and reviewing the decrypted electromagnetic signal W for predetermined words to determine if the decrypted electromagnetic signal W indicates an act has occurred or will occur that violates a law, or will violate a law, wherein the electromagnetic signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

13. The non-transitory readable storage medium of claim 12 wherein the computer program including the second computer generated steps of for each item of the roster, a standard polynomial factorization is $$v(x) \equiv (A(x)-U(x)-V(x))(A(x)+U(x)-V(x)) \quad (SP)$$

determining a carry by $$(A(p)-U(p)-V(p))(A(p)+U(p)-V(p))-v(p) \equiv BV(p)+C$$

which defines constants B and C for each pair of the roster, for those elements of the roster of $(U(x), V(x))$ such that both corresponding constants B, C are simultaneously zero, the integers $r(p)=A(p)-U(p)-V(p)$ and $s(p)=A(p)+U(p)-V(p)$ contain divisors of $N_0$; and extracting the divisors to obtain the prime factors of $N_0$.

14. The non-transitory readable storage medium of claim 13 wherein the computer program including the second computer generated steps of given the initial pair $\xi_1=0$, $y_1=CU(p) \bmod N_0$, calculating a discriminant $\Delta$ from $$\Delta = x^3 + \left(\frac{B^2}{4} + A(p)B\right)x^2 + U(p)^2 C^2 \bmod N_0$$

iterating a semigroup law until a factor is found, where the semigroup law is defined as:

if $\xi_n \equiv \xi_1 \pmod{N_0}$, let $\delta = \xi_1$, $\sigma_1=0$, $\sigma_n=1$, otherwise, $\xi_n-\xi_1$ is a nonzero constant modulo $N_0$; checking whether $\xi_n-\xi_1$ shares a factor with $N_0$; if so, then terminating the semigroup iteration and the factor identified is one of the prime factors of $N_0$, where the other prime factor is found by division of $N_0$ by the first factor; let $\delta=1$, $\lambda=(\xi_n-\xi_1)^{-1} \pmod{N_0}$, $\sigma_1=-\lambda$, $\sigma_2=\lambda$; so irrespective of whether $\xi_n \equiv \xi_1 \pmod{N_0}$, it holds that $\sigma_1\xi_1+\sigma_n\xi_n=\delta$ where $\delta$ is the polynomial gcd of $\xi_1$ and $\xi_n$;

next, if $y_n \equiv -y_1 \pmod{N_0}$, then let $d=\delta$, $\rho=1$, $\epsilon=0$; else, checking if $y_n+y_1$ shares a factor with $N_0$ and if so then terminating the semigroup iteration and the first factor identified as one of the prime factors of $N_0$, where the other prime factor is found by division of $N_0$ by the first factor; otherwise, let $d=1$, $\rho=0$, and $\lambda=(y_n+y_1)^{-1} \bmod N_0$, so that for either sign in $y_n \equiv \pm y_1 \pmod{N_0}$, a congruence $\rho\delta+\epsilon(y_1+y_n) \equiv d \pmod{N_0}$ now holds, where d is the polynomial gcd of $\delta$ and $y_1+y_n$;

finally, let $\xi_{n+1} \leftarrow \xi_n\xi_1/d^2$, define $y_{n+1} \pmod{N_0}$ such that the congruence holds:

$$dy_{n+1} \equiv \rho(\sigma_1\xi_1 y_n + \sigma_n\xi_n y_1) + \epsilon\delta \pmod{\xi_{n+1}}$$

where the modulo is with respect to polynomial division by $\xi_{n+1} \pmod{N_0}$, and, $\xi_{n+1}$ is quadratic rather than linear, then let $$\xi_{n+1} \leftarrow \frac{\Delta - y_{n+1}^2}{\xi_{n+1}};$$

testing is now made whether the leading coefficient of $\xi_{n+1}$ and $N_0$ share a factor, and if so, then terminating the semigroup iteration and the first factor is found by division of $N_0$ by the first factor; else, normalize $\xi_{n+1}$ by dividing (modulo $N_0$) by the leading coefficient of $\xi_{n+1}$ and update $y_{n+1}$:

$$y_{n+1} \leftarrow -y_{n+1} \bmod \xi_{n+1},$$

with the same meaning of mod;

by iterating the semigroup law until a prime factor is found, identifying this prime factor as the first factor of $N_0$, and obtaining the other prime factor by division of $N_0$ by the first prime factor;

decrypting with the second computer the electromagnetic signal W with the public key $N_0$ and prime factors of integer $N_0$; and reviewing the decrypted electromagnetic signal W for predetermined words with the second computer to determine if the decrypted electromagnetic signal W indicates an act has occurred or will occur that violates a law, or will violate a law, wherein the electromagnetic signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

* * * * *